(12) United States Patent
Carr et al.

(10) Patent No.: US 11,878,562 B2
(45) Date of Patent: Jan. 23, 2024

(54) ADJUSTABLE SHOCK ABSORBER SYSTEM AND DEVICE

(71) Applicant: Bernard J. Carr, Santa Barbara, CA (US)

(72) Inventors: Bernard J. Carr, Santa Barbara, CA (US); Kevin Birch, Santa Barbara, CA (US); Max O. Hanberg, Solvang, CA (US)

(73) Assignee: Bernard J. Carr, Santa Barbara, CA (US)

( * ) Notice: Subject to any disclaimer, the term of this patent is extended or adjusted under 35 U.S.C. 154(b) by 97 days.

(21) Appl. No.: 17/564,992

(22) Filed: Dec. 29, 2021

(65) Prior Publication Data

US 2023/0127131 A1 Apr. 27, 2023

Related U.S. Application Data

(60) Provisional application No. 63/286,777, filed on Dec. 7, 2021, provisional application No. 63/272,099, filed on Oct. 26, 2021.

(51) Int. Cl.
*B60G 17/02* (2006.01)
*B25B 13/52* (2006.01)
*F16F 1/12* (2006.01)

(52) U.S. Cl.
CPC ............ *B60G 17/021* (2013.01); *B25B 13/52* (2013.01); *F16F 1/121* (2013.01);
(Continued)

(58) Field of Classification Search
CPC .............. B60G 17/021; B60G 2202/12; B60G 2204/61; B60G 2206/93; B25B 13/52;
(Continued)

(56) References Cited

U.S. PATENT DOCUMENTS 740,878 A * 10/1903 Lewis ....................... B66F 3/08
74/156
1,504,847 A * 8/1924 Nicholas ................. B25B 13/02
81/111
(Continued)

FOREIGN PATENT DOCUMENTS

DE 29922402 U1 4/2000

*Primary Examiner* — Robert A. Siconolfi
*Assistant Examiner* — James K Hsiao
(74) *Attorney, Agent, or Firm* — Olav M. Underdal; IDP Patent Services

(57) ABSTRACT

An adjustable shock absorber system includes: a coil over shock absorber with a spring and a lockable adjustment ring; a protective cover assembly, optionally including top and bottom cover portions; a shock adjuster tool with a lever arm and a tool grip portion, including a band assembly, and a tool attachment assembly, including a connector member and a tool member; such that the tool grip portion detachably connects to the peripheral mounting surface of the lockable adjustment ring; whereby the shock adjuster tool can be used to adjust a preload of the coil-over shock absorber. Alternatively, an adjustable shock absorber system includes: a coil-over shock absorber with a spring and an adjustment ring; an adjustment ring assembly, which detachably interlocks with the adjustment ring; and a shock adjuster tool with a lever arm and a tool grip portion, which detachably connects with the adjustment ring assembly.

30 Claims, 36 Drawing Sheets

(52) U.S. Cl.
CPC ...... *B60G 2202/12* (2013.01); *B60G 2204/61* (2013.01); *B60G 2206/93* (2013.01); *F16F 2226/04* (2013.01); *F16F 2228/08* (2013.01); *F16F 2230/0005* (2013.01); *F16F 2230/186* (2013.01)

(58) Field of Classification Search
CPC ......... B25B 13/48; B25B 13/56; B25B 13/50; B25B 13/22; B25B 13/481; B25B 13/28
See application file for complete search history.

(56) References Cited

U.S. PATENT DOCUMENTS

| | | | |
|---|---|---|---|
| 2,574,424 A * | 11/1951 | Szetela | B25B 13/46 81/176.15 |
| 2,810,313 A * | 10/1957 | Hermanson | B25B 13/46 81/DIG. 8 |
| 3,857,307 A | 12/1974 | Hegel | |
| 3,883,116 A | 5/1975 | Buccino | |
| 3,889,558 A | 6/1975 | Duncan | |
| 3,935,630 A | 2/1976 | Roy | |
| 3,953,011 A | 4/1976 | Staehlin et al. | |
| 3,964,151 A | 6/1976 | Thrasher | |
| 4,073,046 A | 2/1978 | Ramsden | |
| 4,252,012 A | 2/1981 | Koepler et al. | |
| 4,474,363 A * | 10/1984 | Numazawa | B60G 15/063 280/124.147 |
| 4,620,360 A | 11/1986 | Morris | |
| 5,044,614 A * | 9/1991 | Rau | B60G 17/021 267/221 |
| 5,044,659 A * | 9/1991 | Specktor | B62D 17/00 280/86.753 |
| 6,131,494 A | 10/2000 | Quenneville | |
| 6,247,564 B1 | 6/2001 | Kim | |
| 6,655,238 B1 * | 12/2003 | Hsien | B25B 13/463 81/58 |
| 6,789,450 B1 * | 9/2004 | Helfet | B25B 13/52 81/3.43 |
| 7,083,176 B2 * | 8/2006 | Soles | B60G 7/02 280/86.751 |
| 9,315,222 B1 * | 4/2016 | Wetter | B60G 9/02 |
| 9,744,826 B2 | 8/2017 | Cox | |
| 2004/0211298 A1 * | 10/2004 | Williams, Sr. | B25B 13/46 81/58 |
| 2014/0041487 A1 * | 2/2014 | Chien | B25B 13/04 81/60 |
| 2016/0046006 A1 | 2/2016 | Yang | |
| 2016/0235200 A1 * | 8/2016 | De Bruin | B25B 13/46 |
| 2019/0248440 A1 * | 8/2019 | Winefordner | B62K 25/04 |
| 2020/0377168 A1 * | 12/2020 | Kubotera | B62K 25/283 |
| 2021/0114189 A1 | 4/2021 | Miller | |

* cited by examiner

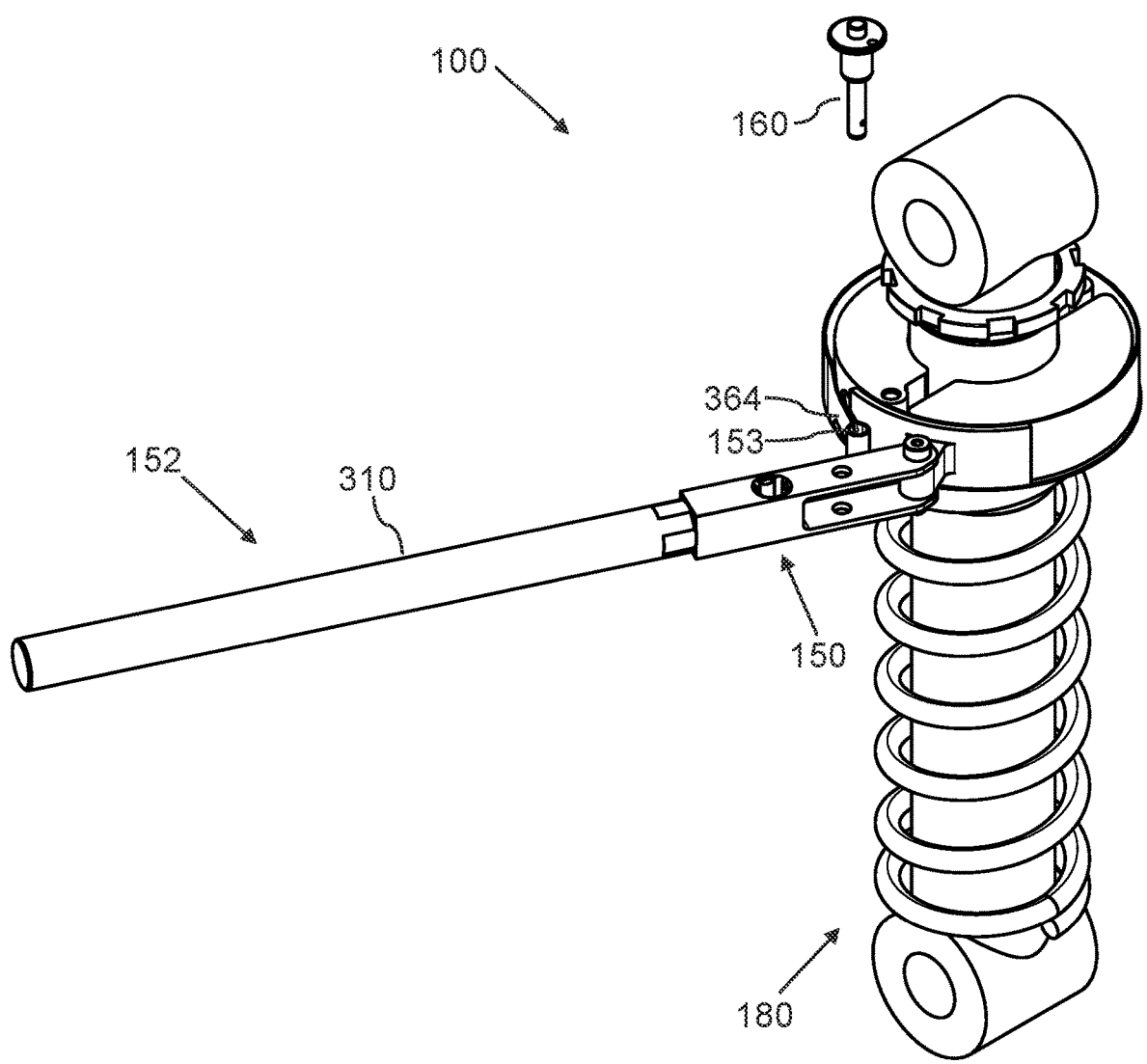

FIG. 7D
FIG. 7E
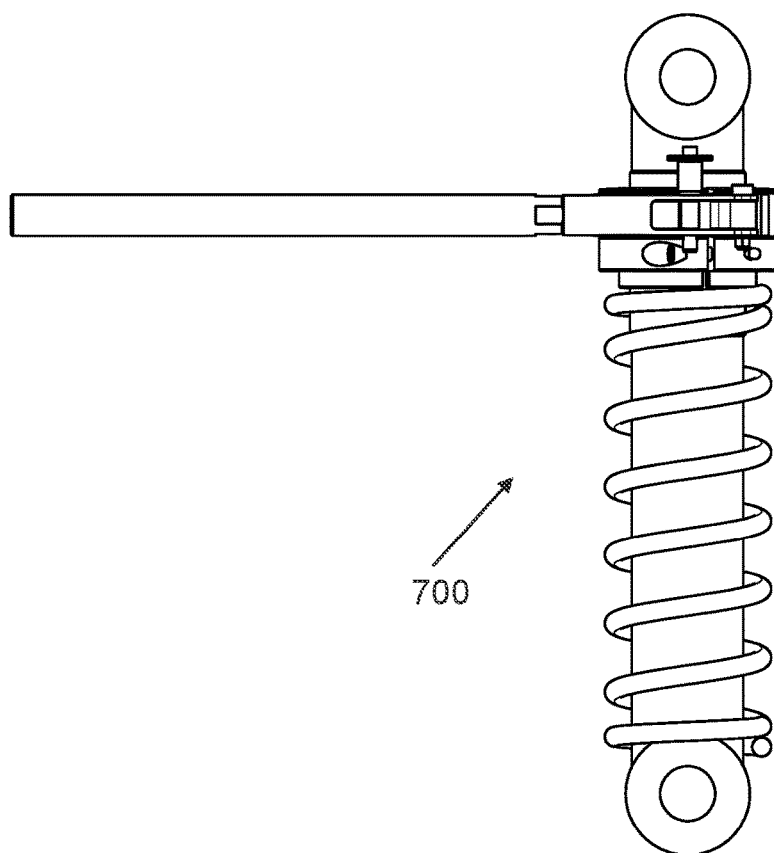
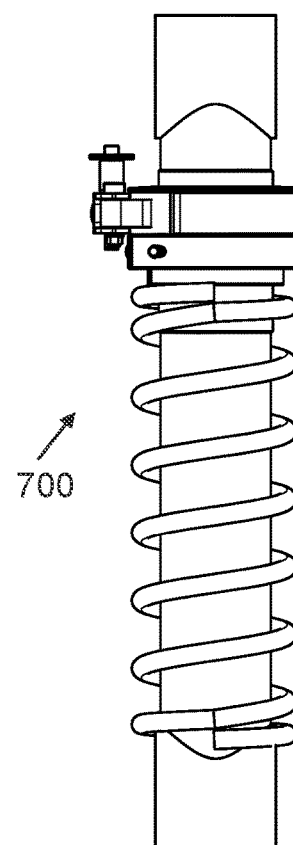
FIG. 7F
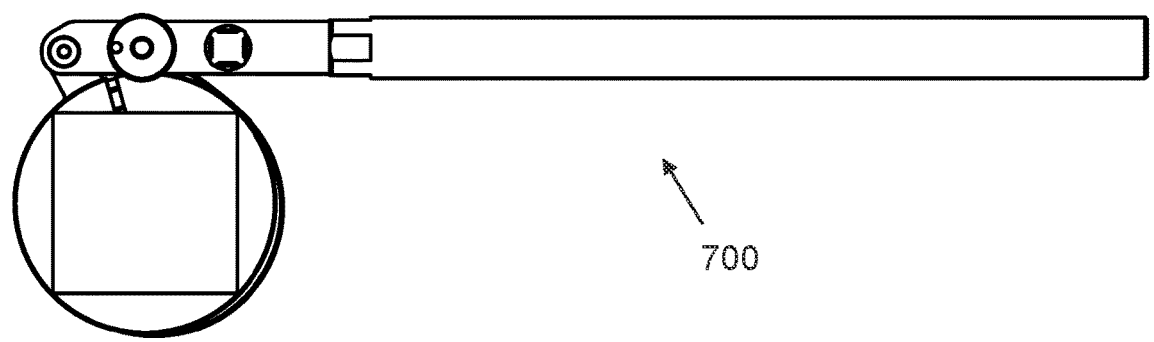

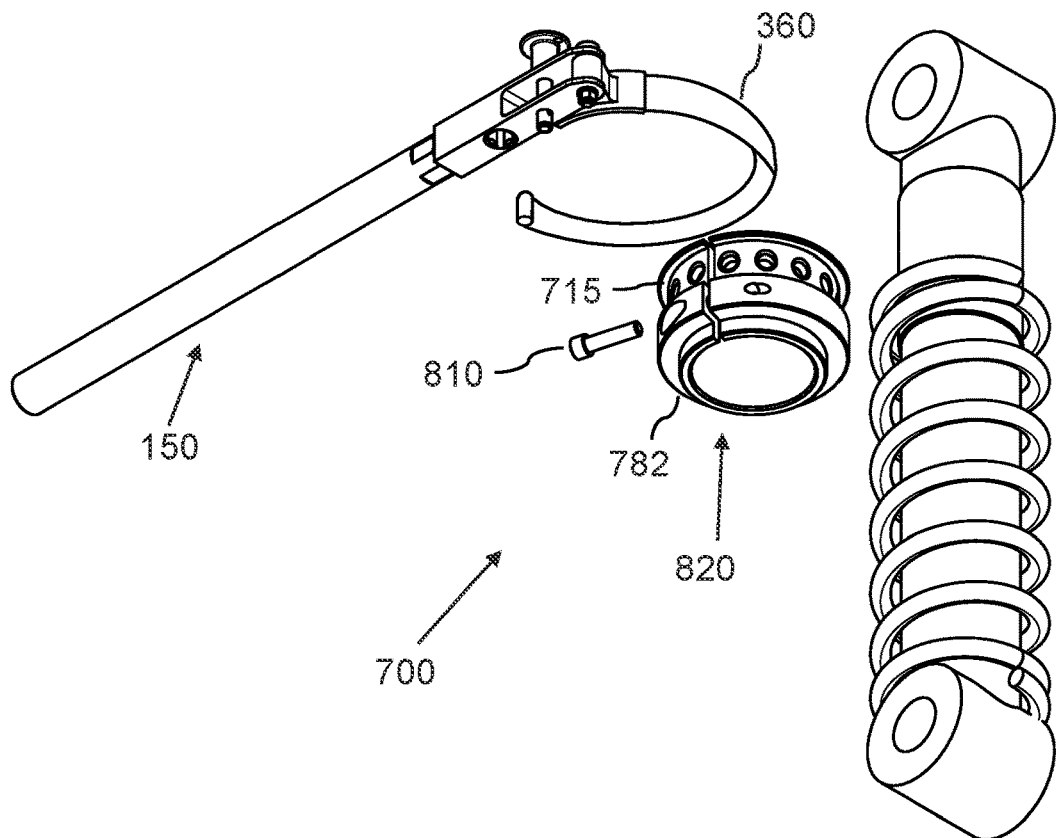
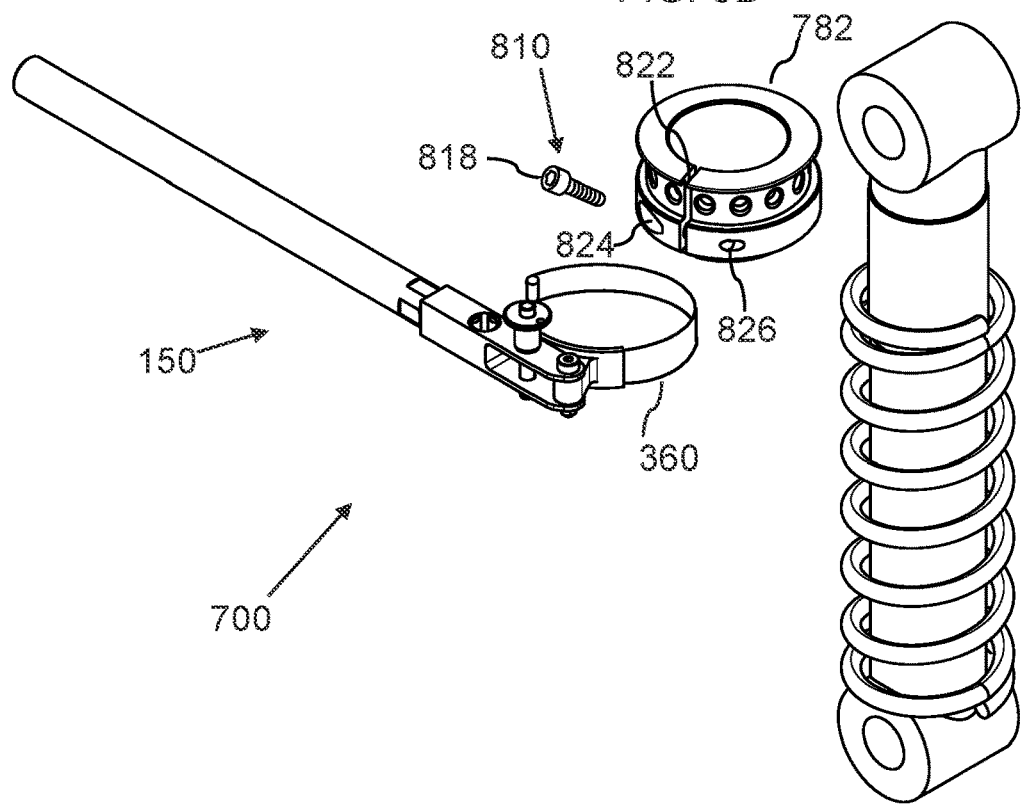

FIG. 14D
FIG. 14E
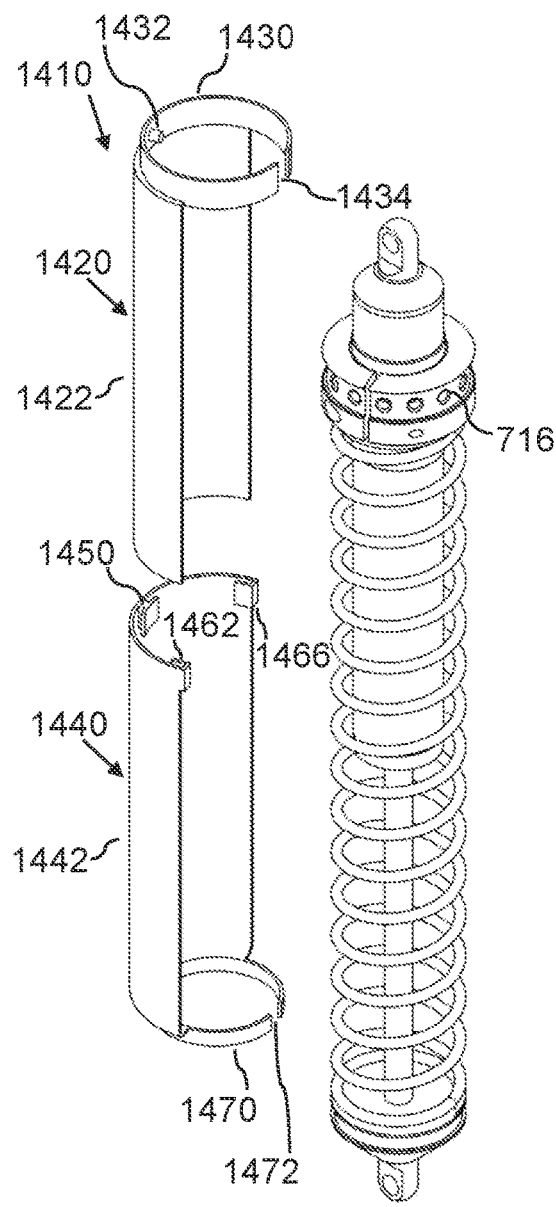
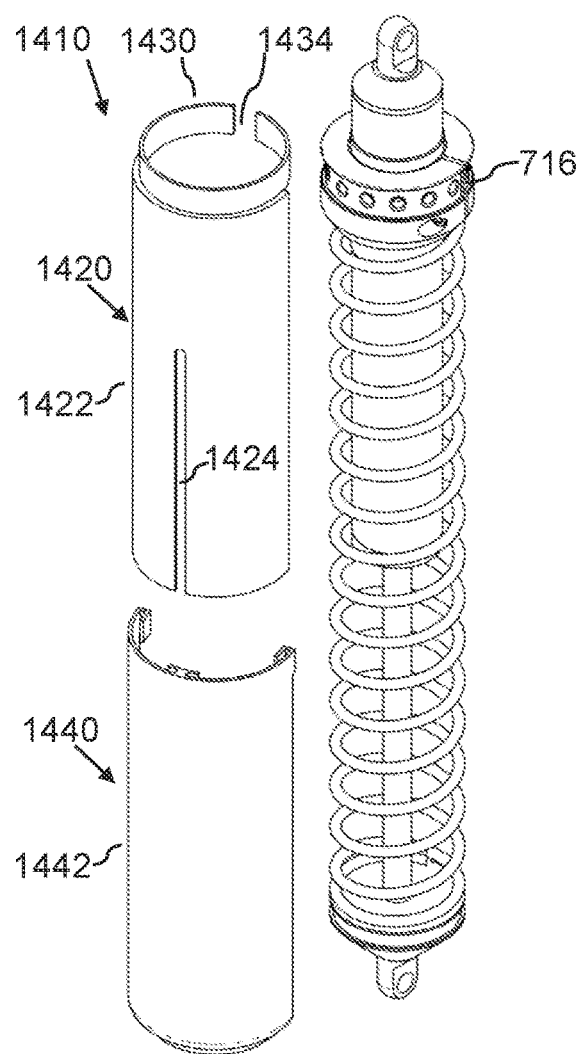

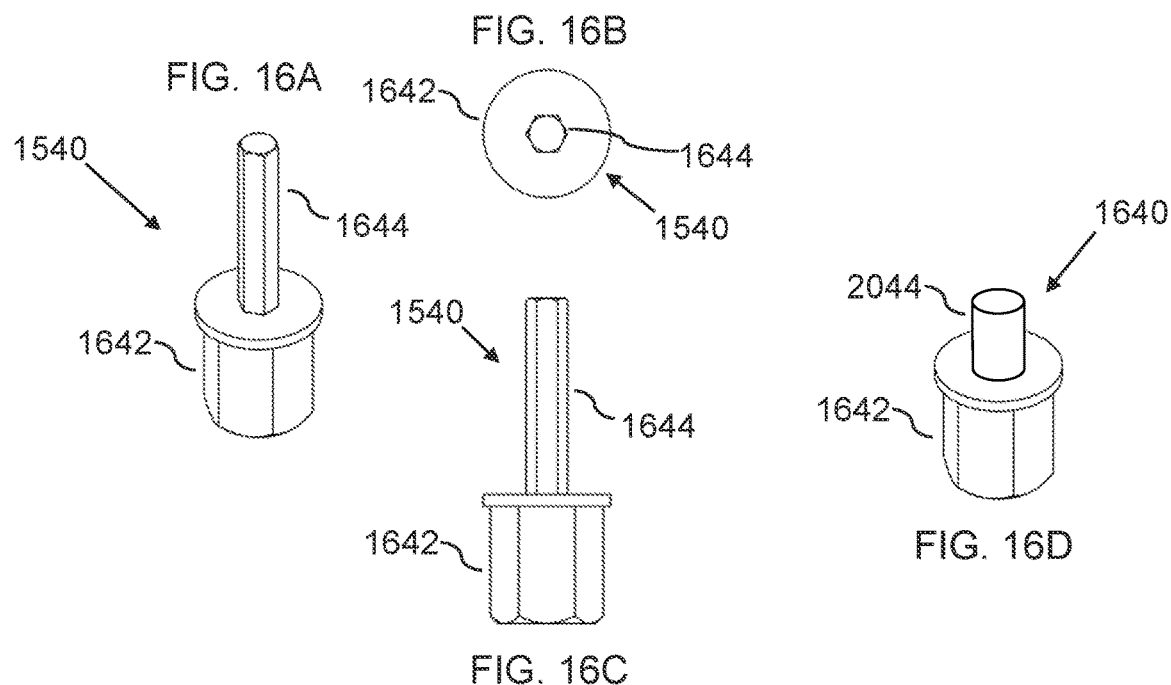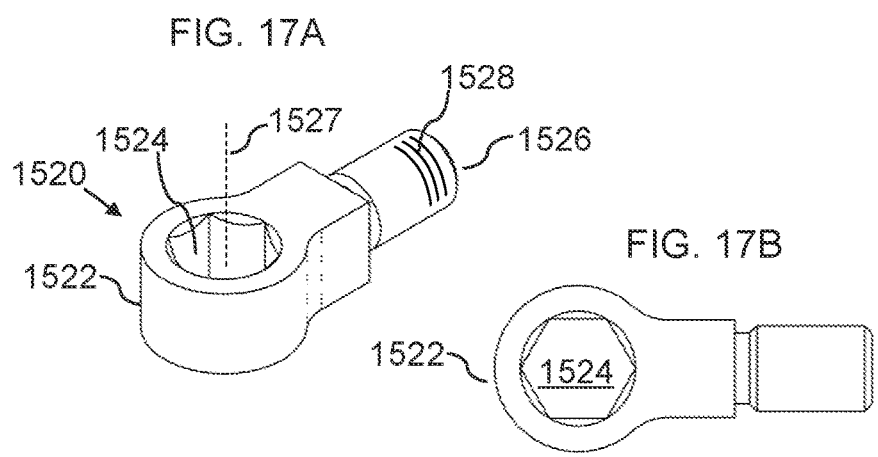

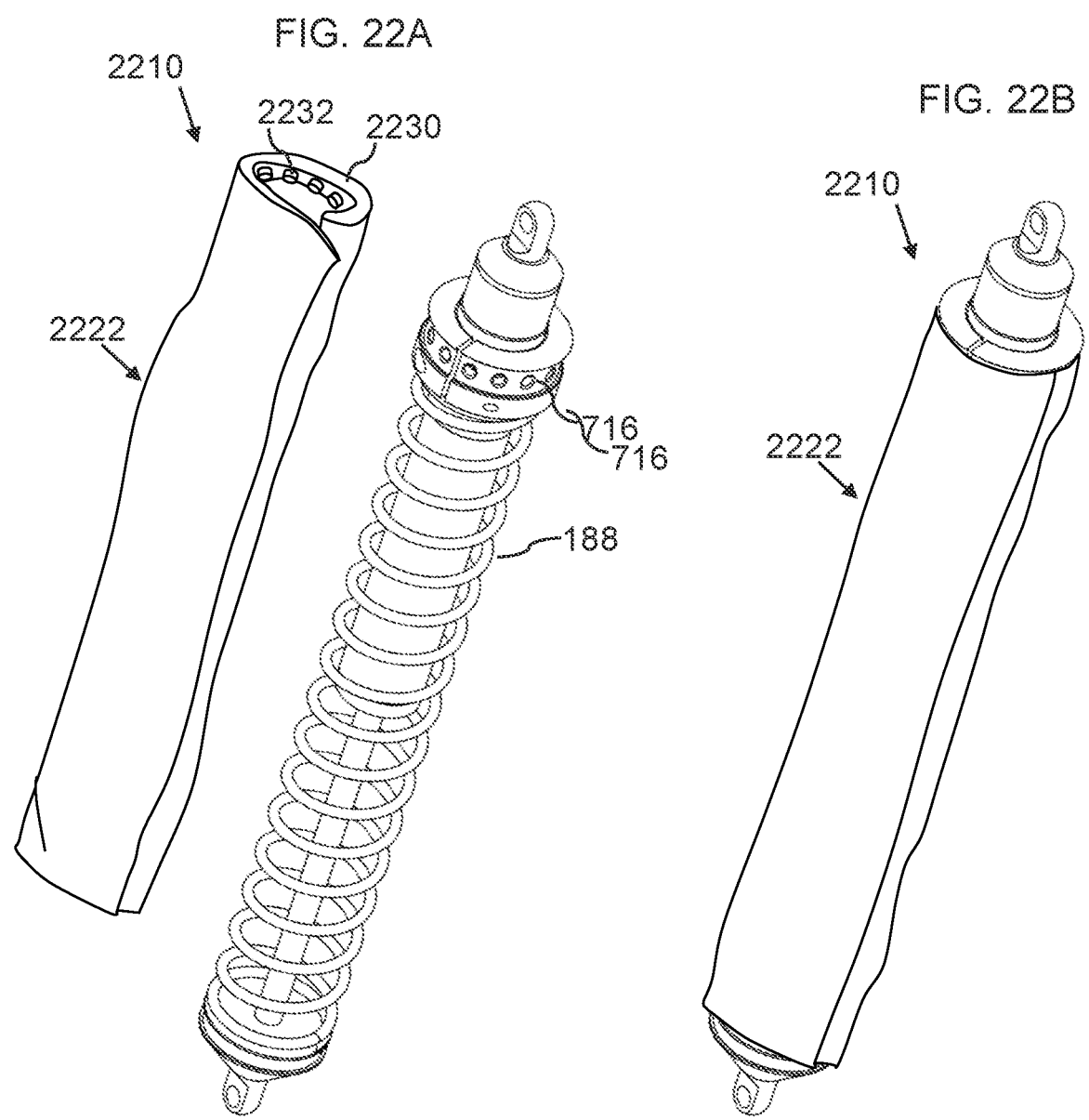

ADJUSTABLE SHOCK ABSORBER SYSTEM AND DEVICE

CROSS-REFERENCE TO RELATED APPLICATIONS

This application claims the benefit of U.S. Provisional Application No. 63/286,777, filed Dec. 7, 2021; and claims the benefit of U.S. Provisional Application No. 63/272,099, filed Oct. 26, 2021; both of which are hereby incorporated herein by reference in their entirety.

FIELD OF THE INVENTION

The present invention relates generally to the field of shock absorber systems, and more particularly to methods and systems for adjustable shock absorbers.

BACKGROUND OF THE INVENTION

On a coil-over shock absorber, the coil spring preload can be adjusted. Given typical large static spring rate of a coil spring, to adjust coil spring preload, the coil-over shock's adjustment ring cannot be raised or lowered on the shock body using bare hands. Current methods used to rotate the adjustment ring on its threads include a spanner wrench, pin punch, drift with hammer, chisel with hammer, or even slip-joint pliers.

Current methods used to adjust coil spring preload are crude and inefficient. Automotive service centers typically employ several methods of adjusting coil spring preload, while the spring is attached to a coil over shock absorber and the shock absorber is installed on a chassis or structure. Such common approaches include:
   a) a spanner wrench placed tangentially to the adjuster nut tab, followed by the application of a force on the spanner wrench causing turning torque;
   b) attachment of a punch, drift, or chisel placed laterally to the adjuster nut surface, followed by a hammer strike on the drift to create a turning force input causing turning torque;
   c) using an open jaw slip-joint plier placed around the adjuster nut to grab the adjuster nut tabs, followed by the application of a force on the slip-joint plier causing turning torque; or
   d) attachment of a pin punch, placed laterally in to an aperture on the adjuster nut surface, followed by a hand force applied tangentially on the pin punch to create a turning force input causing turning torque.

As such, considering the foregoing, it may be appreciated that there continues to be a need for novel and improved devices and methods for adjustable shock absorbers.

SUMMARY OF THE INVENTION

The foregoing needs are met, to a great extent, by the present invention, wherein in aspects of this invention, enhancements are provided to the existing model of adjustable shock absorbers.

In an aspect, an adjustable shock absorber system can include:
   a) a coil-over shock absorber, which can include:
      i. a spring;
      ii. an adjustment ring, which can adjust a preload of the spring; and
      iii. a lock ring, which can lock the adjustment ring in position;
   b) an adjustment ring assembly, which can detachably interlock with the adjustment ring of the coil-over shock absorber, such that a rotation of the adjustment ring assembly causes a rotation of the adjustment ring, wherein the adjustment ring assembly can include:
      i. A first adjustment ring member, which comprises a first peripheral surface; and
      ii. A second adjustment ring member, which comprises a second peripheral surface;
      wherein the left adjustment ring member and the right adjustment ring member can be mounted around the adjustment ring of the coil-over shock absorber, such that the left adjustment ring member and the right adjustment ring member are detachably interlocked;
      such that the adjustment ring assembly can interlock with the adjustment ring, such that a rotation of the adjustment ring assembly causes a rotation of the adjustment ring; and
   c) a shock adjuster tool, which can include:
      i. a lever arm;
      ii. a tool grip portion, which is connected to an inner end of the lever arm,
      wherein the tool grip portion is configured to detachably connect to the adjustment ring assembly.

In another aspect, an adjustable shock absorber system can include:
   a) a coil-over shock absorber, which can include:
      i. a spring; and
      ii. a lockable adjustment ring, which is configured to rotatably adjust a preload of the spring of the coil-over shock absorber, wherein the lockable adjustment ring can include:
         1) a peripheral mounting surface; and
   b) a shock adjuster tool, which can include:
      i. a lever arm; and
      ii. a tool grip portion, which is connected to an inner end of the lever arm;
      wherein the tool grip portion is configured to detachably connect to the peripheral mounting surface of the lockable adjustment ring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1C is a top perspective view of an adjustable shock absorber system, with a dual-part mounting ring attached, and a shock adjuster tool mounted, such that a detachable pin is removed, according to an embodiment of the invention.

FIG. 7D is a front view of an adjustable shock absorber system, according to the embodiment shown in FIG. 7A.

FIG. 7E is a side view of an adjustable shock absorber system, according to the embodiment shown in FIG. 7A.

FIG. 7F is a top view of an adjustable shock absorber system, according to the embodiment shown in FIG. 7A.

FIG. 8A is an exploded bottom perspective view of an adjustable shock absorber system, according to the embodiment shown in FIG. 7A.

FIG. 8B is an exploded top perspective view of an adjustable shock absorber system, according to the embodiment shown in FIG. 7A.

FIG. 14D is a top front perspective view of an adjustable shock absorber system with the protective cover assembly detached, according to the embodiment shown in FIG. 14A.

FIG. 14E is a top rear perspective view of an adjustable shock absorber system with the protective cover assembly detached, according to the embodiment shown in FIG. 14A.

FIG. 16A is a perspective view of a hexagonal wrench tool portion, according to an embodiment of the invention.

FIG. 16B is a front view of a hexagonal wrench tool portion, according to an embodiment of the invention.

FIG. 16C is a side view of a hexagonal wrench tool portion, according to an embodiment of the invention.

FIG. 16D is a perspective view of a pin wrench tool portion, according to an embodiment of the invention.

FIG. 17A is a perspective view of a tool connector portion, according to an embodiment of the invention.

FIG. 17B is a top view of a tool connector portion, according to an embodiment of the invention.

FIG. 17C is a front view of a tool connector portion, according to an embodiment of the invention.

FIG. 17D is a side view of a tool connector portion, according to an embodiment of the invention.

FIG. 22A is a top perspective view of an adjustable shock absorber system with a flexible protective cover assembly detached, according to the embodiment shown in FIG. 14A.

FIG. 22B is a top perspective view of an adjustable shock absorber system with the flexible protective cover assembly mounted, according to an embodiment of the invention.

DETAILED DESCRIPTION

Figure 1A:
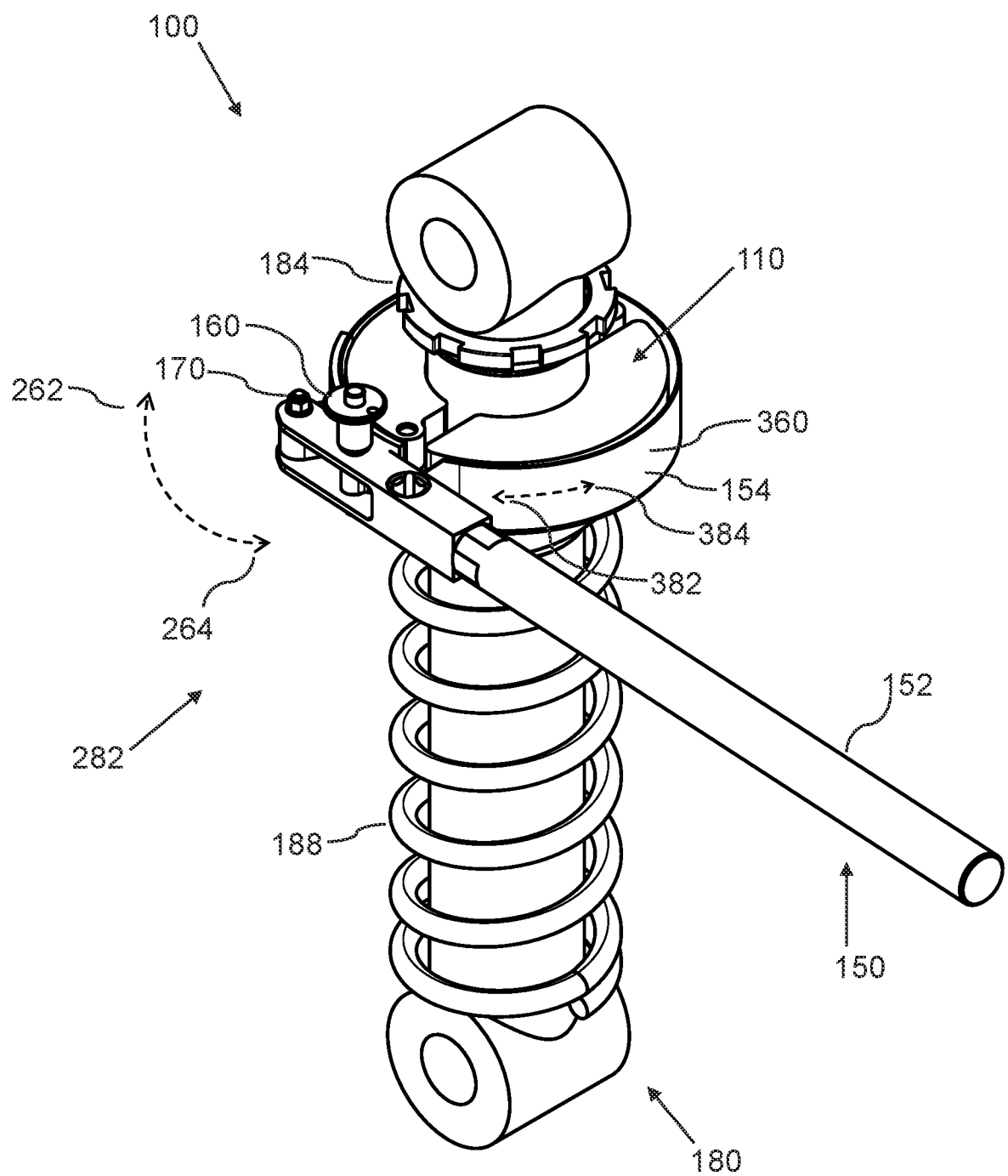
FIG. 1A is a top perspective view of an adjustable shock absorber system, with a dual-part mounting ring attached, and a shock adjuster tool mounted, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of an adjustable shock absorber system 100 with reference to FIG. 1A, in such manner that like reference numerals refer to like components throughout; a convention that we shall employ for the remainder of this specification.

Figure 1B:
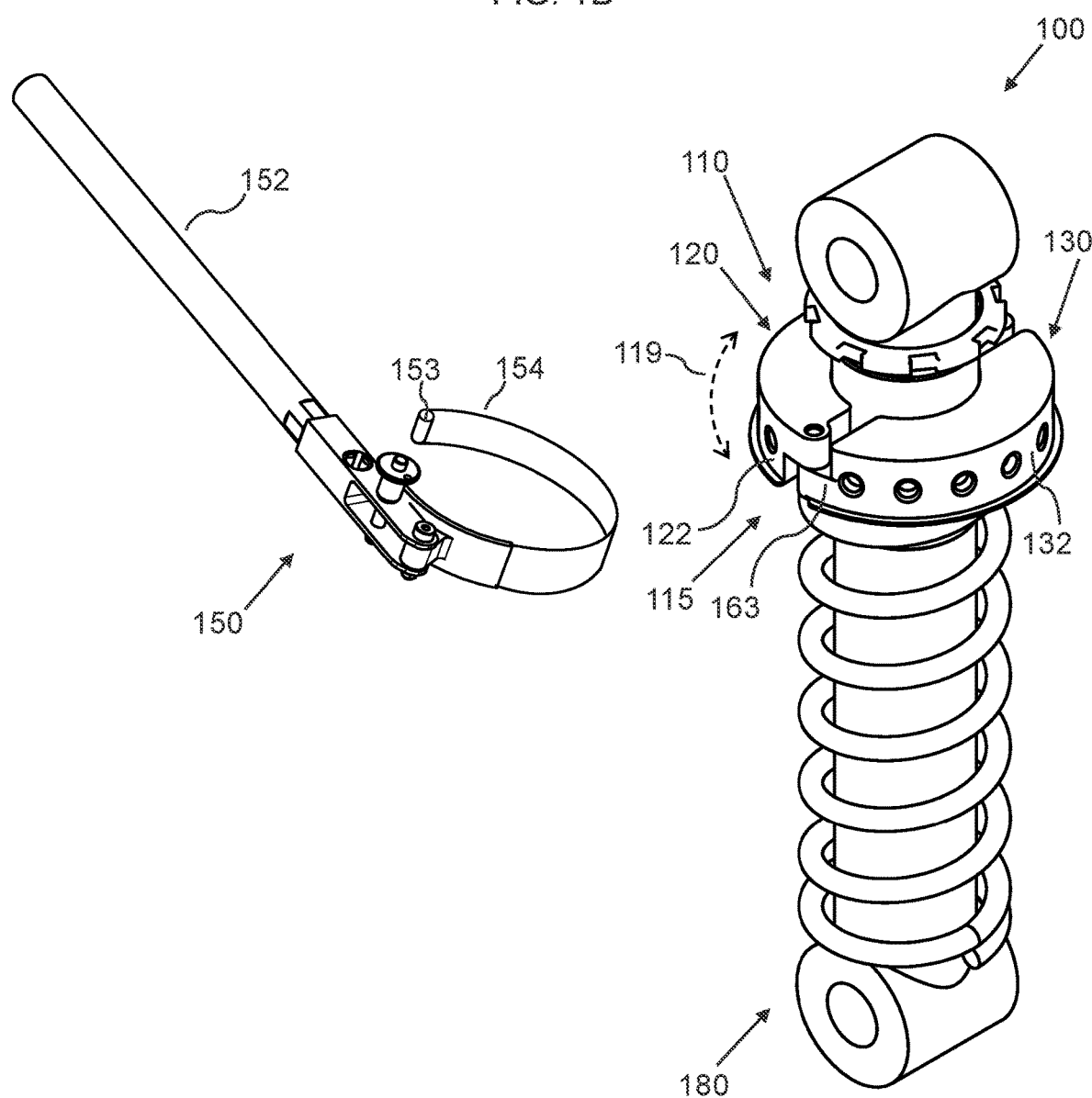
FIG. 1B is a top perspective view of an adjustable shock absorber system, with a dual-part mounting ring attached, and a shock adjuster tool removed from the dual-part mounting ring, according to an embodiment of the invention.
Figure 2A:
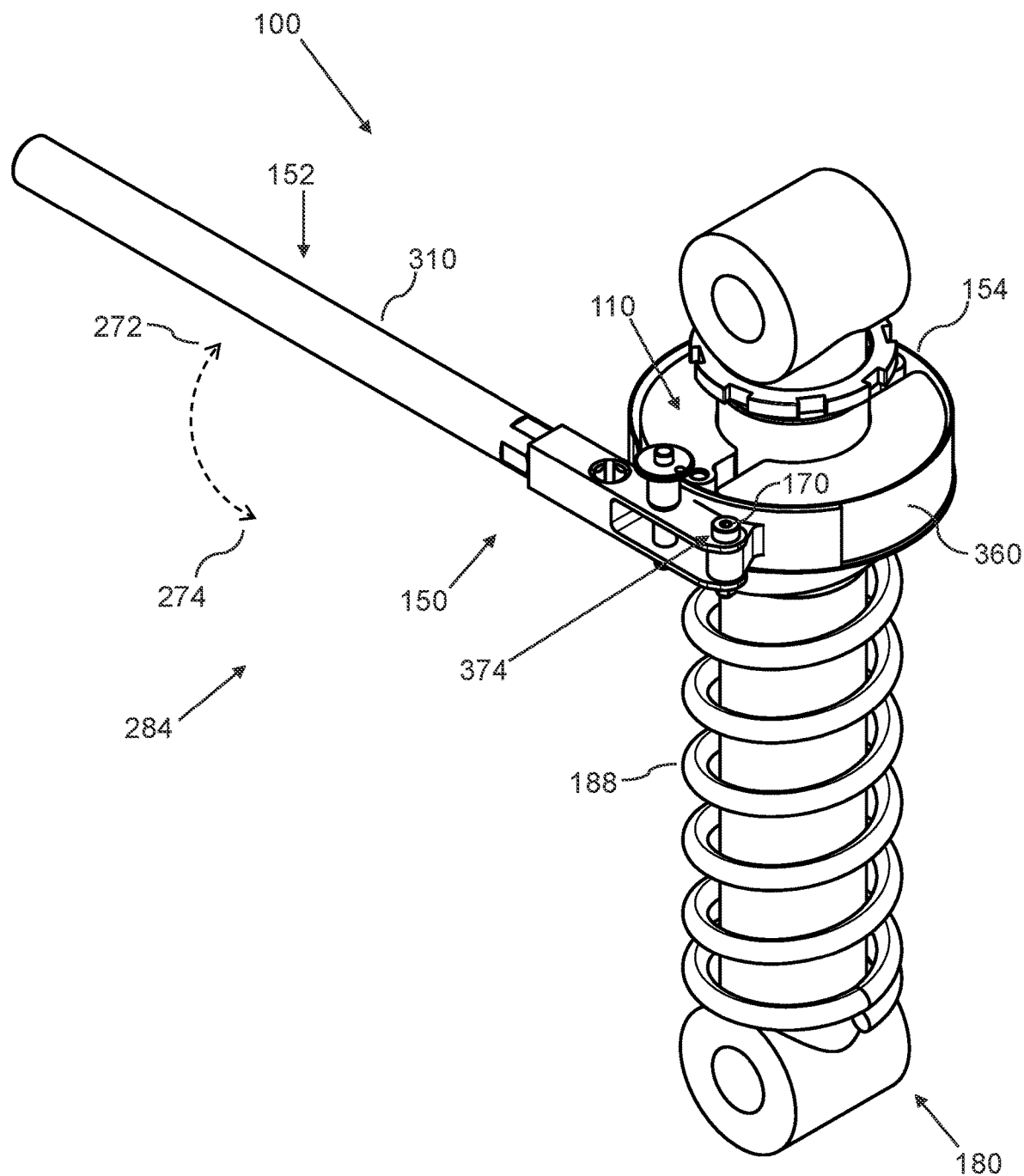
FIG. 2A is a top perspective view of an adjustable shock absorber system, according to the embodiment shown in FIG. 1A.
Figure 2B:
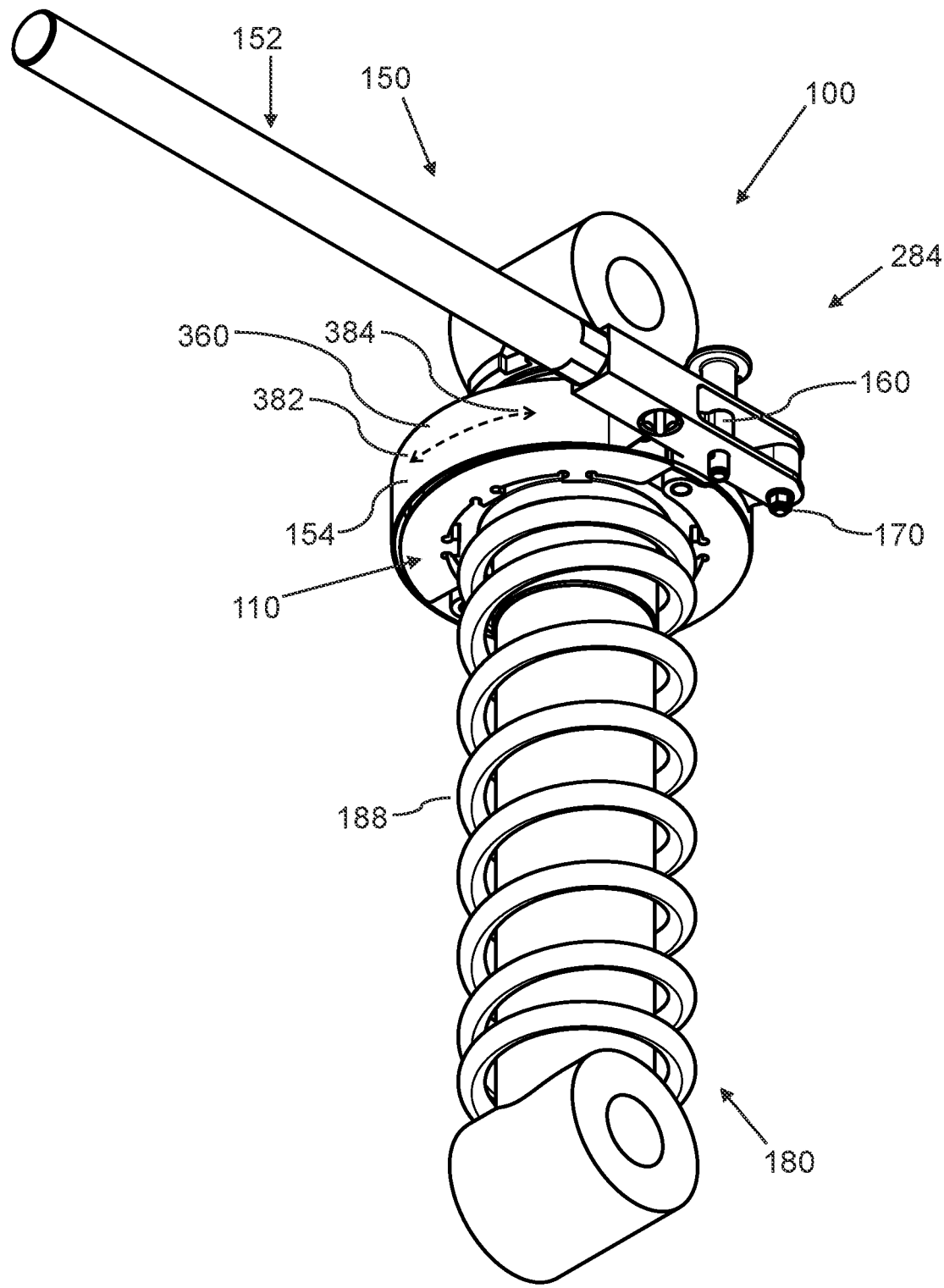
FIG. 2B is a bottom perspective view of an adjustable shock absorber system, according to the embodiment shown in FIG. 1A.
Figure 2C:
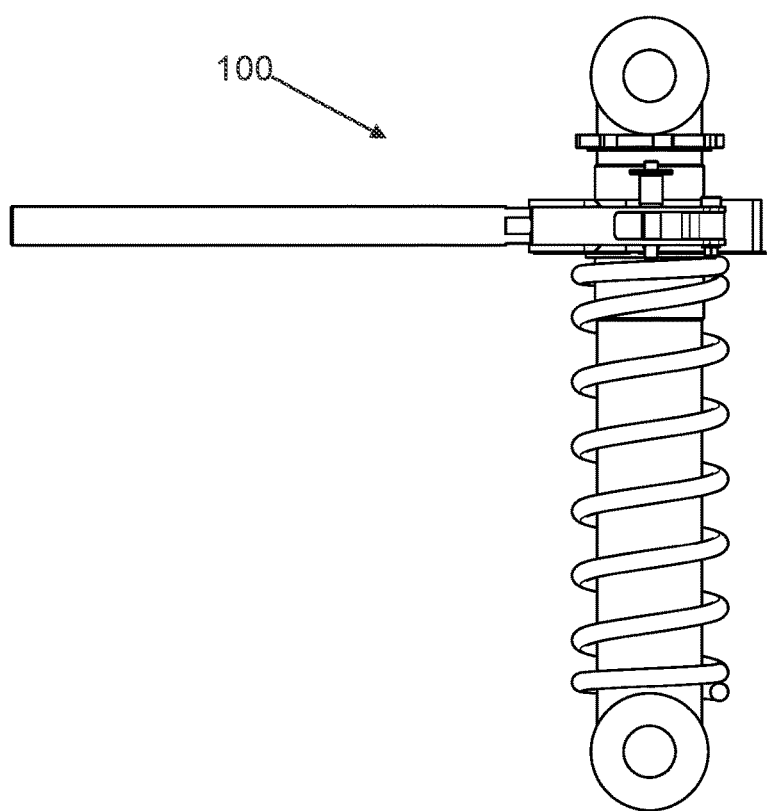
FIG. 2C is a front view of an adjustable shock absorber system, according to the embodiment shown in FIG. 1A.
Figure 2D:
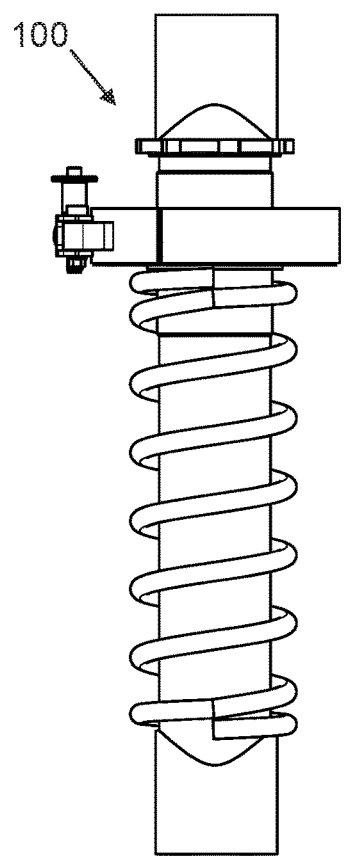
FIG. 2D is a side view of an adjustable shock absorber system, according to the embodiment shown in FIG. 1A.
Figure 2E:
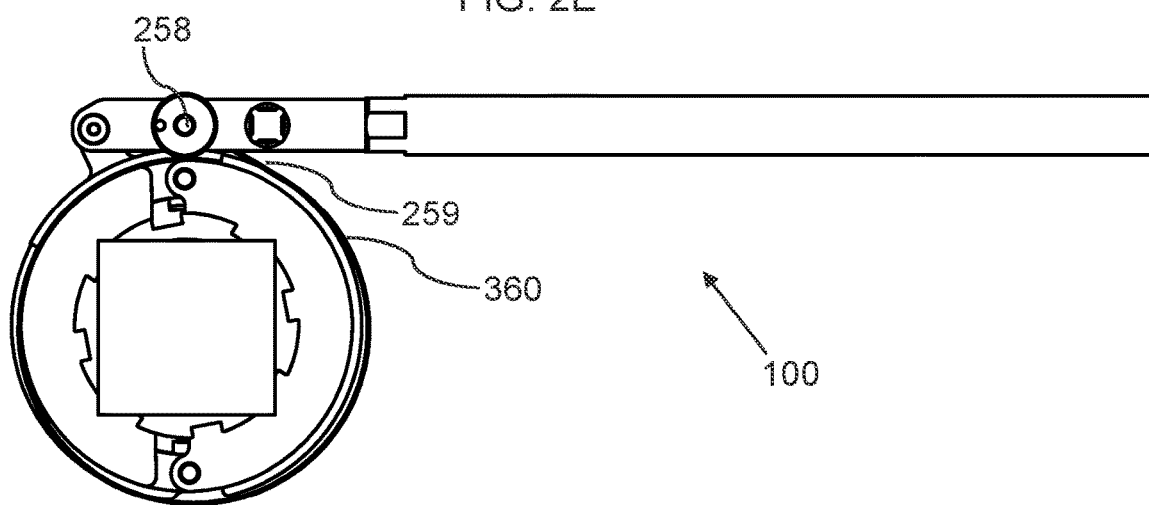
FIG. 2E is a top view of an adjustable shock absorber system, according to the embodiment shown in FIG. 1A.
Figure 3A:
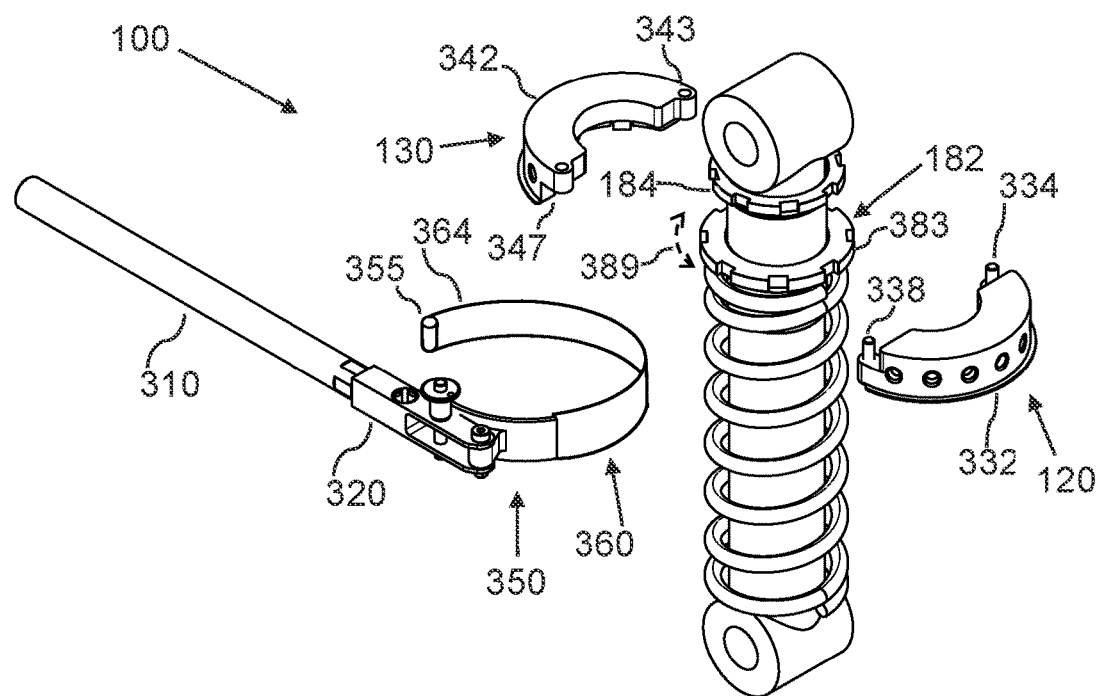
FIG. 3A is an exploded top perspective view of an adjustable shock absorber system, according to the embodiment shown in FIG. 1A.

In an embodiment, as shown in FIGS. 1A-1C, 2A-2E, 3A-3B, 4A-4E, 5A-5E, and 6A-6B, an adjustable shock absorber system 100 can include:
  a) a coil-over shock absorber 180, which can include:
    i. a spring 188;
    ii. an adjustment ring 182, which is configured to rotatably adjust a preload of the spring 188 of the coil-over shock absorber 180; and
    iii. a lock ring 184, which is configured to lock the adjustment ring 182 in position;
  b) an adjustment ring assembly 110, wherein the adjustment ring assembly 110 further comprises a peripheral mounting surface 115, wherein the adjustment ring assembly 110 is configured to detachably interlock with the adjustment ring 182 of the coil-over shock absorber 180, such that a rotation 119 of the adjustment ring assembly 110 causes a rotation 389 of the adjustment ring 182, as shown FIGS. 1B and 3A, such that the rotation 389 adjusts the preload of the spring 188, wherein the adjustment ring assembly 110 can include:
    i. a right/first adjustment ring member 120, which comprises a first peripheral surface 122; and
    ii. a left/second adjustment ring member 130, which comprises a second peripheral surface 132;
    wherein the right adjustment ring member 120 and the left adjustment ring member 130 are configured to be mounted around the adjustment ring of the coil-over shock absorber, such that the right adjustment ring member 120 and the left adjustment ring member 130 are detachably interlocked;
    such that the first peripheral surface 122 and the second peripheral surface 132, form a peripheral mounting surface 115, which substantially encircles the adjustment ring assembly 110 (with gaps and holes), when the first peripheral surface 122 and the second peripheral surface 132 are mounted on the adjustment ring assembly 110;
    such that the adjustment ring assembly 110 interlocks with the adjustment ring 182 of the coil-over shock absorber 180, such that a rotation 119 of the adjustment ring assembly 110 causes a rotation 389 of the adjustment ring 182, as shown FIGS. 1B and 3A; and c) a shock adjuster tool 150, which can include:
  i. a lever arm 152;
  ii. a tool grip portion 154, which is connected to an inner end of the lever arm 152,
wherein the tool grip portion 154 is configured to detachably connect to the adjustment ring assembly 110;
such that a first clockwise rotation 262 of the shock adjuster tool 150, when the tool grip portion 154 is connected to the adjustment ring assembly 110 in a first orientation 282 wherein an inner end of the lever arm 152 of the shock adjuster tool 150 is pointing in a clockwise direction 262, causes a frictional grip between the tool grip portion 154 and the adjustment ring assembly 110 to tighten, such that the first clockwise rotation 262 of the shock adjuster tool 150 causes the adjustment ring 182 of the coil-over shock absorber 180 to tighten, thereby increasing a preload of the spring 188 of the coil-over shock absorber 180;
such that a first anti-clockwise rotation 264 of the shock adjuster tool 150, when the tool grip portion 154 is connected to the adjustment ring assembly 110 in the first orientation 282, causes the frictional grip between the tool grip portion 154 and the adjustment ring assembly 110 to loosen, such that the first anti-clockwise rotation 264 of the shock adjuster tool 150 causes a repositioning of the shock adjuster tool 150, to allow space for a repeated clockwise rotation 262 of the shock adjuster tool 150, to allow for further tightening of the adjustment ring 182;
such that a second anti-clockwise rotation 274 of the shock adjuster tool 150, when the tool grip portion 154 is connected to the adjustment ring assembly 110 in a second orientation 284 wherein an inner end of the lever arm 152 of the shock adjuster tool 150 is pointing in an anti-clockwise direction 274, causes a frictional grip between the tool grip portion 154 and the adjustment ring assembly 110 to tighten, such that the anti-clockwise rotation of the shock adjuster tool 150 causes the adjustment ring 182 of the coil-over shock absorber 180 to loosen, thereby decreasing a preload of the spring 188 of the coil-over shock absorber 180;
such that a second clockwise rotation 272 of the shock adjuster tool 150, when the tool grip portion 154 is connected to the adjustment ring assembly 110 in the second orientation 284, causes the frictional grip between the tool grip portion 154 and the adjustment ring assembly 110 to loosen, such that the clockwise rotation of the shock adjuster tool 150 causes a repositioning of the shock adjuster tool 150, to allow space for a repeated anti-clockwise rotation of the shock adjuster tool 150, to allow for further loosening of the adjustment ring 182.

In a related embodiment, the tool grip portion 154 can further include:

a) a band assembly 350, which can include:
  i. an elongated band 360, which is configured to detachably wrap around the adjustment ring assembly, wherein the elongated band 360 further comprises:
    1. a vertical band aperture 153 in an outermost portion 355 of a second end 364 of the elongated band 360.

In a further related embodiment, the elongated band 360 can be made of a metal or metal alloy.

Figure 3B:
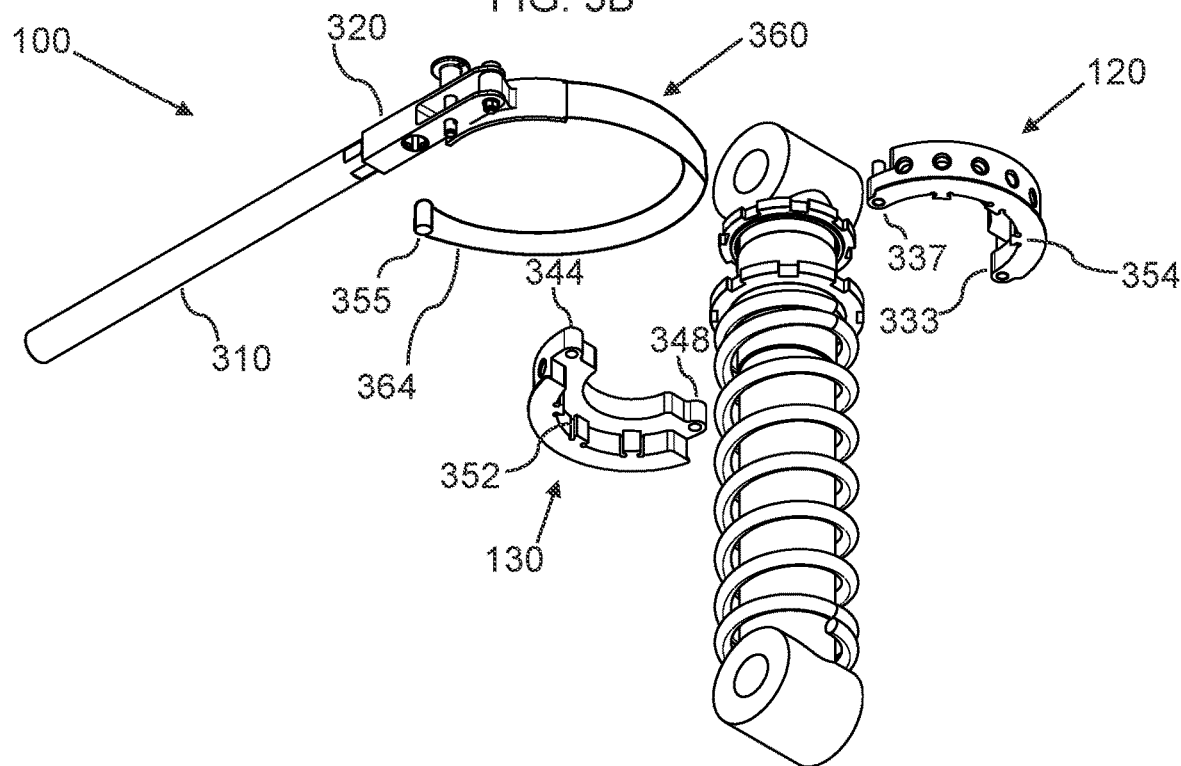
FIG. 3B is an exploded bottom perspective view of an adjustable shock absorber system, according to the embodiment shown in FIG. 1A.
Figure 4A:
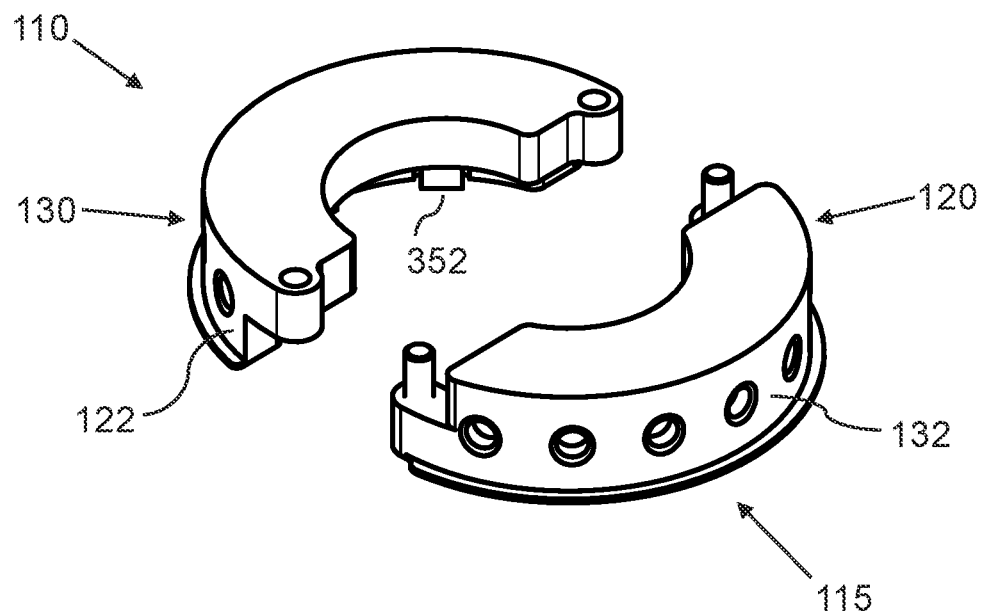
FIG. 4A is a top perspective view of a disassembled adjustment ring assembly, according to an embodiment of the invention.
Figure 4B:
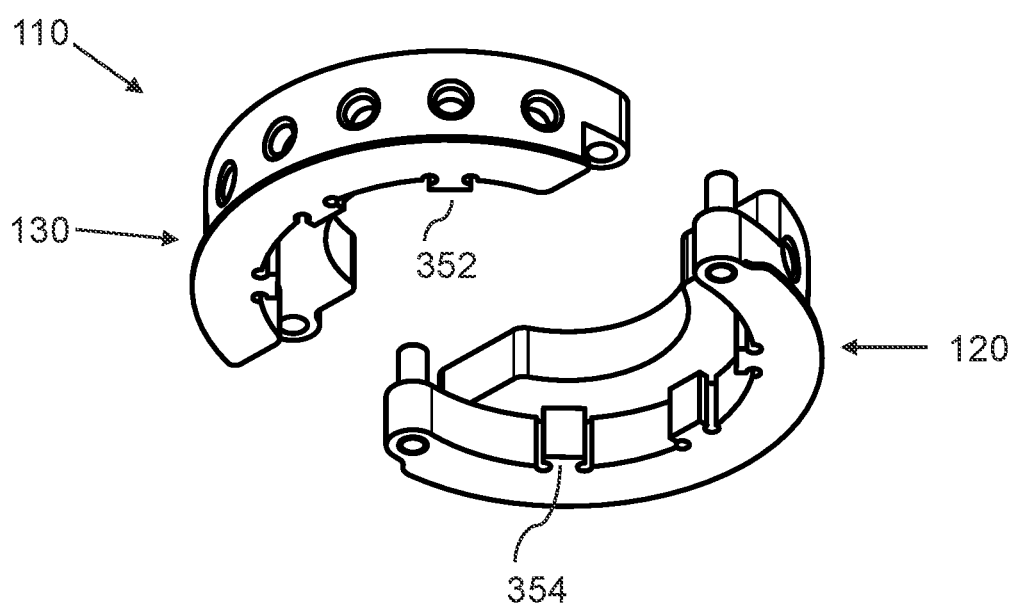
FIG. 4B is a bottom perspective view of a disassembled adjustment ring assembly, according to an embodiment of the invention.
Figure 4C:
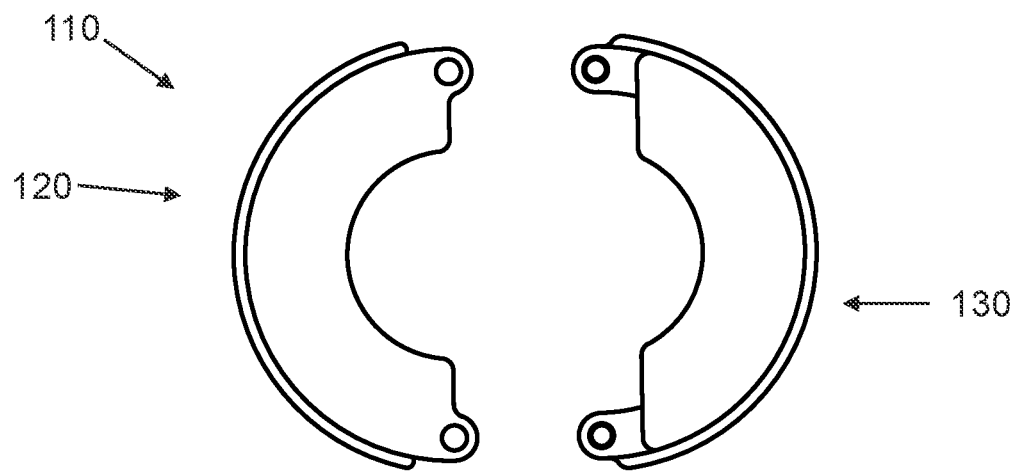
FIG. 4C is a top view of a disassembled adjustment ring assembly, according to an embodiment of the invention.
Figure 4D:
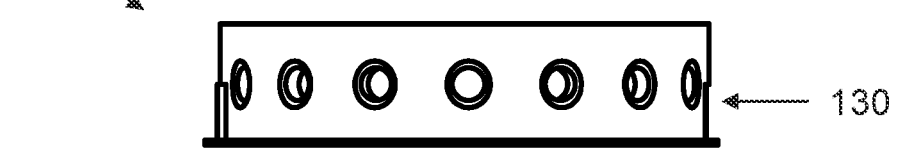
FIG. 4D is a side view of a disassembled adjustment ring assembly, according to an embodiment of the invention.
Figure 4E:
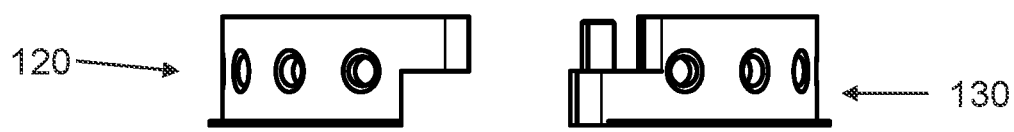
FIG. 4E is a front view of a disassembled adjustment ring assembly, according to an embodiment of the invention.
Figure 6A:
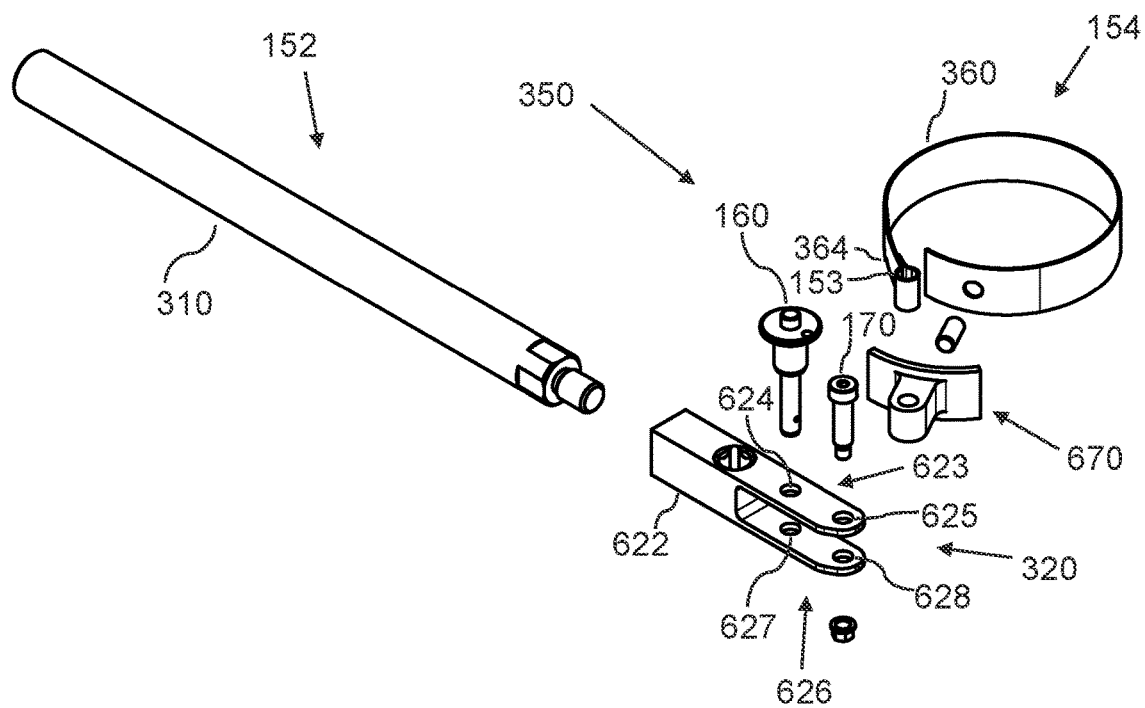
FIG. 6A is a top exploded perspective view of a shock adjuster tool, according to an embodiment of the invention.
Figure 6B:
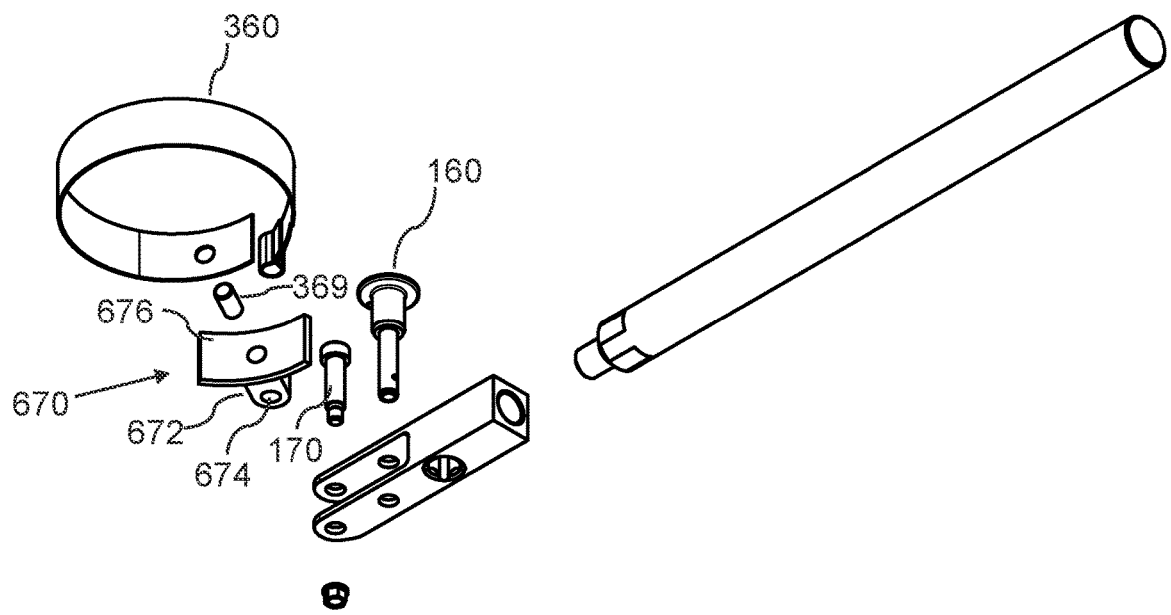
FIG. 6B is a bottom exploded perspective view of a shock adjuster tool, according to an embodiment of the invention.

In a related embodiment, as shown in FIGS. 6A and 6B, the lever arm 152 can further include:

a) a lever shaft 310; and
b) a connector member 320, such that an outer end of the connector member 320 is connected to the lever shaft 310, and such that an inner end of the connector member 320 is connected to the tool grip portion 154;
wherein the connector member 320 can include:
  i. a connector body 622, such that an outer end of the connector body 622 is connected to the lever shaft 310;
  ii. an upper flange 623, which protrudes from an inner top end of the connector body 622, wherein the upper flange 623, includes:
    1. a rear upper flange aperture 624;
    2. a front upper flange aperture 625; and
  iii. a lower flange 626, which protrudes from an inner bottom end of the connector body 622, below the upper flange 623, wherein the lower flange 626, includes:
    1. a rear lower flange aperture 627;
    2. a front lower flange aperture 628;
wherein the tool grip portion further comprises a detachable pin 160;
such that the outermost portion 355 of the second end 364 of the elongated band 360, as shown in FIGS. 3A and 3B, is positioned between the upper flange 623 and the lower flange 626, such that the rear upper flange aperture 624, the vertical band aperture 153, and the rear lower flange aperture 627 are aligned;
such that the detachable pin 160 is insertable and can protrude through (i.e., protrudes through) the rear upper flange aperture 624, the vertical band aperture 153, and the rear lower flange aperture 627, to detachably and pivotably connect the second end 364 of the elongated band 360 to the connector member 320.

Figure 5A:
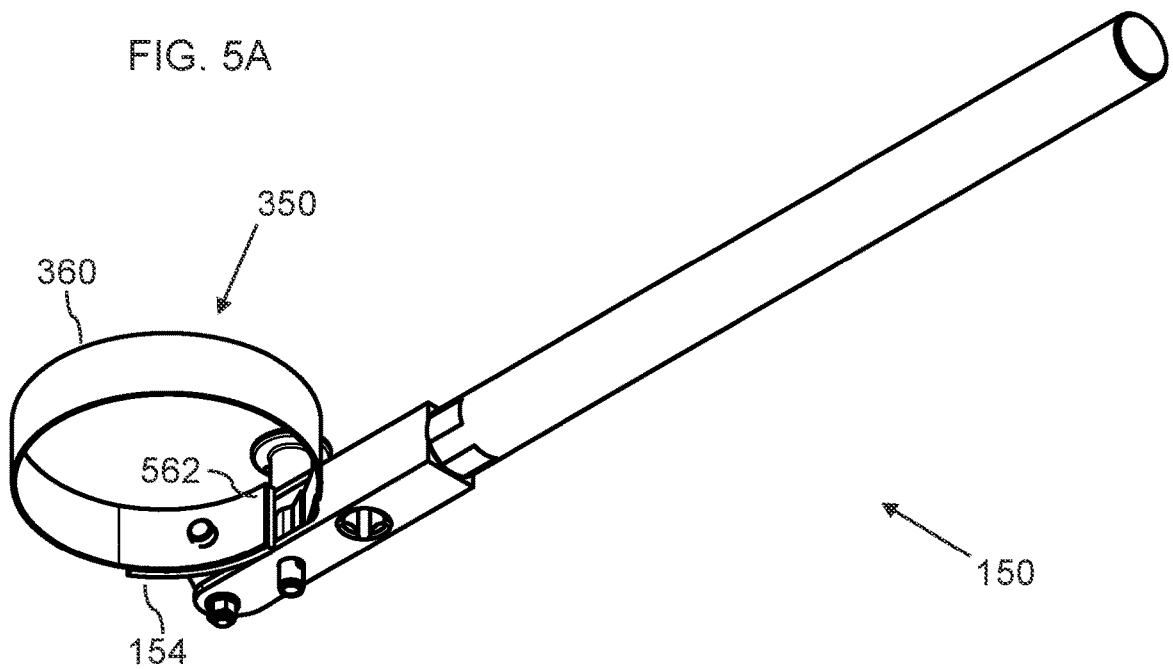
FIG. 5A is a bottom perspective view of a shock adjuster tool, according to an embodiment of the invention.
Figure 5B:
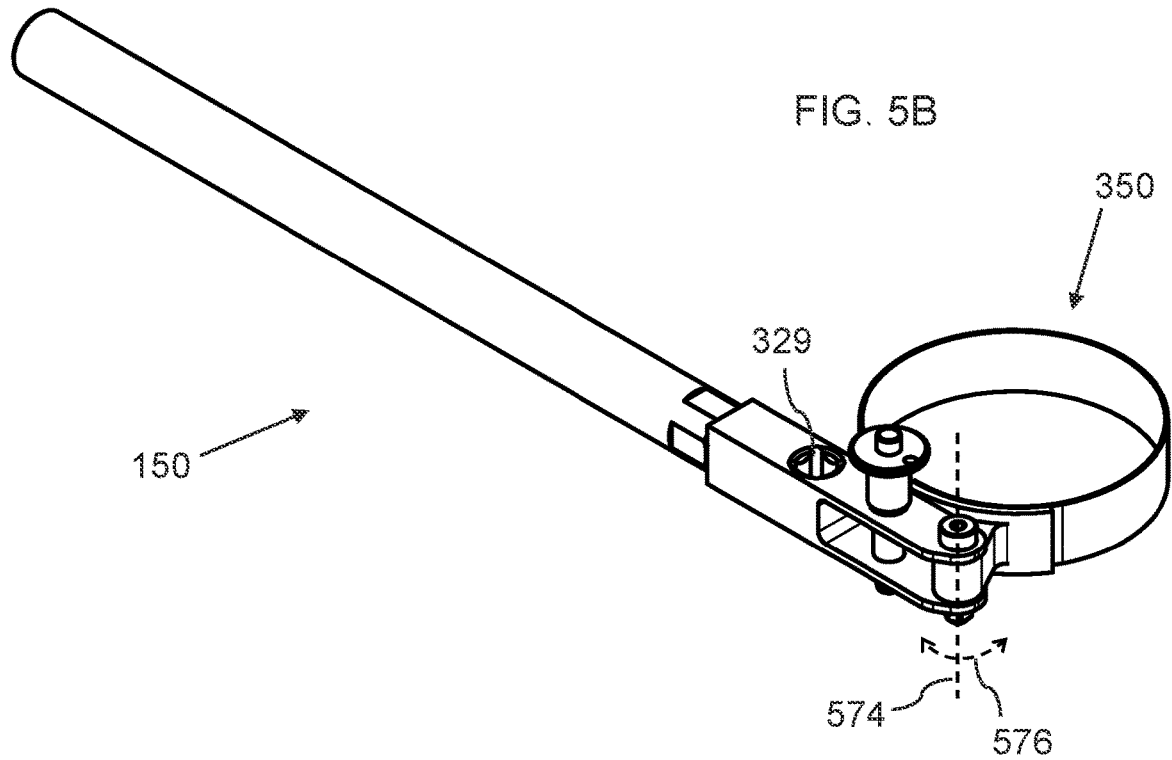
FIG. 5B is a top perspective view of a shock adjuster tool, according to an embodiment of the invention.
Figure 5C:
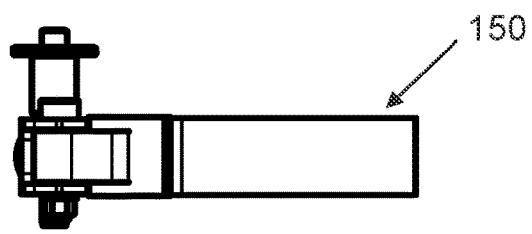
FIG. 5C is a front view of a shock adjuster tool, according to an embodiment of the invention.
Figure 5D:
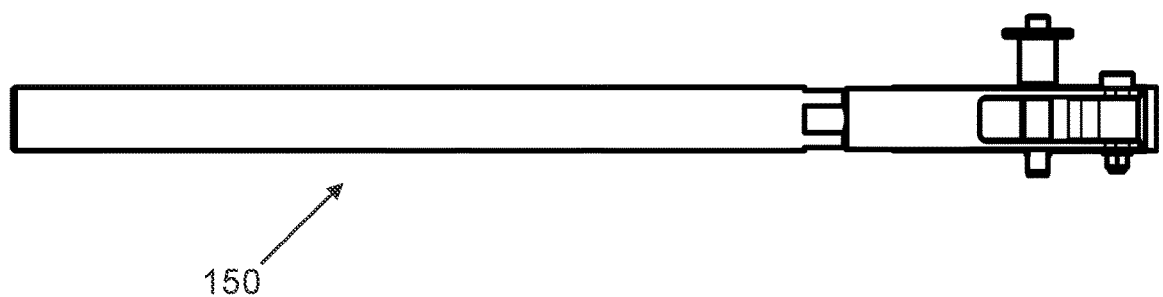
FIG. 5D is a side view of a shock adjuster tool, according to an embodiment of the invention.
Figure 5E:
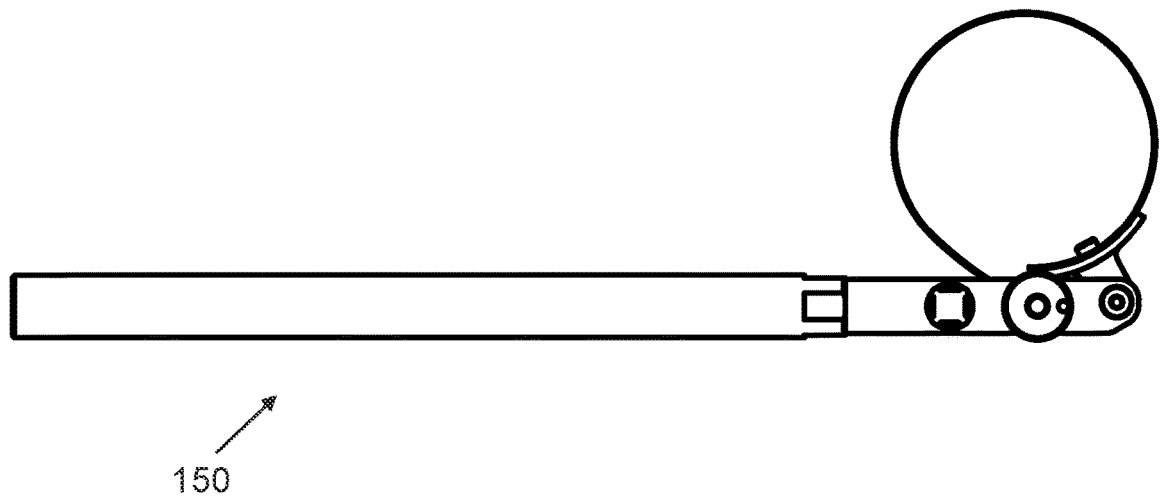
FIG. 5E is a top view of a shock adjuster tool, according to an embodiment of the invention.
Figure 7A:
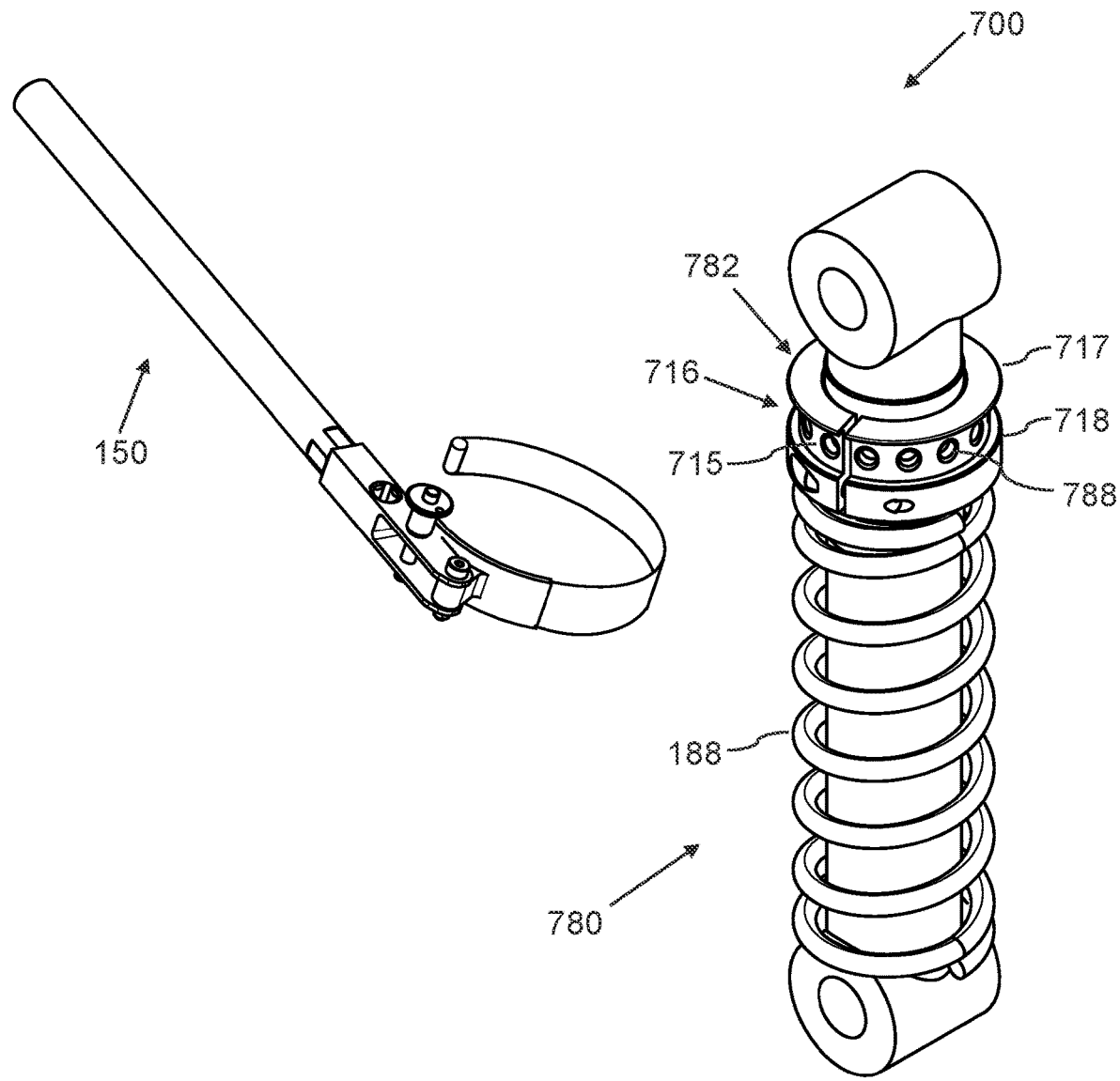
FIG. 7A is a top perspective view of an adjustable shock absorber system including an integrated adjustment ring with a tangential locking screw, and a shock adjuster tool ready for mounting, according to an embodiment of the invention.
Figure 7B:
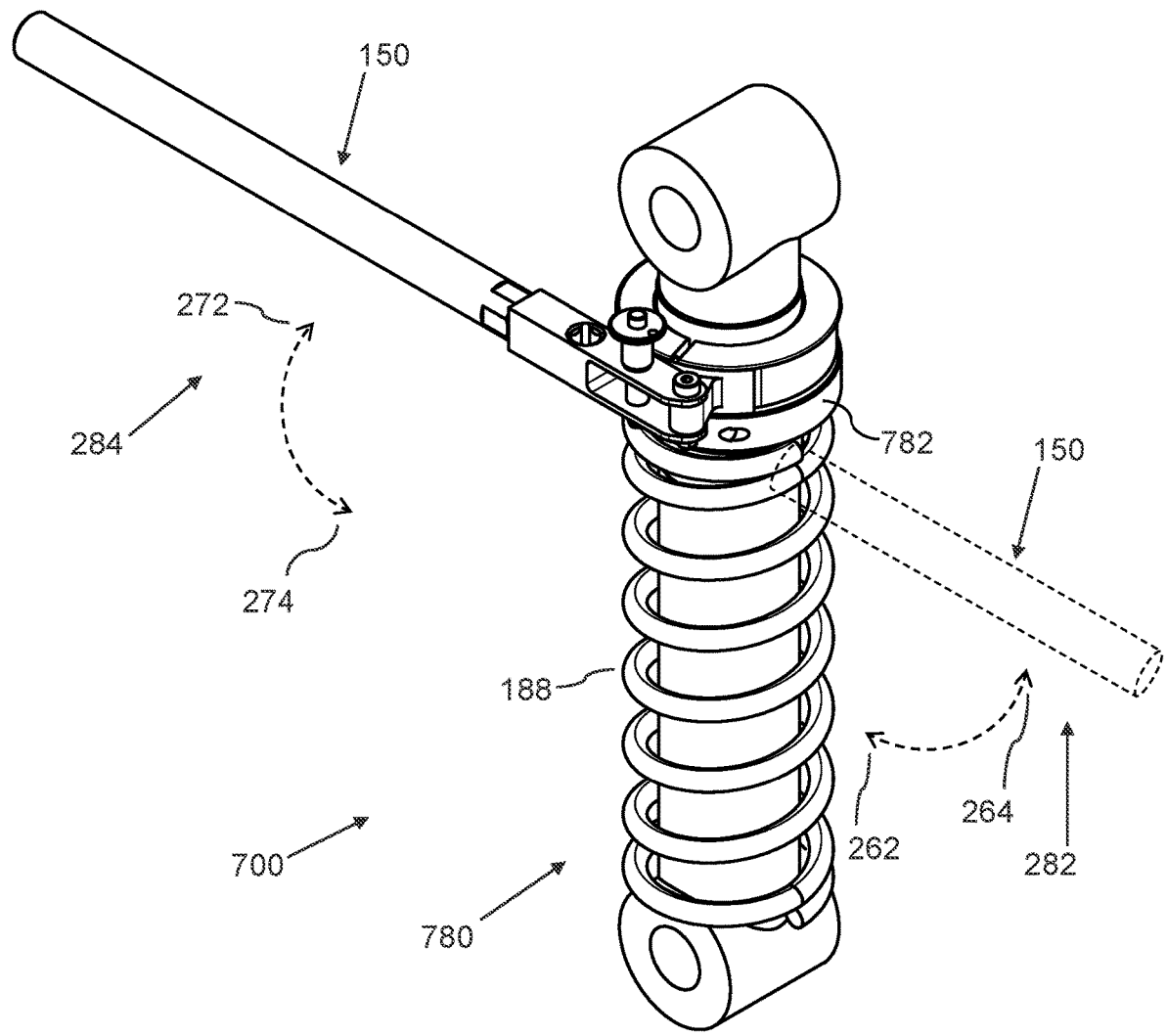
FIG. 7B is a top perspective view of an adjustable shock absorber system including an integrated adjustment ring with a tangential locking screw, and a shock adjuster tool mounted, according to an embodiment of the invention.
Figure 7C:
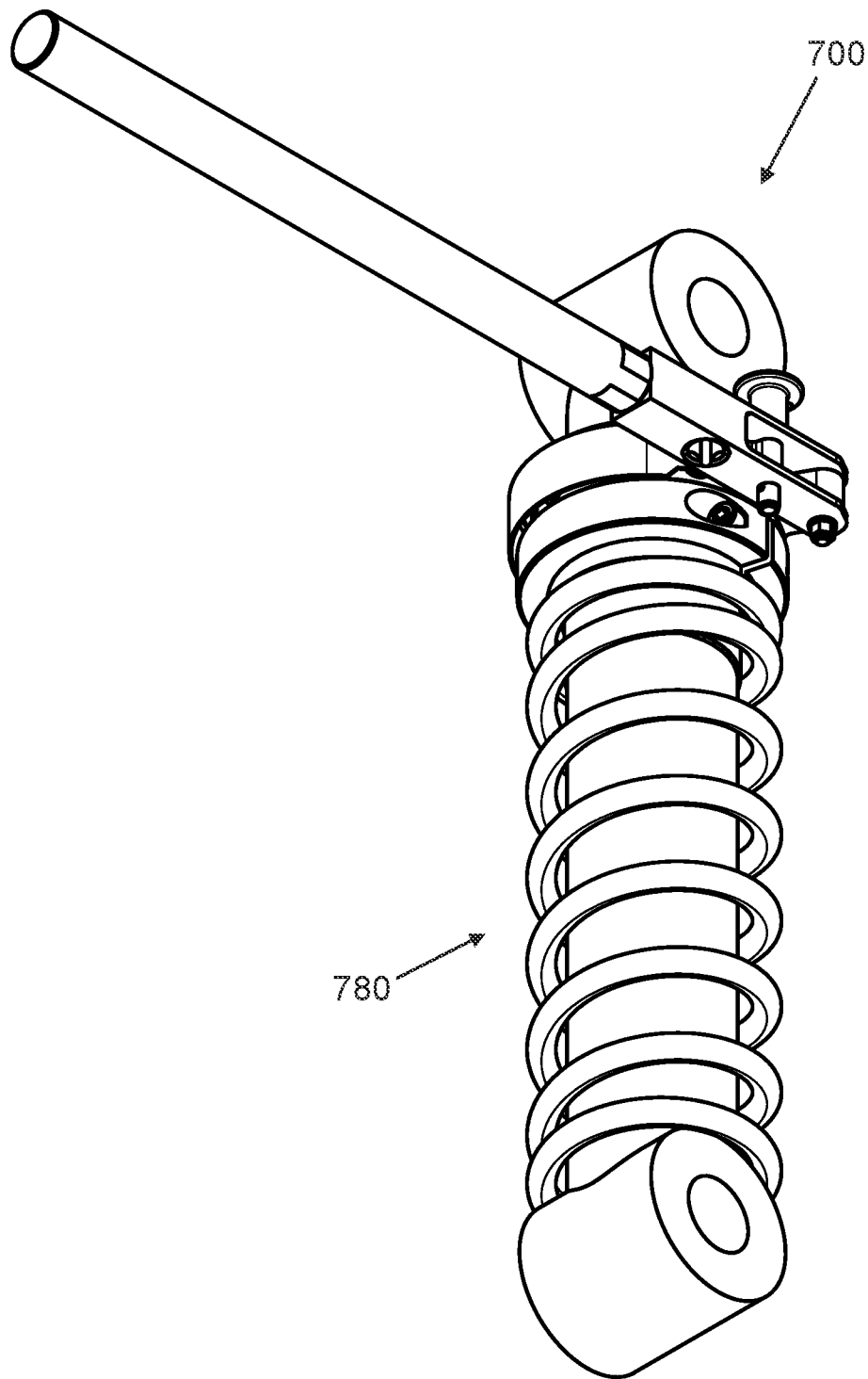
FIG. 7C is a bottom perspective view of an adjustable shock absorber system, according to the embodiment shown in FIG. 7A.

In a related embodiment, as shown in FIGS. 6A and 6B, the band assembly 350 can further include:

a) a displacement member 670, which comprises
  i. a displacement arm 672, which comprises a vertical displacement aperture 674 in an outer end of the displacement arm; and
  ii. a band support 676, which is connected to an inner end of the displacement arm 672, such that the band support 676 is curved to match a curvature of a first end 562 of the elongated band 360, such that an outer surface of the band support 676 is connected to the first end 562 of the elongated band 360, for example using a band pin 369;
wherein an outer end of the connector member 320 can be pivotably 576 connected to the outer end of the displacement arm 672 along a vertical connection axis 574, as shown in FIG. 5B, and a second end 364 of the elongated band 360 can be detachably and pivotably connected to an inner end of the connector member 320;
wherein an outer end of the lever arm 152 is pivotably 576 connected to the outer end of the displacement arm 672 along a vertical connection axis 574 (i.e., with a pin through the vertical displacement aperture 674) of the displacement arm 672 that is connected to the first end 562 of the elongated band 360, as shown in FIG. 5B, and a second end 364 of the elongated band 360 is detachably and pivotably connected to an outer portion of the lever arm 152, behind the outer end of the lever arm 152;

such that an inner end of the displacement arm 672 is positioned between the upper flange 623 and the lower flange 626, such that the front upper flange aperture 625, the vertical displacement aperture 674, and the front lower flange aperture 628 are aligned;

such that the connection pin 170 is insertable and can protrude through (i.e., protrudes through) the front upper flange aperture 625, the vertical displacement aperture 674, and the rear lower flange aperture 627, to detachably and pivotably connect the displacement member 670 to the connector member 320;

such that the elongated band 360 forms a circle which curves frontward and sideward from the outer surface of the lever arm 152, such that the elongated band 360 is configured to form a curve around a portion of the peripheral mounting surface 115, such that the first end 562 of the elongated band 360 is substantially adjacent to the peripheral mounting surface 115, such that the first end 562 of the elongated band 360 follows a curvature 163 of the peripheral mounting surface 115;

such that a second end 364 of the elongated band 360 is radially displaced from the peripheral mounting surface 115, such that the second end 364 of the elongated band 360 is radially separated from the peripheral mounting surface 115, from a second side connection point 258 to a joining point 259 (i.e., where the elongated band 360 starts to touch the peripheral mounting surface 115), as shown in FIGS. 2E and 1B;

Thus, continuing analysis of the preceding embodiment, in the following related configurations, the adjustable shock absorber system 100 will operate:

a) such that the first clockwise rotation 262 of the shock adjuster tool 150, when the tool grip portion 154 is connected to the adjustment ring assembly 110 in the first orientation 282, as shown in FIGS. 1A, 1B, 1C and indicated in dotted lines in FIG. 7B (such that the lever arm 152 pulls the second end 364 of the elongated band 360 in the clockwise direction 382), causes a clockwise rotation 262 of the lever arm 152 around the connection point 374, as shown in FIG. 2A, such that the band support is pressured inwards, such that the first end 562 of the elongated band 360, as shown in FIG. 5A, is pressed into the peripheral mounting surface 115, and such that the second end 364 of the elongated band 360 is tightened along a length of the elongated band 360 around the peripheral mounting surface 115, which causes the frictional grip between the tool grip portion 154 and the adjustment ring assembly 110 to tighten, such that the first clockwise rotation 262 of the shock adjuster tool 150 causes the adjustment ring 182 of the coil-over shock absorber 180 to tighten, thereby increasing a preload of the spring 188 of the coil-over shock absorber 180;

b) such that the first anti-clockwise rotation 264 of the shock adjuster tool 150, when the tool grip portion 154 is connected to the adjustment ring assembly 110 in the first orientation 282, as shown in FIGS. 1A, 1B, 1C and indicated in dotted lines in FIG. 7B (such that the lever arm 152 pushes the first end 562, as shown in FIG. 5A, of the elongated band 360 in the anti-clockwise direction 384), causes an anti-clockwise rotation of the lever arm 152 around the connection point 374, as shown in FIG. 2A, such that the band support is pulled outwards, such that the first end 562 (as shown in FIG. 5A) of the elongated band 360 is lifted from the peripheral mounting surface 115, and such that the second end 364 of the elongated band 360 is loosened along a length of the elongated band 360 around the peripheral mounting surface 115, which causes the frictional grip between the tool grip portion 154 and the adjustment ring assembly 110 to loosen, such that the anti-clockwise rotation of the shock adjuster tool 150 causes a repositioning of the shock adjuster tool 150, to allow space for a repeated clockwise rotation of the shock adjuster tool 150, to allow for further tightening of the adjustment ring 182, as shown in FIG. 3A;

c) such that the second anti-clockwise rotation 274 of the shock adjuster tool 150, when the tool grip portion 154 is connected to the adjustment ring assembly 110 in the second orientation 284, as shown in FIGS. 2A and 7B (such that the lever arm 152 pulls the second end 364 of the elongated band 360 in the anti-clockwise direction 384, as shown in FIG. 1A), causes an anti-clockwise rotation of the lever arm 152 around the connection point 374, such that the band support is pressured inwards, such that the first end 562 (as shown in FIG. 5A), of the elongated band 360 is pressed into the peripheral mounting surface 115 (as shown in FIG. 1B), and such that the second end 364 (as shown in FIG. 1C) of the elongated band 360 is tightened along a length of the elongated band 360 around the peripheral mounting surface 115 (as shown in FIG. 1B), which causes the frictional grip between the tool grip portion 154 and the adjustment ring assembly 110 to tighten, such that the first anti-clockwise rotation 264 (as shown in FIG. 1A) of the shock adjuster tool 150 causes the adjustment ring 182 (as shown in FIG. 3A) of the coil-over shock absorber 180 to loosen, whereby a preload of the spring 188 of the coil-over shock absorber 180 is decreased; and d) such that the second clockwise rotation 272 (as shown in FIGS. 2A and 7B) of the shock adjuster tool 150, when the tool grip portion 154 is connected to the adjustment ring assembly 110 in the second orientation 284, as shown in FIG. 2B (such that the lever arm 152 pushes the first end 562 (as shown in FIG. 5A) of the elongated band 360 in the clockwise direction 382), causes a clockwise rotation of the lever arm 152 around the connection point 374 (as shown in FIG. 2A), such that the band support is pulled outwards, such that the first end 562 (as shown in FIG. 5A) of the elongated band 360 is lifted from the peripheral mounting surface 115 (as shown in FIG. 1B), and such that the second end 364 (as shown in FIG. 1C) of the elongated band 360 is loosened along a length of the elongated band 360 around the peripheral mounting surface 115 (as shown in FIG. 1B), which causes the frictional grip between the tool grip portion 154 and the adjustment ring assembly 110 to loosen, such that the clockwise rotation of the shock adjuster tool 150 causes a repositioning of the shock adjuster tool 150, to allow space for a repeated clockwise rotation of the shock adjuster tool 150, to allow for further tightening of the adjustment ring 182 (as shown in FIG. 3A).

In a further related embodiment, as shown in FIGS. 3A and 3B:

a) the right adjustment ring member 120, can further include:
    i. a right ring body 332;
    ii. a right first pin 334;
    iii. a first side lower protruding portion 333, which protrudes from a lower first side of the right ring body 332, such that the right first pin 334 protrudes upward from an outer part of the first side lower protruding portion 333;
iv. a right second pin 338; and
v. a second side lower protruding portion 337, which protrudes from a lower second side of the right ring body 332, such that the right second pin 338 protrudes upward from an outer part of the second side lower protruding portion 337; and
b) the left adjustment ring member 130, can further include:
i. a left ring body 342;
ii. a first side upper protruding portion 343, which protrudes from an upper first side of the left ring body 342, wherein an outer portion of the first side upper protruding portion 343 comprises a first vertical aperture 348; and
iii. a second side upper protruding portion 347, which protrudes from an upper second side of the left ring body 342, wherein an outer portion of the second side upper protruding portion 347 comprises a second vertical aperture 344;
wherein the right first pin 334 inserts into the first vertical aperture 348, such that an outer portion of the first side upper protruding portion 343 rests on a top of the first side lower protruding portion 333; and
wherein the right second pin 338 inserts into the second vertical aperture 344, such that an outer portion of the second side upper protruding portion 347 rests on a top of the second side lower protruding portion 337;
whereby the left adjustment ring member 130 and the right adjustment ring member 120 are interlocked.

In other related embodiments, the first and second ring bodies can each include a pin 334, 338 and a vertical aperture 348, 344; or other forms of interlocking structures 334, 338, 348, 344; and other similar arrangements should be considered included herein, such as including upper protruding portions with downward protruding pins that interlock with apertures of lower protruding portions.

Thus, in another further related embodiment, as shown in FIGS. 3A and 3B:
a) the right/first adjustment ring member 120, can further include:
i. a right/first ring body 332;
ii. a right first lock structure 334; and
iii. a right second lock structure 338; and
b) the left adjustment ring member 130, can further include:
i. a left/second ring body 342;
ii. a left first lock structure 348; and
iii. a left second lock structure 344;
wherein the right first lock structure 334 is configured to detachably interlock with the left first lock structure 348; and
wherein the right second lock structure 338 is configured to detachably interlock with the left second lock structure 344;
such that the left adjustment ring member 130 and the right adjustment ring member 120 are interlocked.

In another further related embodiment, as shown in FIGS. 3A and 3B:
a) the left adjustment ring member 130, can further include:
i. left interlocking structures 352, which can for example be configured as teeth, splines, hexagonal shapes, or other well-known interlocking structures; and
b) the right adjustment ring member 120, can further include:
i. right interlocking structures 354, which can for example be configured as teeth, splines, hexagonal shapes, or other well-known interlocking structures;
wherein the left interlocking structures 352 and the right interlocking structures 354 are configured to interlock with adjustment interlocking structures 383 of the adjustment ring 182, as shown in FIG. 3A, which can for example be configured as teeth, splines, hexagonal shapes, or other well-known interlocking structures that are common for third party adjustment ring types that use tabs, female apertures, and large hex driving mechanisms, etc.

In another related embodiment, an outer portion of the lever arm 152, such as the connector body 622 of the connector member 320, can further include:
a) a mounting aperture 329, which can be a square aperture;
wherein the mounting aperture 329 can be configured to allow attachment of a wrench tool with a wrench connector that fits into the mounting aperture 329, in order to apply supplemental torque/force to the lever arm 152.

In another related embodiment of an adjustable shock absorber system 1100 with a shock adjuster tool 1150 with a pivotable lever arm, as shown in FIGS. 11A-11B, 12A-12B, and 13A-13B, the lever arm 152 can be pivotably connected to tool grip portion 154, such that the lever shaft 310 can be pivotably connected to the connector member 320, for example via an intermediate connector member 1115, which is mounted on an outer end of the lever shaft 310.

In an embodiment, as shown in FIGS. 7A-7E, 8A-8B, 9A-9E, and 10A-10B an adjustable shock absorber system 700, 900 can include:
a) a coil-over shock absorber 780, 980, which can include:
i. a spring 188; and
ii. a lockable adjustment ring 782, 982, which is configured to rotatably adjust a preload of the spring 188 of the coil-over shock absorber 780, 980, wherein the lockable adjustment ring 782, 982 can include:
2) a peripheral mounting surface 815, 915; and
b) a shock adjuster tool 150, which can include:
i. a lever arm 152; and
ii. a tool grip portion 154, which is connected to an inner end of the lever arm 152;
wherein the tool grip portion 154 is configured to detachably connect to the peripheral mounting surface 815, 915 of the lockable adjustment ring 782, 982;
such that a first clockwise rotation 262 of the shock adjuster tool 150, when the tool grip portion 154 is connected to the lockable adjustment ring 782, 982 in a first orientation 282 (as indicated in dotted lines in FIG. 7B and shown in FIG. 1A) wherein an inner end of the lever arm 152 of the shock adjuster tool 150 is pointing in a clockwise direction 262, causes a frictional grip between the tool grip portion 154 and the lockable adjustment ring 782, 982 to tighten, such that the clockwise rotation of the shock adjuster tool 150 causes the lockable adjustment ring 782, 982 of the coil-over shock absorber 780, 980 to tighten, thereby increasing a preload of the spring 188 of the coil-over shock absorber 780, 980;
such that a first anti-clockwise rotation 264 of the shock adjuster tool 150, when the tool grip portion 154 is connected to the lockable adjustment ring 782, 982 in the first orientation 282, causes the frictional grip between the tool grip portion 154 and the lockable adjustment ring 782, 982 to loosen, such that the first anti-clockwise rotation 264 of the shock adjuster tool 150 causes a repositioning of the shock adjuster tool 150, to allow space for a repeated clockwise rotation 262 of the shock adjuster tool 150, to allow for further tightening of the lockable adjustment ring 782, 982;

such that a second anti-clockwise rotation 274 of the shock adjuster tool 150, when the tool grip portion 154 is connected to the lockable adjustment ring 782, 982 in a second orientation 284 (as shown in FIGS. 2A and 7B) wherein an inner end of the lever arm 152 of the shock adjuster tool 150 is pointing in an anti-clockwise direction 274, causes a frictional grip between the tool grip portion 154 and the lockable adjustment ring 782, 982 to tighten, such that the second anti-clockwise rotation 274 of the shock adjuster tool 150 causes the adjustment ring 182 of the coil-over shock absorber 780, 980 to loosen, thereby decreasing a preload of the spring 188 of the coil-over shock absorber 780, 980; and such that a second clockwise rotation 272 of the shock adjuster tool 150, when the tool grip portion 154 is connected to the lockable adjustment ring 782, 982 in the second orientation 284, causes the frictional grip between the tool grip portion 154 and the lockable adjustment ring 782, 982 to loosen, such that the second clockwise rotation 272 of the shock adjuster tool 150 causes a repositioning of the shock adjuster tool 150, to allow space for a repeated anti-clockwise rotation of the shock adjuster tool 150, to allow for further loosening of the lockable adjustment ring 782, 982.

In a related embodiment, of the adjustable shock absorber system 700, as shown in FIGS. 8A and 8B, the lockable adjustment ring 782 can further include:
a) a locking screw 810; and
b) an adjustment ring body 820, which can include:
  i. a ring gap 822, which is configured to allow flexing of the adjustment ring body 820;
  ii. a first lateral aperture 824, which is configured to protrude laterally through an outer corner of a first end of the adjustment ring body 820, on a first side of the ring gap 822; and
  iii. a second lateral aperture 826, which is configured to protrude laterally through an outer corner of a second end of the adjustment ring body 820, on a second side of the ring gap 822;
  wherein the adjustment ring body 820 can be made of a metal or metal alloy, such as ferrous metal, such that the adjustment ring body 820 is flexible;
such that the first lateral aperture 824 and the second lateral aperture 826 are aligned, such that the locking screw 810 screws into the first lateral aperture 824 and the second lateral aperture 826, such that tightening the locking screw 810 decreases a width of the ring gap 822;
such that tightening the locking screw 810 locks the lockable adjustment ring 782 in position, thereby locking a selected preload of the coil-over shock absorber 780.

In another related embodiment, of the adjustable shock absorber system 900, as shown in FIGS. 9A-9F and 10A-B, the lockable adjustment ring 982 can further include:
a) at least one locking screw 910, or a plurality of locking screws 910; and
b) an adjustment ring body 920, which can include:
  i. at least one radial threaded aperture 1024, which is configured to protrude radially from an outer surface 1026 of the adjustment ring body 920, such that the at least one radial aperture 1024 penetrates radially through the adjustment ring body 920;
such that the at least one locking screw 910 screws into the radial threaded aperture 1024, such that tightening the locking screw 910 causes the locking screw 910 to screw through the radial threaded aperture 1024 and touch a body 1082 of the coil-over shock absorber 980;
such that tightening the locking screw 910 locks the lockable adjustment ring 982 in position, thereby locking a selected preload of the coil-over shock absorber 980.

Figure 9A:
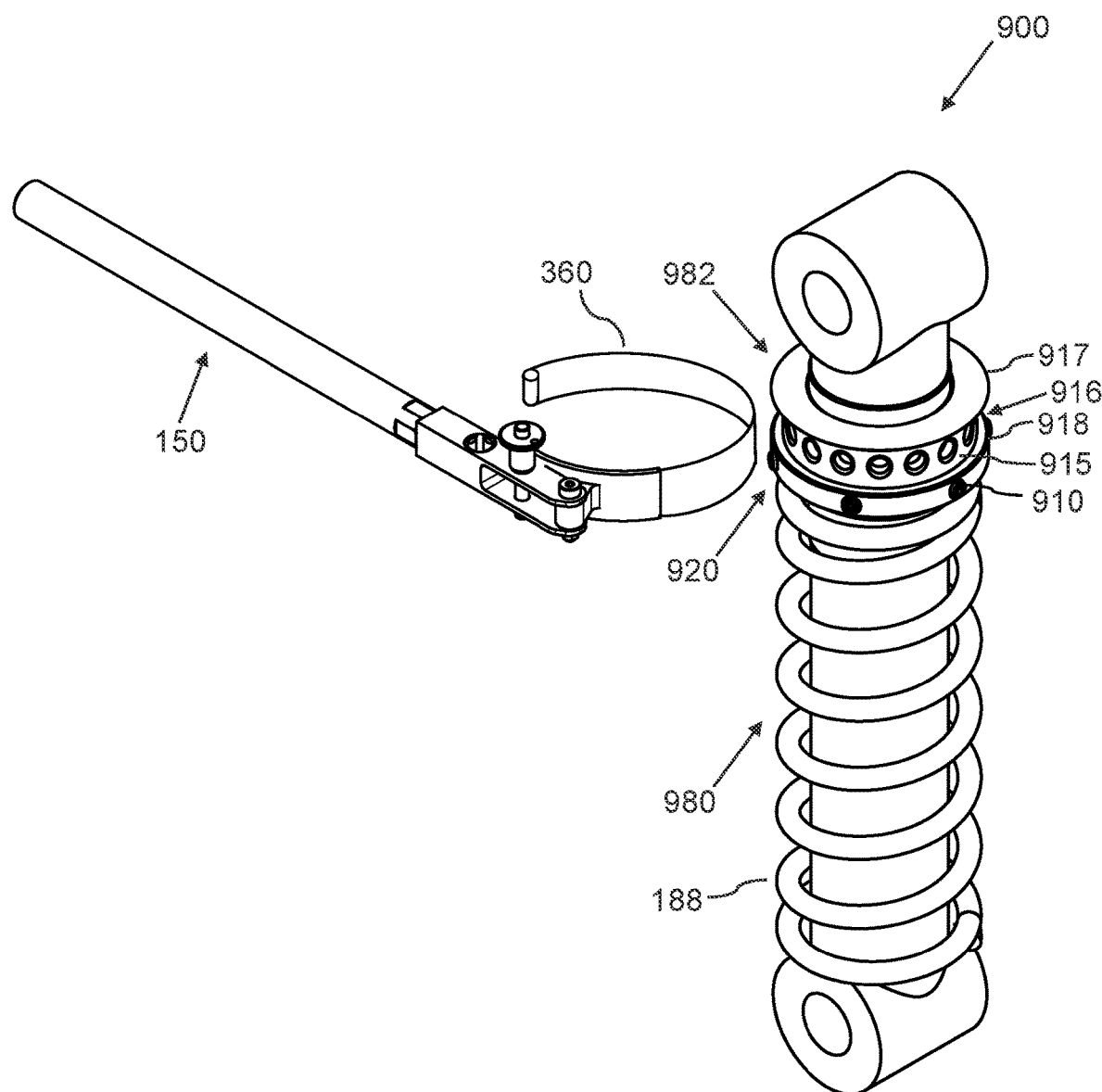
FIG. 9A is a top perspective view of an adjustable shock absorber system including an integrated adjustment ring with radial locking screws, and a shock adjuster tool ready for mounting, according to an embodiment of the invention.
Figure 9B:
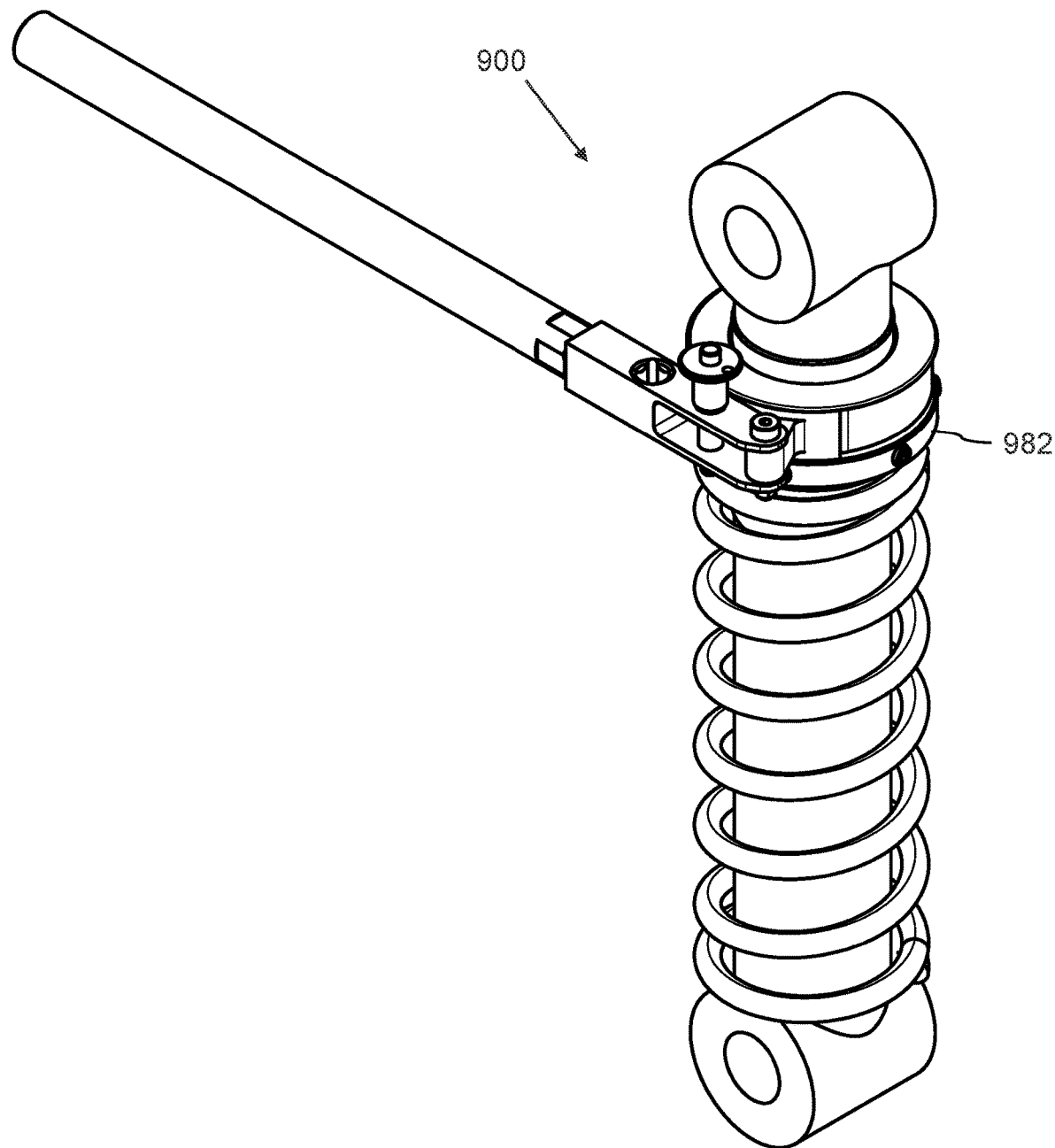
FIG. 9B is a top perspective view of an adjustable shock absorber system including an integrated adjustment ring with radial locking screws, and a shock adjuster tool mounted, according to an embodiment of the invention.
Figure 9C:
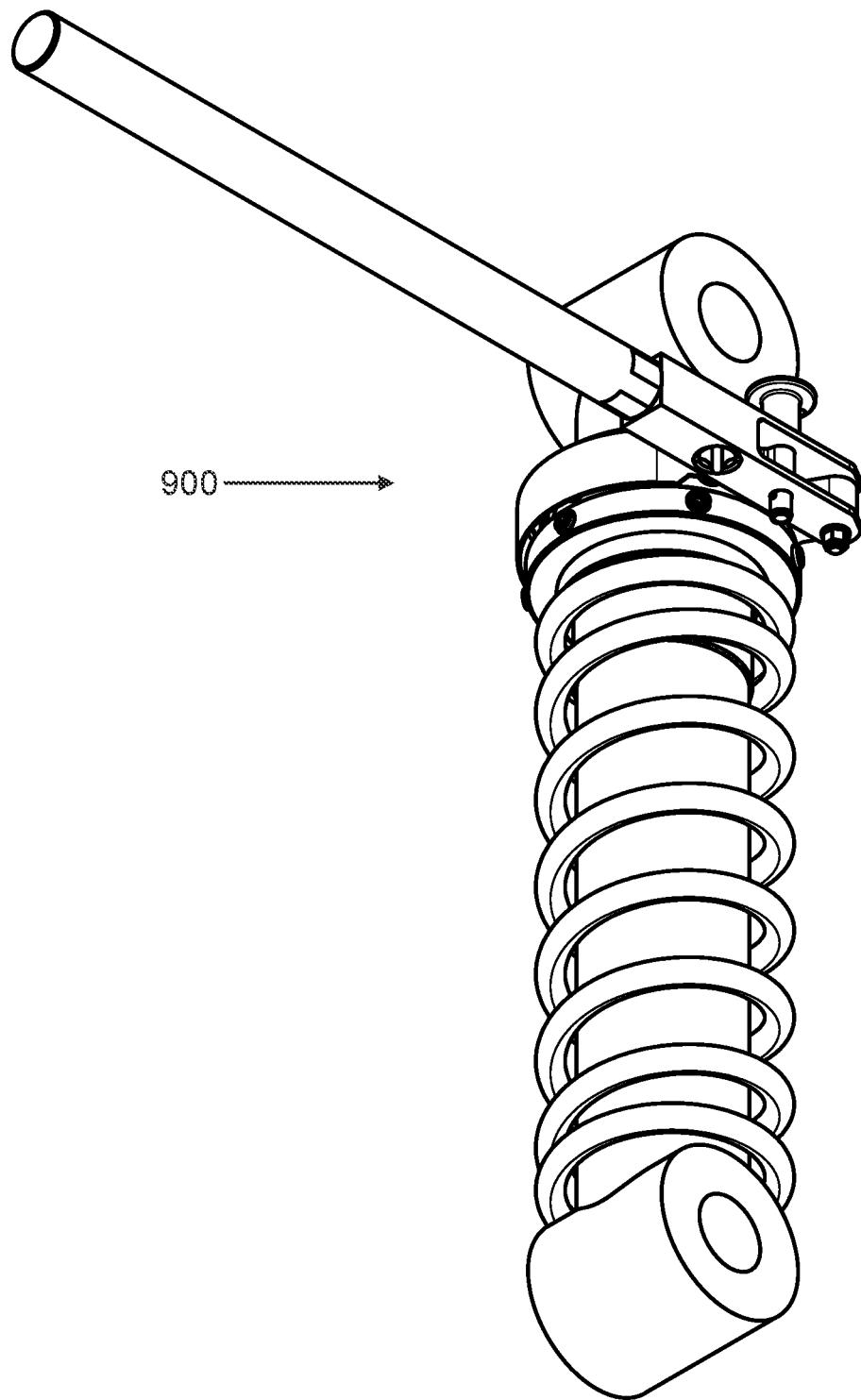
FIG. 9C is a bottom perspective view of an adjustable shock absorber system, according to the embodiment shown in FIG. 9A.
Figure 9D:
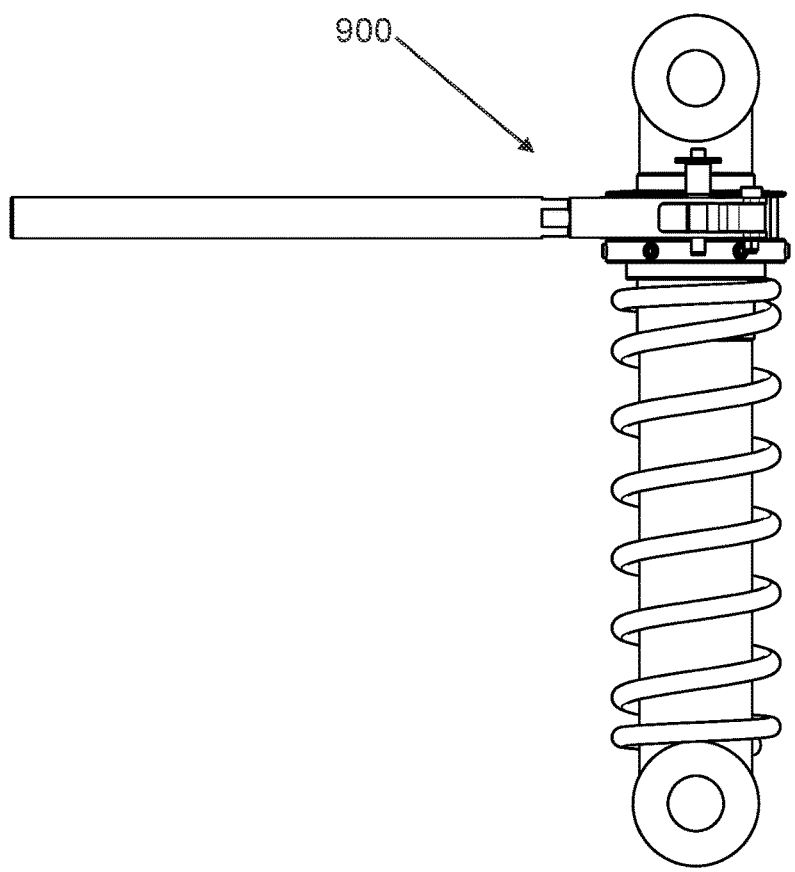
FIG. 9D is a front view of an adjustable shock absorber system, according to the embodiment shown in FIG. 9A.
Figure 9E:
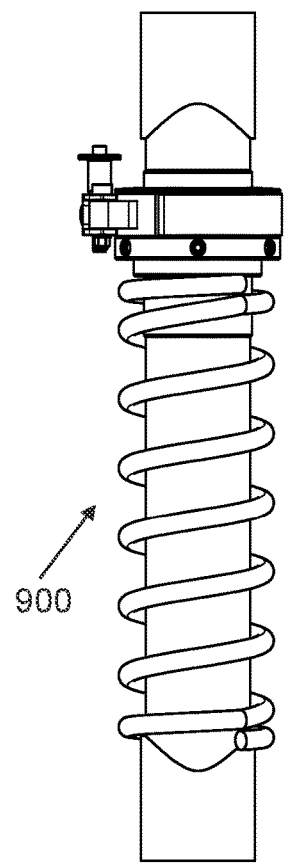
FIG. 9E is a side view of an adjustable shock absorber system, according to the embodiment shown in FIG. 9A.
Figure 9F:
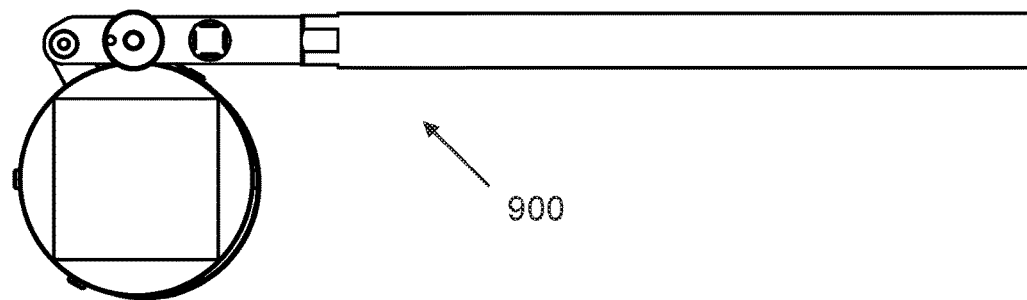
FIG. 9F is a top view of an adjustable shock absorber system, according to the embodiment shown in FIG. 9A.

In another related embodiment, of the adjustable shock absorber system 700, 900, as shown in FIGS. 7A and 9A, the lockable adjustment ring 782, 982 can be configured with an indentation 716, 916, such that the peripheral mounting surface 715, 915 is positioned in a bottom of the indentation 716, 916, such that the lockable adjustment ring 782, 982 can further include:
a) an upper lip 717, 917, which is positioned above the peripheral mounting surface 715, 915; and
b) a lower lip 718, 918, which is positioned below the peripheral mounting surface 715, 915;
such that the elongated band 360 is positioned in the indentation 716, 916, between the upper lip 717, 917 and the lower lip 718, 918.

Thus, in various related embodiments, the adjustable shock absorber system 100 can provide a novel way of wrapping the entire adjustment ring with a secure tool, and using a lever arm to apply torque, resulting in a consistent amount of torque applied in a full range of motion, to achieve a controlled method of raising or lowering the adjustment ring while the ring and spring remain attached on the shock body. Thereby the adjustable shock absorber system 100 can provide for efficient preload adjustment of a coil spring mounted on a coil-over shock absorber while the shock absorbing device remains installed on vehicle or machinery structure.

In related embodiments, the threaded coil spring adjustment ring with torque lock pin and cavity approach can include:
a) a threaded coil spring adjustment ring with multiple cavities positioned around its outside radial surface, with a fixing method to prevent adjustment ring rotation of the adjustment ring to shock body. The outside radial surface accepts an actuating band which when placed over the installed threaded coil spring adjustment ring can be used to rotate the adjustment ring when torque is applied. Note that the threaded coil spring adjustment ring is also a spring perch (a coil over shock has two perches, one for each end of the spring);
b) an actuating band is placed around the outside diameter of the threaded coil spring adjustment ring, then secured to the threaded coil spring adjustment ring using a pin; and
c) when the actuating band is leveraged such that it clasps tightly around the threaded coil spring adjustment ring, the detent pin will self-locate into a cavity on the ring.

Following an application of torque to a tool handle will cause the complete threaded coil spring adjustment ring to rotate.

In other related embodiments, the coil spring adjustment tool approach can include:
- a) a three-part tool comprised of a first ring half, a second ring half, and a band which when placed over the installed first and second ring halves can be used to actuate an adjustment nut;
- b) a first ring half with engagement mechanism such that the tool locks in to the adjustment nut which is affixed to the shock absorbing system;
- c) a second ring half with engagement mechanisms that a) securely interlock with the first ring half and b) the tool locks into the adjustment nut, which is affixed to the shock absorbing system;
- d) an actuating band which is placed around the circular plane formed by the interlocked first ring half and second ring half, then secured using a pin to the actuating mechanism with handle; and
- e) an adjustment ring that attaches to the shock absorbing system (for preload adjustment), and to which has a friction surface on its outer dimension on to which the interlocked first ring half and second ring half is installed.

In a related embodiment, a coil over shock utilizes a wire wound coil spring. The coil spring is attached with a spring perch on the lower and upper ends of the coil over shock.

In a further related embodiment, when the coil over shock is mounted on a vehicle, the preload applied by the adjustment ring can change vehicle dynamics such as ride height. Due to coil spring rate, efficiently changing spring preload is a challenge.

In another related embodiment, a coil spring preload adjustment ring, as shown in FIG. 3A, can be installed on a coil over shock. The adjustment ring can have multiple cavities spaced around the outside edge to allow for a wrench attachment to lock into said cavities and affect a turning torque to apply or remove preload to the spring.

In another related embodiment, a preload adjustment ring wrench, as shown in FIG. 1A, can be utilized to turn the coil spring preload adjustment ring. The wrench has a strap with locating eyelets and removable quick disconnect pins. The strap is attached to the wrench body using quick disconnect pins that utilize spring ball retainers. A thrust pin is attached to the inside diameter of the strap, and it is this pin which locks into the coil spring preload adjustment ring, such that:
- a) the preload adjustment ring wrench is prepared for installation around the outside surface of the coil spring preload adjustment ring by removing the latch pin. The strap portion of the wrench is then fitted around the coil spring preload adjustment ring, with the strap end hole fitted into the wrench body followed by installing the latch pin, with the wrench thrust pin locking in to a cavity on the coil spring preload adjustment ring;
- b) at this point, with the preload adjustment ring wrench installed, the operator can apply force to the wrench handle which applies turning torque to the coil spring adjustment ring. The wrench achieves torque input by the leverage action of the linkage. When the wrench handle is moved away from the shock body, strap linkage takes up slack and tightens its grip on the preload adjustment ring. With further torque application to the handle, the wrench thrust pin engages a cavity in the preload adjustment ring which causes a preload change on the coil spring itself; and
- c) removing the preload adjustment ring wrench from the shock absorber, then flipping it over and reinstalling the preload adjustment ring wrench on to the shock absorber, will cause the preload adjustment ring to rotate in the opposite direction. The solution allows for adding preload to or removing preload from the coil spring.

In a related embodiment, as shown in FIGS. 14A-14E and 22A-22E, the adjustable shock absorber system 100 can further include:
- a) a protective cover assembly 1410, 2210 which can be configured to be detachably attachable to the lockable adjustment ring 782, 982;
- such that the protective cover assembly 1410 is configured to extend along a length of the spring 188, such that the protective cover assembly 1410 protects the spring 188 (and other body portions of the coil-over shock absorber 780, 980) from exposure to the ambient environment.

In a further related embodiment, as shown in FIGS. 14A-14E, the protective cover assembly 1410 can further include:
- a) a top cover portion 1420; and
- b) a bottom cover portion 1440,
- such that the top cover portion 1420 can be slidably connected to the bottom cover portion 1440, such that a length 1418 of the protective cover assembly 1410 can be adjustable, such that the protective cover assembly 1410 can be adjusted to match the coil-over shock absorber 780, 980.

Figure 14A:
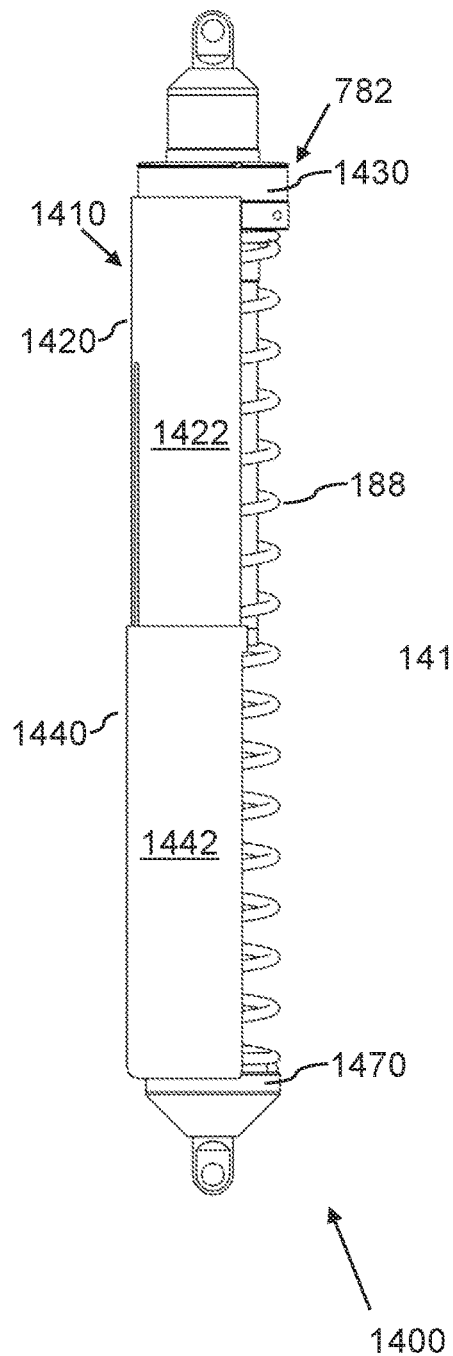
FIG. 14A is a side view of an adjustable shock absorber system with a protective cover assembly mounted, according to an embodiment of the invention.
Figure 14B:
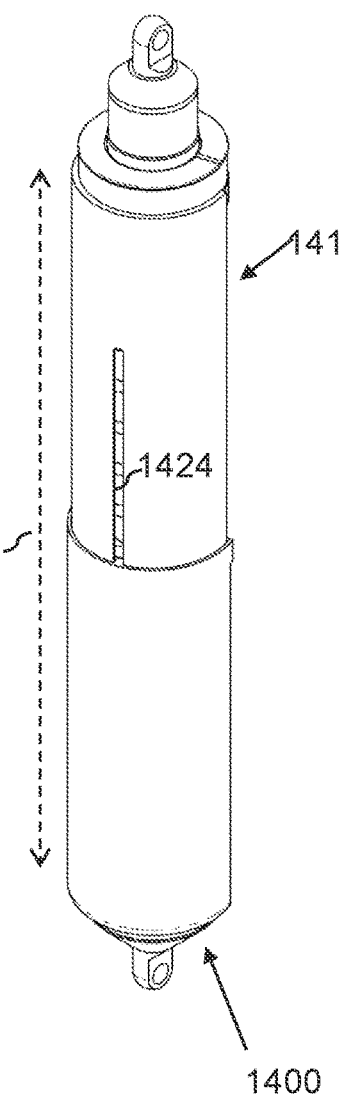
FIG. 14B is a top front perspective view of an adjustable shock absorber system, according to the embodiment shown in FIG. 14A.
Figure 14C:
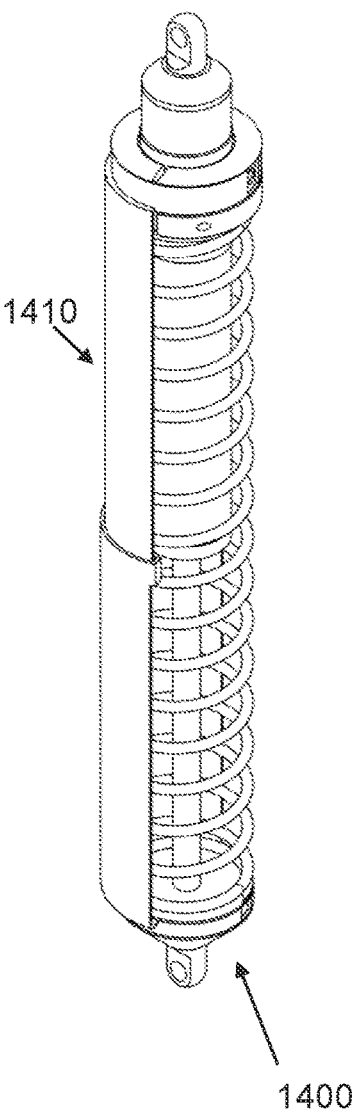
FIG. 14C is a top rear perspective view of an adjustable shock absorber system, according to the embodiment shown in FIG. 14A.
Figure 14F:
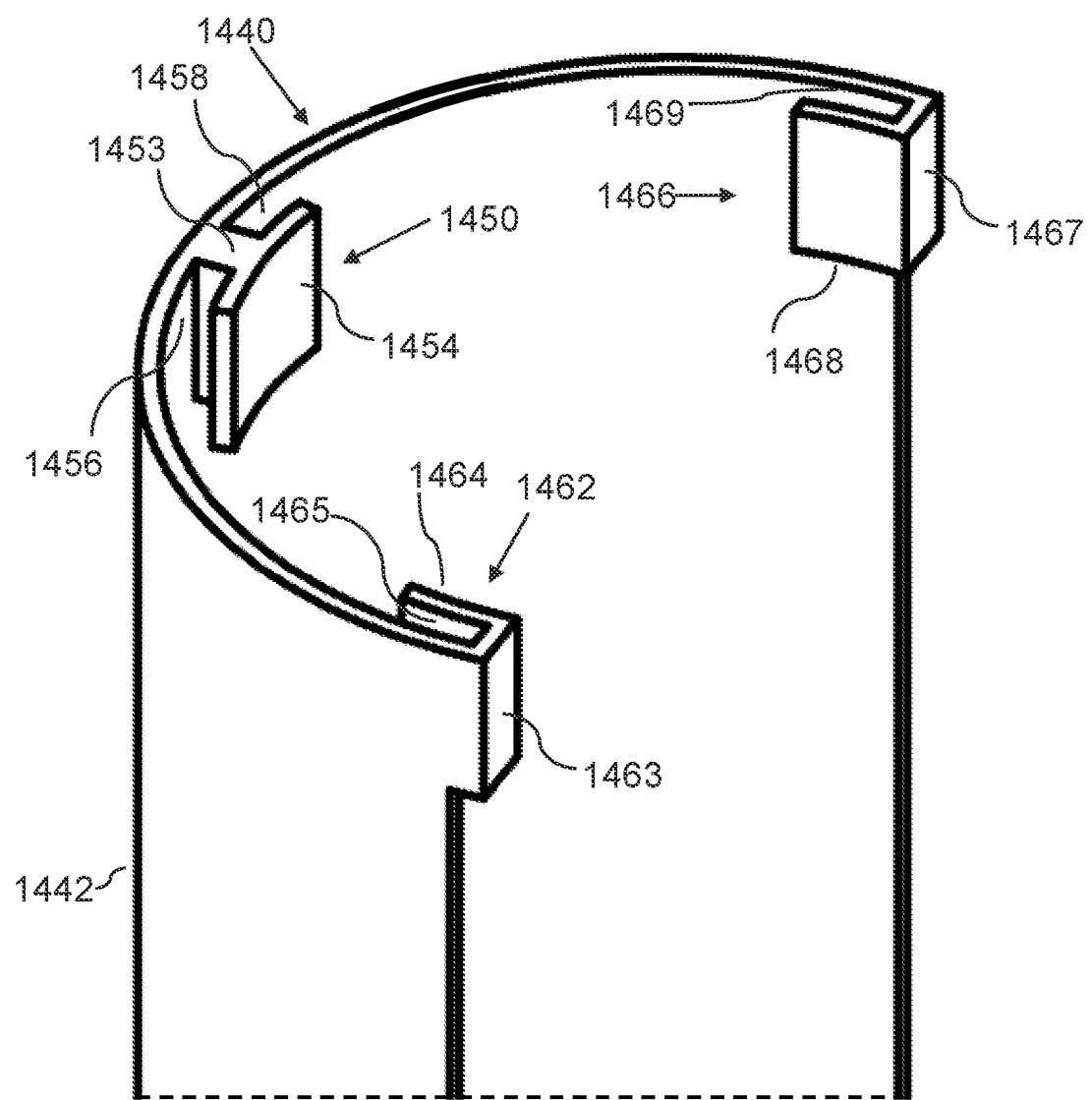
FIG. 14F is a top perspective view of a top part of a bottom cover portion of a protective cover assembly, according to an embodiment of the invention.

In a further related embodiment, as shown in FIGS. 14A, 14D, 14E, the top cover portion 1420 can further include:
- a) a top cover body 1422; and
- b) a top mounting structure 1430, which can be configured as a top mounting clamp 1430, which can be connected to a top end of the top cover body 1422, such that the top mounting clamp 1430 is configured to clamp in place in the indentation 716, 916 of the lockable adjustment ring 782, 982; and
- c) a lock pin 1432, which protrudes inwards from an inner surface of the top mounting clamp 1430, such that the lock pin can protrude into an aperture 788 of the indentation 716, 916 of the lockable adjustment ring 782, 982 when the top mounting clamp 1430 is clamped in place in the indentation 716, 916, such that the top mounting clamp 1430 is secured in place and rotation of the top mounting clamp 1430 inside the indentation 716, 916 is prevented.

In a yet further related embodiment, the top mounting clamp 1430 can be configured as a flexible cylinder segment 1430 with an opening 1434, such that the opening 1434 (and the flexibility of the flexible cylinder segment 1430) permits the top mounting clamp 1430 to detachably slide onto the indentation 716, 916.

In another further related embodiment, as shown in FIGS. 14B, 14D, 14E, and 14F, the protective cover assembly 1410 can be configured such that:
- a) the top cover body 1422 can be configured with a longitudinal slit 1424 in a lower portion of the top cover body 1422, such that the longitudinal slit 1424 slit extends from a bottom end of the top cover body 1422;
- b) the bottom cover portion 1440 can further include:
  - i. a bottom cover body 1442; and
  - ii. a t-shaped connector 1450, which is connected to a central top portion of an inner surface of the bottom cover body 1442, wherein the t-shaped connector can include:

1) a stem 1453, such that an inner end of the stem 1453 is connected to the central top portion of the inner surface of the bottom cover body 1442; and
2) a central inner member 1454, which is perpendicularly connected to an outer end of the stem 1453, such that the central inner member 1454 is substantially perpendicular to the inner surface of the bottom cover body 1442, such that a right central slit 1456 and a left central slit 1458 form on respectively a right side and a left side of the stem 1453, between the inner surface of the bottom cover body 1442 and the central inner member 1454;

iii. a right L-shaped connector 1462, which is connected to a right side top portion of an inner surface of the bottom cover body 1442, wherein the right L-shaped connector 1462 can include:
1) a right base 1463, such that an inner end of the right base 1463 is connected to the right side top portion of the inner surface of the bottom cover body 1442; and
2) a right inner member 1464, which is perpendicularly connected to an outer end of the right base 1463, such that the right inner member 1464 is substantially perpendicular to the right side top portion of the inner surface of the bottom cover body 1442;
such that a right side slit 1465 forms between the inner surface of the bottom cover body 1442 and the right inner member 1464; and iv. a left L-shaped connector 1466, which is connected to a left side top portion of an inner surface of the bottom cover body 1442, wherein the left L-shaped connector 1466 can include:
1) a left base 1467, such that an inner end of the left base 1467 is connected to the left side top portion of the inner surface of the bottom cover body 1442; and
2) a left inner member 1468, which is perpendicularly connected to an outer end of the left base 1467, such that the left inner member 1468 is substantially perpendicular to the left side top portion of the inner surface of the bottom cover body 1442;
such that a left side slit 1469 forms between the inner surface of the bottom cover body 1442 and the left inner member 1468;

such that the t-shaped connector 1450 is configured to slide through the longitudinal slit 1424, such that the t-shaped connector 1450 can slide along the longitudinal slit 1424, thereby enabling length adjustability of the protective cover assembly 1410, such that a central portion of the top cover body 1422 is slidably secured in place by the shaped connector 1450;

such that a right side of the top cover body 1422 can slide through the right side slit 1465 of the right L-shaped connector 1462, such that the right side of the top cover body 1422 is slidably secured in place by the right L-shaped connector 1462; and such that a left side of the top cover body 1422 can slide through the left slit 1469 of the left L-shaped connector 1466, such that the left side of the top cover body 1422 is slidably secured in place by the right L-shaped connector 1462.

In a further related embodiment, the bottom cover portion 1440 can further include:
a) a bottom mounting clamp 1470, which is connected to a bottom end of the bottom cover body 1442, such that the bottom mounting clamp 1470 is configured to clamp in place on a bottom portion of the coil-over shock absorber 780, 980 (typically below the spring 188).

In a yet further related embodiment, the bottom mounting clamp 1470 can be configured as a flexible cylinder segment 1470 with an opening 1472, such that the opening 1472 (and the flexibility of the flexible cylinder segment 1470) permits the bottom mounting clamp 1470 to detachably slide onto the bottom portion of the coil-over shock absorber 780, 980.

In related embodiments, the protective cover assembly 1410 can be made from a hard flexible material, including hard plastic, metal, metal alloys, and combinations thereof.

In another related embodiment, as shown in FIGS. 22A-22E, a protective cover assembly 2210 can be made from a soft flexible and resilient material, such as a natural or synthetic rubber material or soft foam material, wherein the rubber material can include synthetic rubbers that are produced by polymerization of chloroprene, including NEOPRENE™.

In a further related embodiment, as shown in FIGS. 22A-22E, the protective cover assembly 2210 can further include:
a) a cover body 2222; and
b) a mounting structure 2230, which can be an elongated member that is configured as an inward protruding lip, wherein the mounting structure 2230 can be connected to a top end of the top cover body 2222, such that the top mounting structure 2230 is configured to be secured in place in the indentation 716, 916 of the lockable adjustment ring 782, 982; and
c) at least one lock pin 2232, which protrudes inwards from an inner surface of the mounting structure 2230, such that the at least one lock pin 2232 can protrude into an aperture 788 of the indentation 716, 916 of the lockable adjustment ring 782, 982 when the mounting structure 2230 is positioned in the indentation 716, 916, such that the mounting structure 2230 is secured in place and rotation of the mounting structure 2230 inside the indentation 716, 916 is prevented;
such that the cover body 2222 is configured to extend along a length of the spring 188, such that the cover body 2222 protects the spring 188 (and other body portions of the coil-over shock absorber 780, 980) from exposure to the ambient environment
wherein the cover body 2222 and the mounting structure 1430 can be made from a flexible resilient material, such as NEOPRENE™, such that the mounting structure 2230 can be inserted into and curve around the indentation 716, 916 of the lockable adjustment ring 782, 982, such that the cover body 2222 curves around the spring 188 (and other body portions of the coil-over shock absorber 780, 980).

In a yet further related embodiment, the protective cover assembly 2210 can be further secured with a cable tie/zip tie, worm drive/screw band/hose clamp, or other type of mechanical fastener positioned around an upper part (and/or optionally lower part) of the protective cover assembly 2210, when the protective cover assembly 2210 is mounted.

In another further related embodiment, as shown in FIGS. 22A-22E, the protective cover assembly 2210 can further include:

a) a fastener structure 2240, which can be positioned on a first side and/or a second side of the cover body 2222;

such that the fastener structure 2240 enables the first side and/or a second side of the cover body 2222 to be connected, when the cover body 2222 is mounted around the spring 188, with the mounting structure 2230 inserted into the indentation 716, 916, as shown in FIG. 22B, such that the fastener structure 2240 secures the protective cover assembly 2210 in place on the coil-over shock absorber 780, 980.

Wherein the fastener structure 2240 can for example be configured as clasps, buttons, pressure sensitive adhesive, hook and look fastener, such as VELCRO™, and other types of well-known detachable fasteners.

In another further related embodiment, as shown in FIGS. 22A-22E, the fastener structure 2240 can be configured as a hook and loop fastener, wherein the fastener structure 2240 further comprises:

a) a first fastener member 2242, which can be configured as a hook or loop fastener; and b) a second fastener member 2244, which can be configured as a loop or hook fastener, respectively (to match an opposite type first fastener member 2242);

such that the first fastener member 2242 is detachably connectable to the second fastener member 2244, when the protective cover assembly 2210 is mounted on the coil-over shock absorber 780, 980.

In another related embodiment, as shown in FIGS. 15A-15B and 18A-18B, the shock adjuster tool 1551, 1851 can further include:

a) a tool attachment assembly 1515, 1815, which can include:

i. a tool connector portion 1520, which is configured to detachably connect to an outer end of the lever shaft 1510 of the lever arm 1552; and ii. a tool portion 1540, 1640, 1840, which is configured to detachably connect to the tool connector portion 1520 (i.e., such that the tool portion 1540 is detachably connectable to the outer end of the lever shaft 310 via the tool connector portion 1520);

such that a selected tool portion 1540, 1640, 1840 can be selected from a plurality of available tool portions 1540, 1640, 1840, such that the selected tool portion 1540, 1640, 1840 is detachably mounted on the tool connector portion 1520;

such that a selected tool portion 1540, 1840 can be used to perform a tool operation on the coil-over shock absorber 180.

In a related embodiment, the tool connector portion 1520 can connect to the outer end of the lever shaft 1510 with a releasable connector mechanism, which can include: a threaded connector, a snap lock connector, a spring ball-release connector, a friction fit connector (such as ferrule or spigot type friction fit) or other well-known types of releasable connects. In some related embodiment, the tool connector portion 1520 can be permanently connected to the outer end of the lever shaft 1510.

Figure 15A:
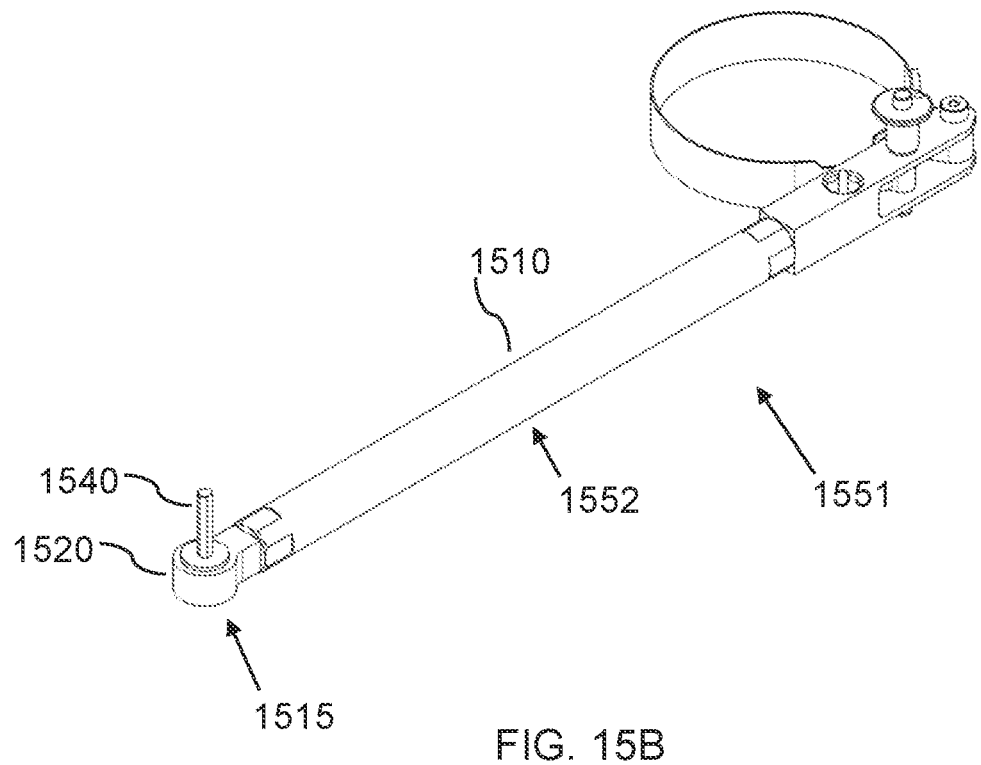
FIG. 15A is a top perspective view of a shock adjuster tool with a tool attachment assembly mounted with a hexagonal wrench tool portion, according to an embodiment of the invention.
Figure 15B:
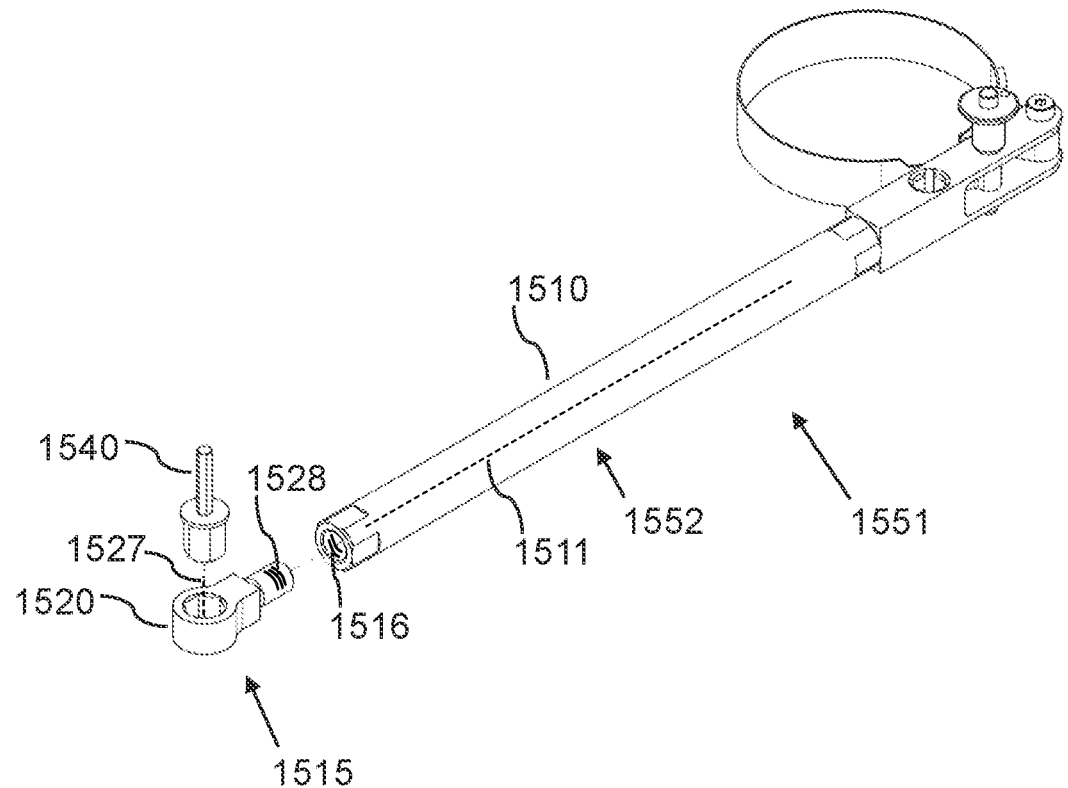
FIG. 15B is a top perspective view of the adjustable shock absorber system with the attachment assembly detached, according to the embodiment shown in FIG. 15A.

In a related embodiment, as shown in FIG. 15B, an inner portion of the tool connector portion 1520 can be configured with a connector threading 1528, and the outer end of the lever shaft 1510 can be configured with shaft threading 1516, such that the connector threading 1528 screws into or onto the shaft threading 1516.

In related embodiment, as shown in FIGS. 17A-17D, the tool connector portion 1520 can further include:

a) a connector body 1522, which can further include:

i. a connector aperture 1524, which can be configured with a locking shape, which can for example be a hexagonal shape, a quadratic shape, star-shaped, a rectangular shape, etc.; and b) a connector member 1526, which can be configured as a threaded pin/cylinder/bolt, such that the connector member 1526 is threaded, i.e. such that the connector member 1526 can include:

i. a connector threading 1528.

In a related embodiment, an elongated center axis 1527 of the connector aperture 1524 can be configured to be substantially perpendicular to an elongated center axis 1511 of the lever shaft 1510, as shown in FIGS. 15A-15B, when the tool connector portion 1520 is connected to the lever shaft 1510. Alternatively, an elongated center axis 1527 of the connector aperture 1524 can be configured to be substantially parallel (and overlapping) with an elongated center axis 1511 of the lever shaft 1510.

Figure 10A:
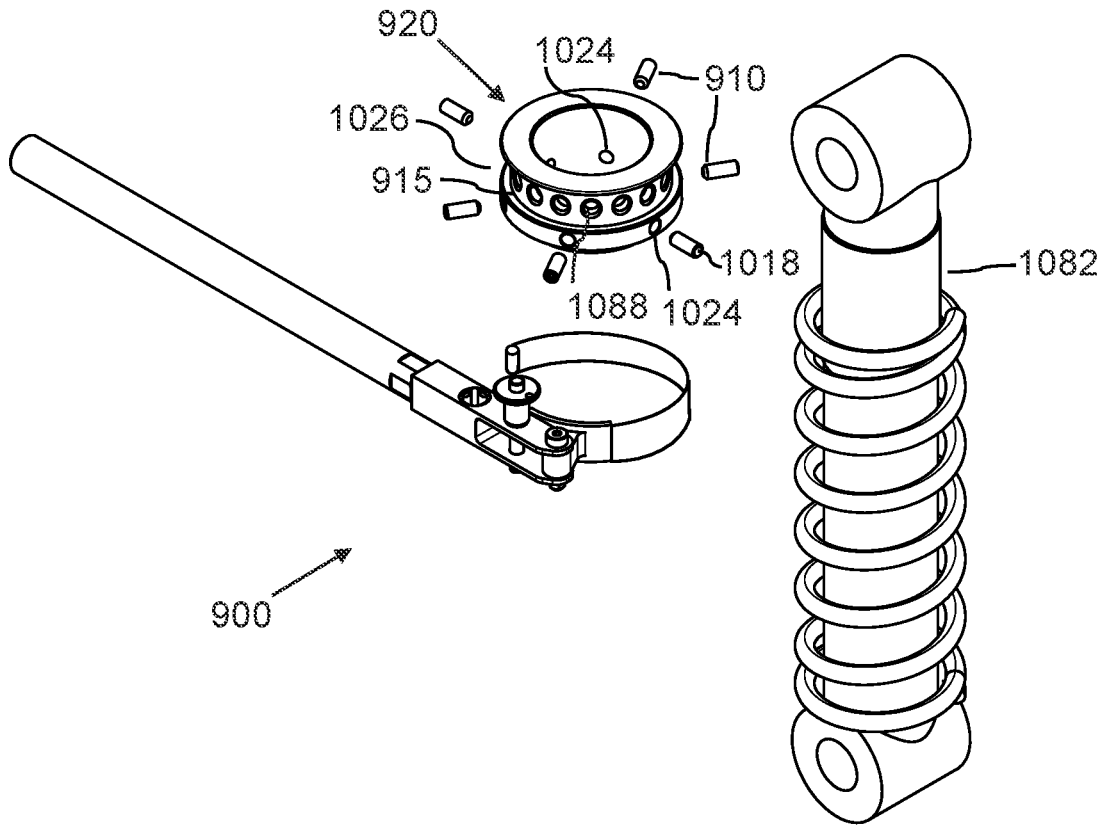
FIG. 10A is an exploded top perspective view of an adjustable shock absorber system, according to the embodiment shown in FIG. 9A.
Figure 10B:
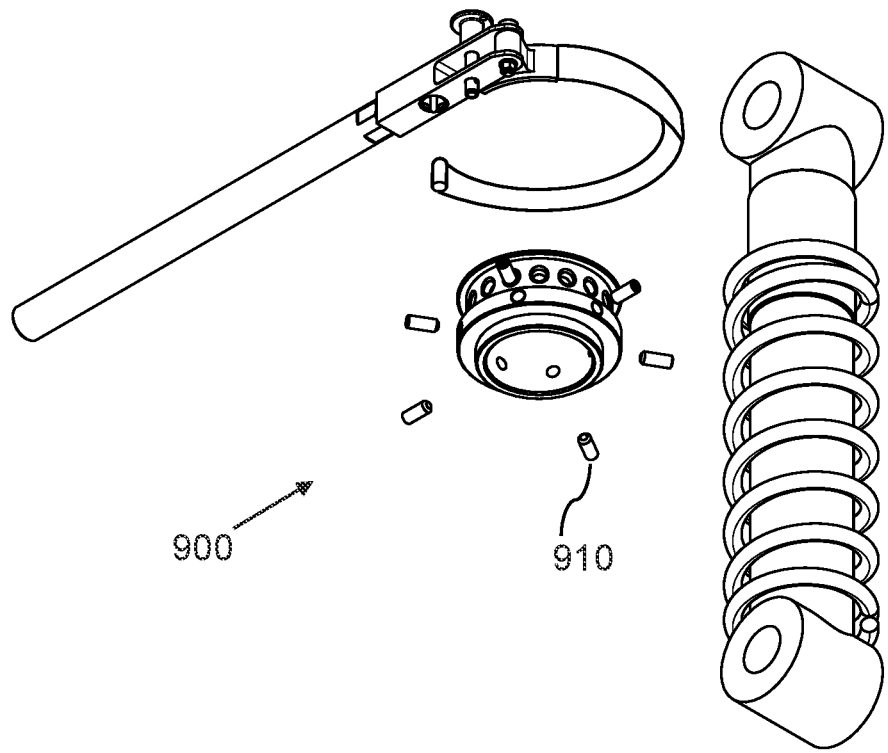
FIG. 10B is an exploded bottom perspective view of an adjustable shock absorber system, according to the embodiment shown in FIG. 9A.
Figure 11A:
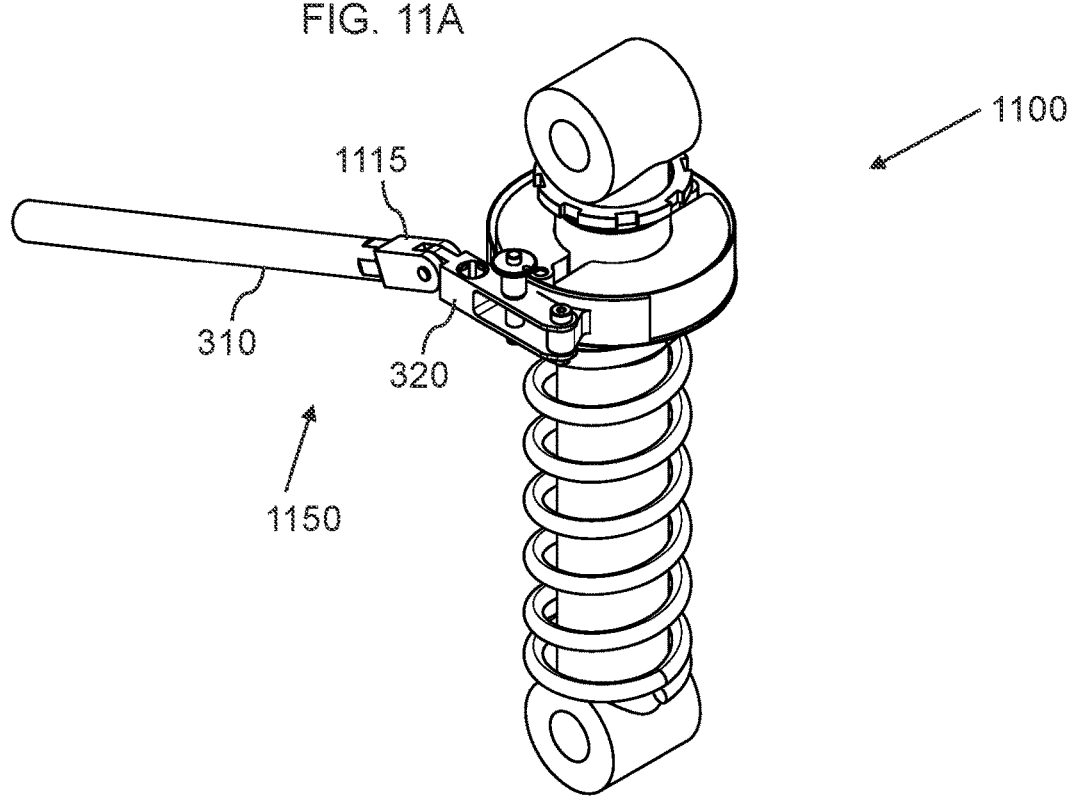
FIG. 11A is a top perspective view of an adjustable shock absorber system, with a shock adjuster tool with a pivotable shaft, according to an embodiment of the invention.
Figure 11B:
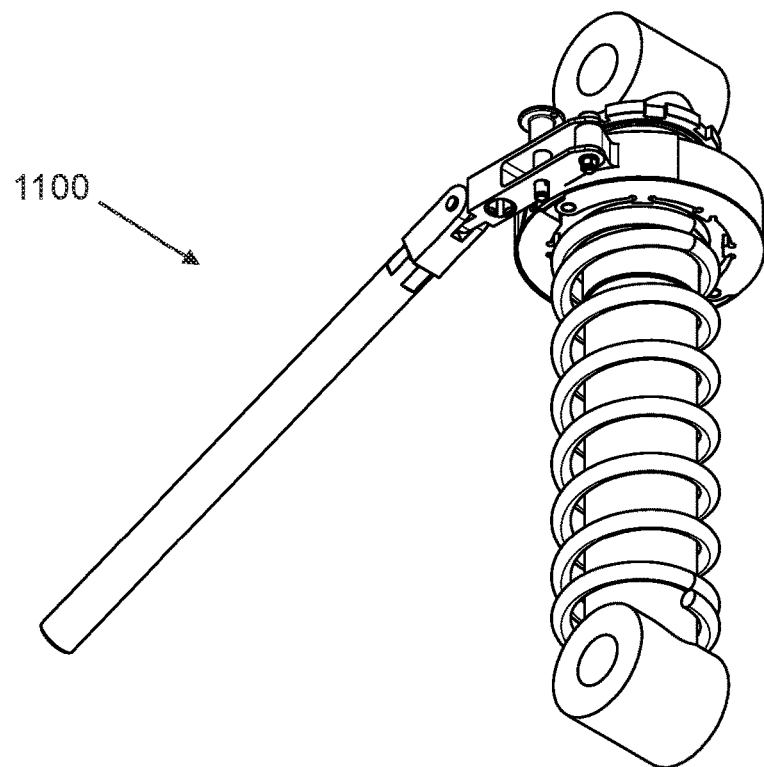
FIG. 11B is a top perspective view of an adjustable shock absorber system, with a shock adjuster tool with a pivotable shaft, according to an embodiment of the invention.
Figure 12A:
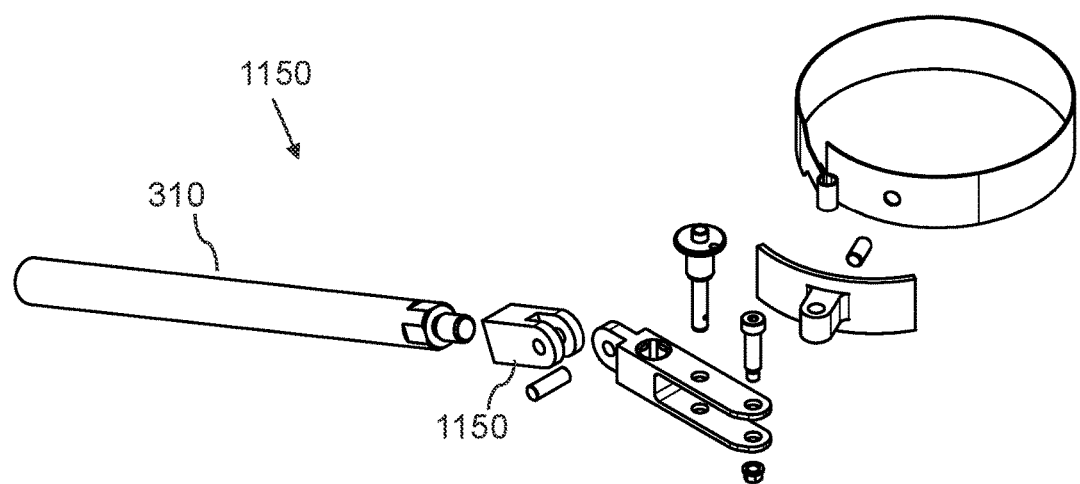
FIG. 12A is a top exploded perspective view of a shock adjuster tool with a pivotable shaft, according to an embodiment of the invention.
Figure 12B:
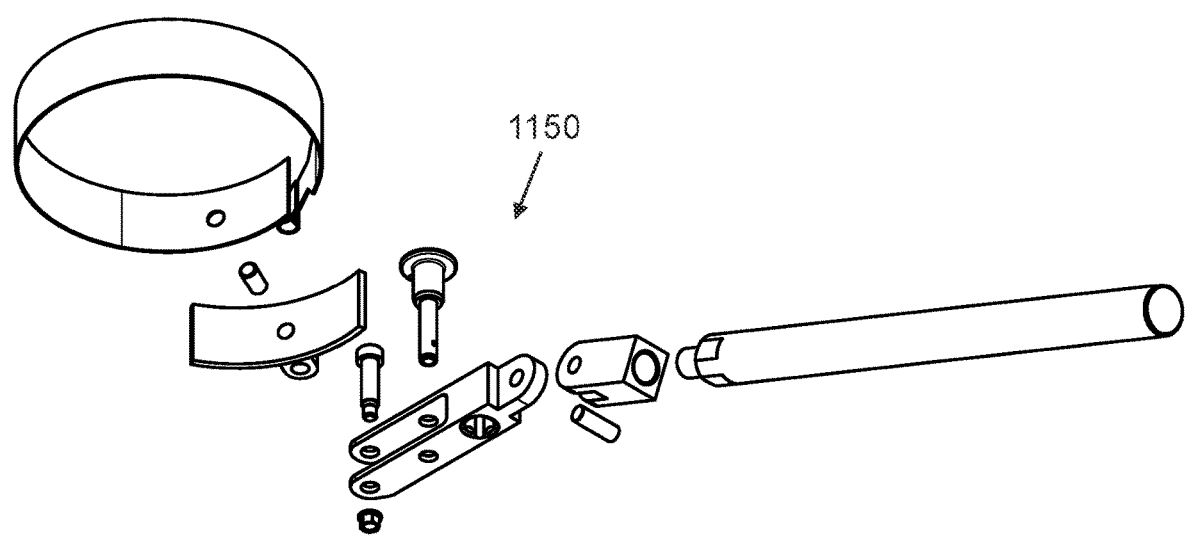
FIG. 12B is a bottom exploded perspective view of a shock adjuster tool with a pivotable shaft, according to an embodiment of the invention.
Figure 13A:
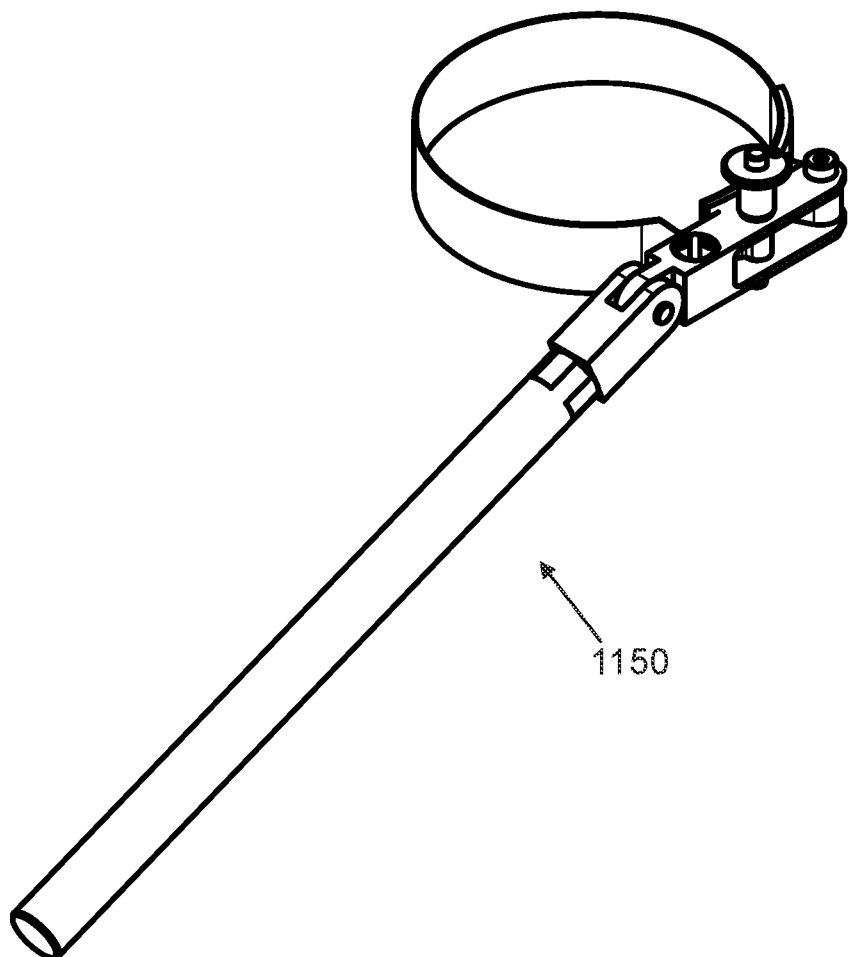
FIG. 13A is a top perspective view of a shock adjuster tool with a pivotable shaft, according to an embodiment of the invention.
Figure 13B:
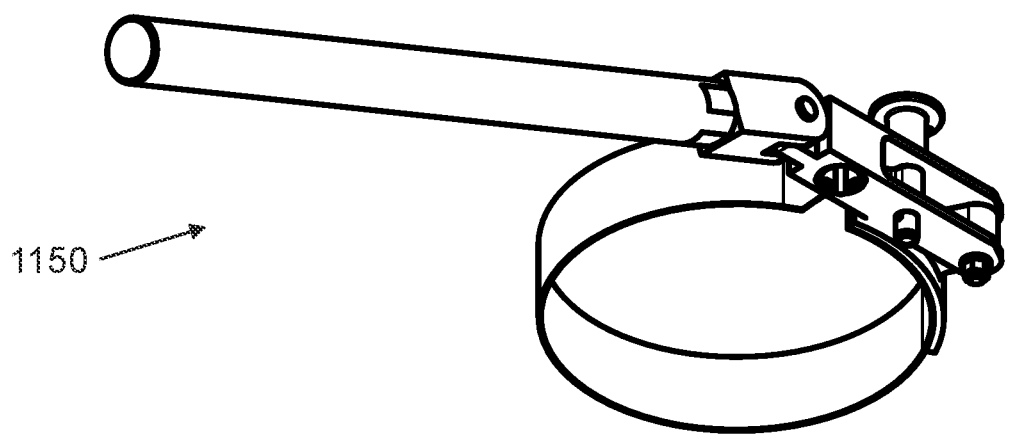
FIG. 13B is a bottom perspective view of a shock adjuster tool with a pivotable shaft, according to an embodiment of the invention.

In a further related embodiment, the tool portion 1540, 1840 can include:

a) a connector member 1642, 1842, which is configured to detachably connect with the connector body 1522 of the tool connector portion 1520;

wherein the connector member 1642, 1842 can be configured to be insertable into the connector aperture 1524 of the tool connector portion 1520, such that the connector member 1642, 1842 is securely and detachably held in place in the connector aperture 1524, such that at least a portion of the connector member can slide into the connector aperture 1524, such that the connector member 1642, 1842 cannot rotate when inserted into the connector aperture 1524;

wherein the connector member 1642, 1842 can be configured to match the locking shape of the connector aperture 1524, such that the connector member 1642, 1842 can be hexagonal and the connector aperture 1524 can be hexagonal; and b) a tool member 1644, 1944, which is connected to the connector member 1642, 1842;

In a related embodiment of the tool attachment assembly 1515, 1815, as shown in FIGS. 15A-15B, and 16A-16C, the tool member 1644 of the tool portion 1540 of the tool attachment assembly 1515 can be configured as a hexagonal wrench, such that the tool member 1644 is an elongated hexagonal member;

such that the shock adjuster tool 1551 with the tool attachment assembly 1515 attached can be used to lock the lockable adjustment ring 782, 982, as shown in FIGS. 7A and 10A, when the tool member 1644 is inserted into a hexagonal aperture 818, 1018 of the locking screw 810, 910 (as shown in FIGS. 8B and 10A), wherein the locking screw 810, 910 is configured as a hex socket screw, such that a cap/head (or outer end) of the locking screw 810, 910 includes a hexagonal aperture 818, 1018.

In a related embodiment of the tool attachment assembly 1515, 1815, the tool member 2044 of the tool portion 1640 of the tool attachment assembly 1515 can be configured as a pin wrench, such that the tool member 2044 is an elongated member, which can be an elongated cylindrical member, as shown in FIG. 16D;

such that the shock adjuster tool 1551 with the tool attachment assembly 1515 attached can be used to adjust a position of an adjustment ring 782, 982, which includes at least one aperture 788, 1088, as shown in FIGS. 7A and 10A, when the pin wrench tool member 2044 is inserted into the at least one aperture 788, 1088. Further, the shock adjuster tool 1551 with the tool attachment assembly 1515 attached can be used for adjusting a third-party adjustment ring 338 with at least one aperture (such as part of an Original Equipment Manufacturer or aftermarket coil-over shock absorber), when the pin wrench tool member 2044 is inserted into the at least one aperture of the third-party adjustment ring 338.

In a related embodiment of the tool attachment assembly 1515, 1815, as shown in FIGS. 18A-18B, and 19A-19D, the tool member 1944 of the tool attachment assembly 1515 can be configured as a spanner wrench, such that the spanner wrench tool member 1944 can be configured to interlock with a locking ring 184 (as shown in FIG. 1A) of a coil-over shock absorber 180, when the tool portion 1540 is attached to the locking ring 184 for locking or releasing the locking ring 184.

in another related embodiment, as shown in FIGS. 20A-20B and 21A-21C, the shock adjuster tool 2051 can further include:
  a) a tool attachment assembly 2015, which can include:
    i. a connector member 1526, which is detachably connectable to the outer end of the lever shaft 310, wherein the connector member 1526 can be configured as a threaded pin/cylinder/bolt, such that the connector member 1526 is threaded, i.e. such that the connector member 1526 can include:
      1. a connector threading 1528;
    ii. an intermediate member 2122, which is connected between the connector member 1526 and the tool member 2044, wherein the intermediate member 2122 can be configured to be substantially flush or matching with a surface of an outer end of the lever shaft 1510; and
    iii. a tool member 2044, which can be connected to the connector member 1526, via the intermediate member 2122, wherein the tool member 2044 is configured to perform a tool operation on the coil-over shock absorber 180;
  such that the tool member 2044 of the tool attachment assembly 2015 can be used to perform a tool operation on the coil-over shock absorber 180.

In a related embodiment of the tool attachment assembly 2015, as shown in FIGS. 20A-20B and 21A-21C, the tool member 2044 of the tool attachment assembly 2015 can be configured as a pin wrench, which can also be referred to as a dowel wrench, such that the tool member 2044 is an elongated member, which can be an elongated cylindrical member;
such that the shock adjuster tool 2051 with the tool attachment assembly 2015 attached can be used to adjust a position of an adjustment ring 782, 982, which includes at least one aperture 788, 1088, as shown in FIGS. 7A and 10A, when the pin wrench tool member 2044 is inserted into the at least one aperture 788, 1088. Further, the shock adjuster tool 2051 with the tool attachment assembly 2015 attached can be used for adjusting a third party adjustment ring 338 with at least one aperture (such as part of an Original Equipment Manufacturer or aftermarket coil-over shock absorber), when the pin wrench tool member 2044 is inserted into the at least one aperture of the third party adjustment ring 338.

Figure 20A:
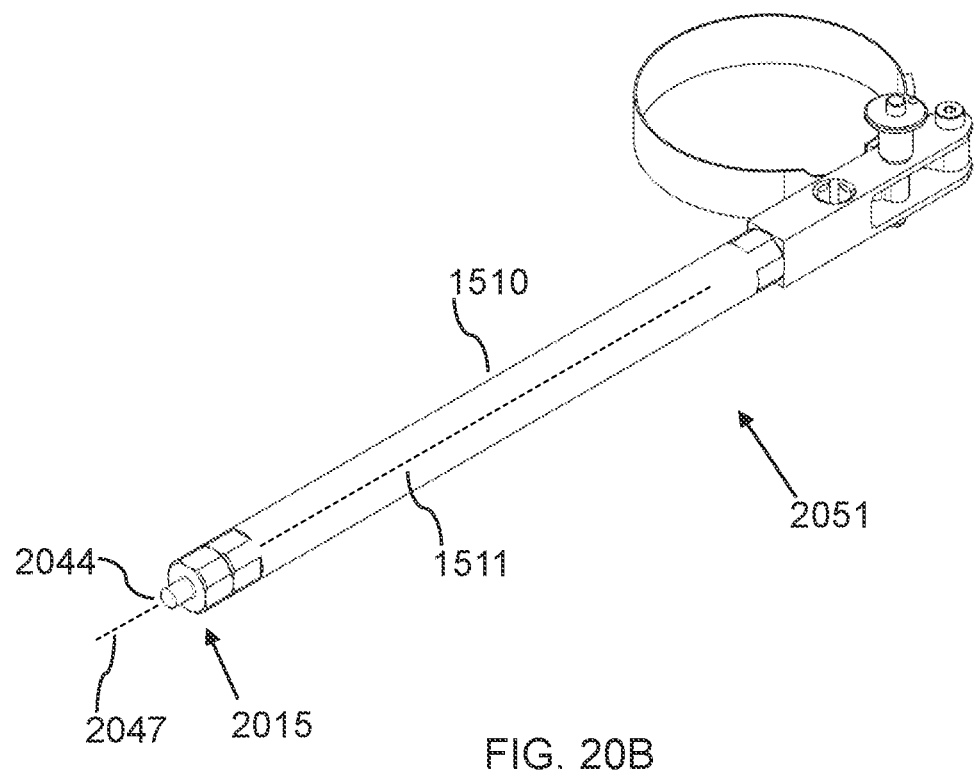
FIG. 20A is a perspective view of a shock adjuster tool with an attached dowel tool attachment assembly, according to an embodiment of the invention.
Figure 20B:
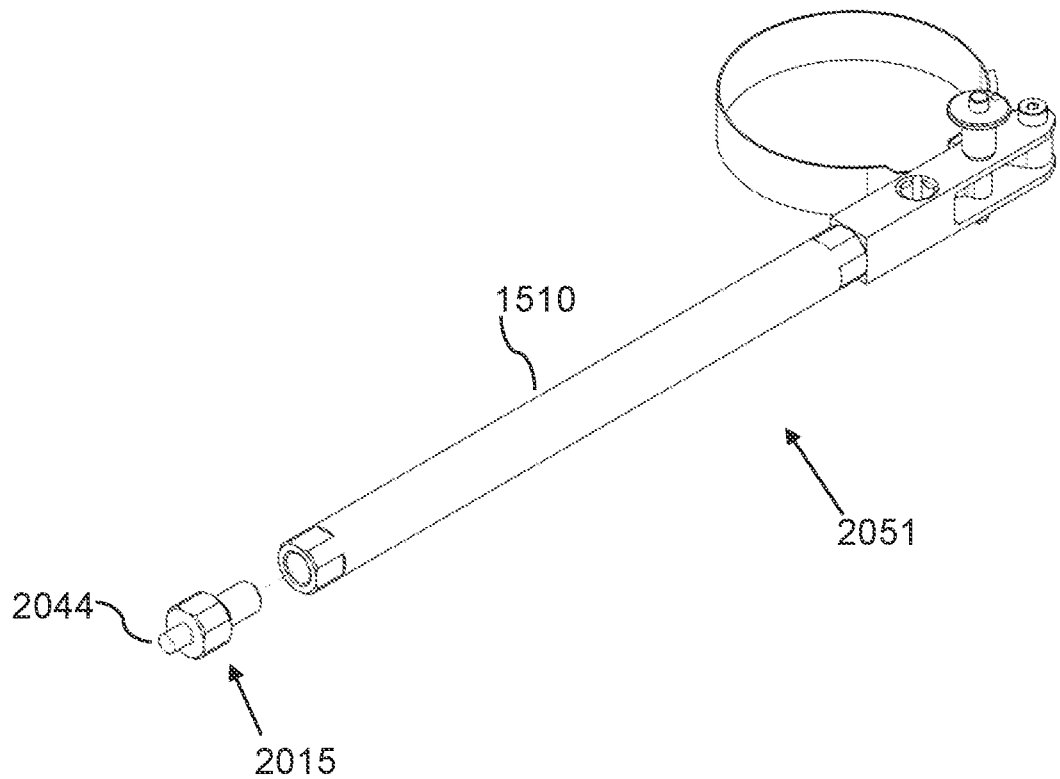
FIG. 20B is a perspective view of the adjustable shock absorber system with the dowel tool attachment assembly detached, according to the embodiment shown in FIG. 20A.
Figure 21A:
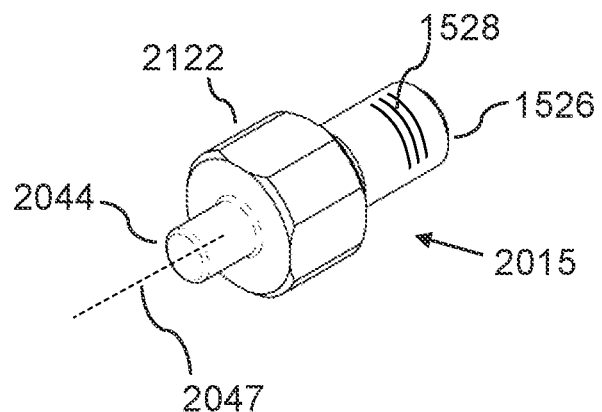
FIG. 21A is a perspective view of a dowel tool attachment assembly, according to an embodiment of the invention.
Figure 21B:
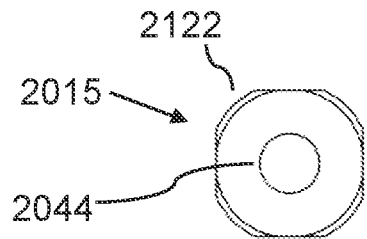
FIG. 21B is a front view of a pin wrench tool attachment assembly, according to an embodiment of the invention.
Figure 21C:
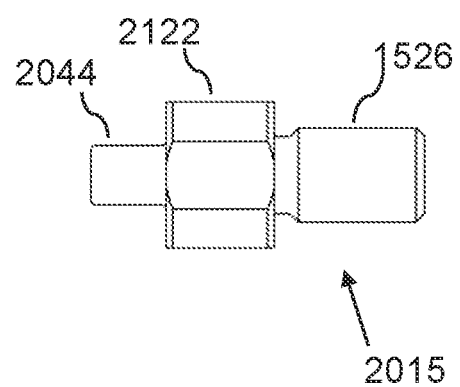
FIG. 21C is a side view of a pin wrench tool attachment assembly, according to an embodiment of the invention.
Figure 22C:
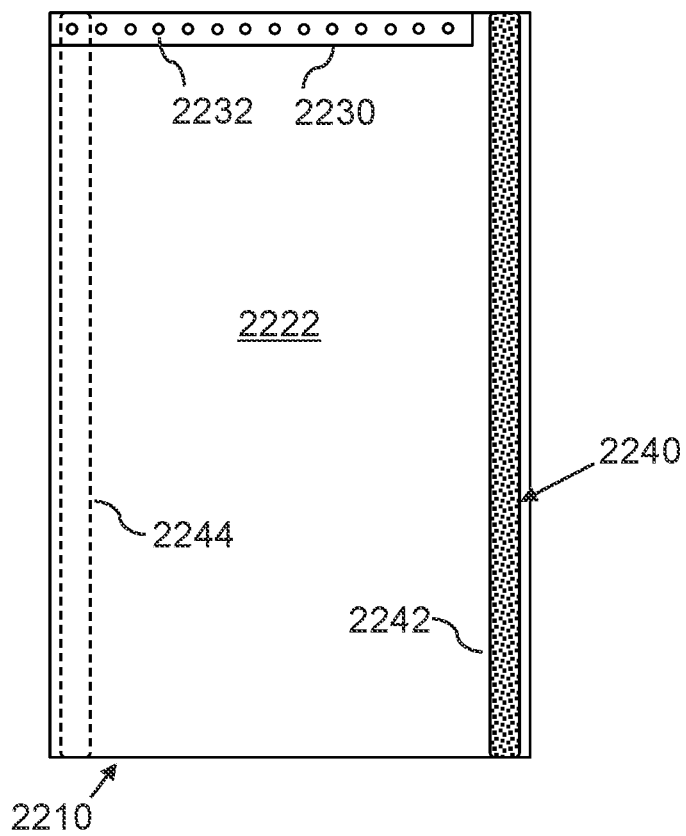
FIG. 22C is a rear view of a flexible protective cover assembly, according to an embodiment of the invention.
Figure 22E:
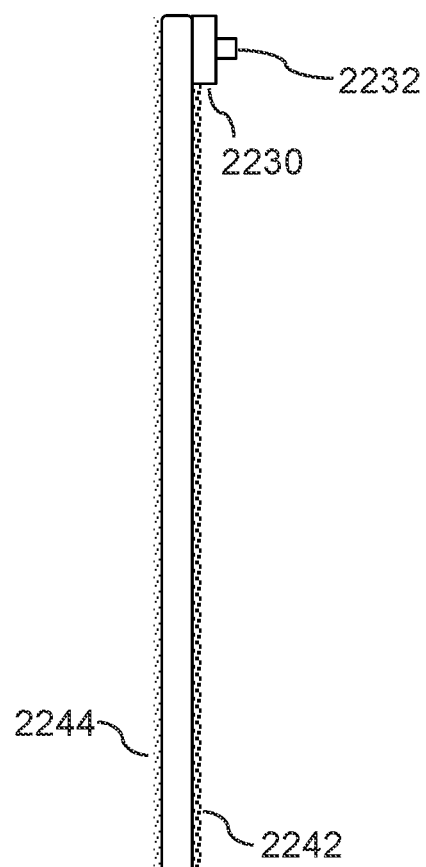
FIG. 22E is a left side view of a flexible protective cover assembly, according to an embodiment of the invention.
Figure 22D:
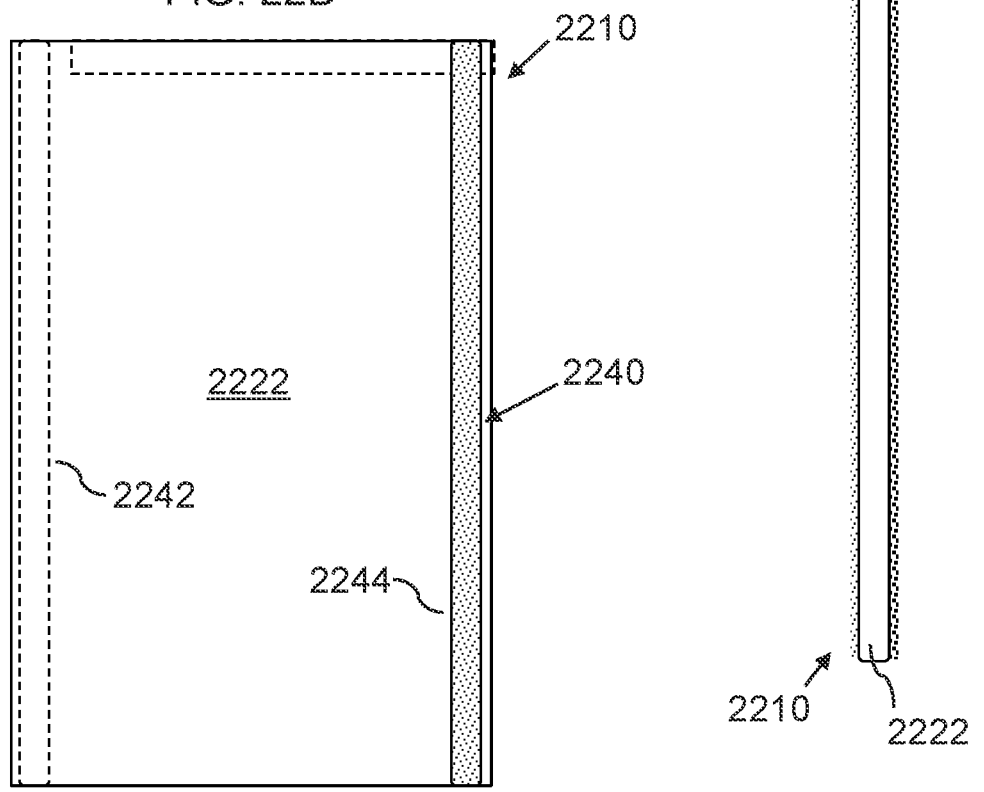
FIG. 22D is a front view of a flexible protective cover assembly, according to an embodiment of the invention.

In a related embodiment, an elongated center axis 2047 of the tool member 2044 can be configured to be substantially parallel (and overlapping) with an elongated center axis 1511 of the lever shaft 1510, as shown in FIG. 20A, when the tool attachment assembly 2015 is connected to the lever shaft 310. Alternatively, an elongated center axis 2047 of the tool member 2044 can be configured to be substantially perpendicular to an elongated center axis 1511 of the lever shaft 310.

In a related embodiment of the tool attachment assembly 2015, the tool member can be:
  a) a hexagonal wrench tool member 1644, which is configured as an elongated hexagonal member; or
  b) a spanner wrench tool member 1944;

In various related embodiments, the tool attachment assembly 2015 can be configured to attach to a shaft/handle 1510 of a tool, wherein the shaft/handle 1510 includes a threaded aperture; wherein the tool member 2015 can be a hammer, wrench, plier, cutter, file, striking tool, screwdriver, saw, knife, or other kind of hand tool member.

In various related embodiments, the tool attachment assembly 2015 can be configured to attach to a shaft/handle 1510 of a tool, wherein the shaft/handle 1510 includes a threaded aperture, wherein the tool can be a hammer, wrench, plier, cutter, file, striking tool, screwdriver, saw, knife, or other kind of hand tool.

Figure 18A:
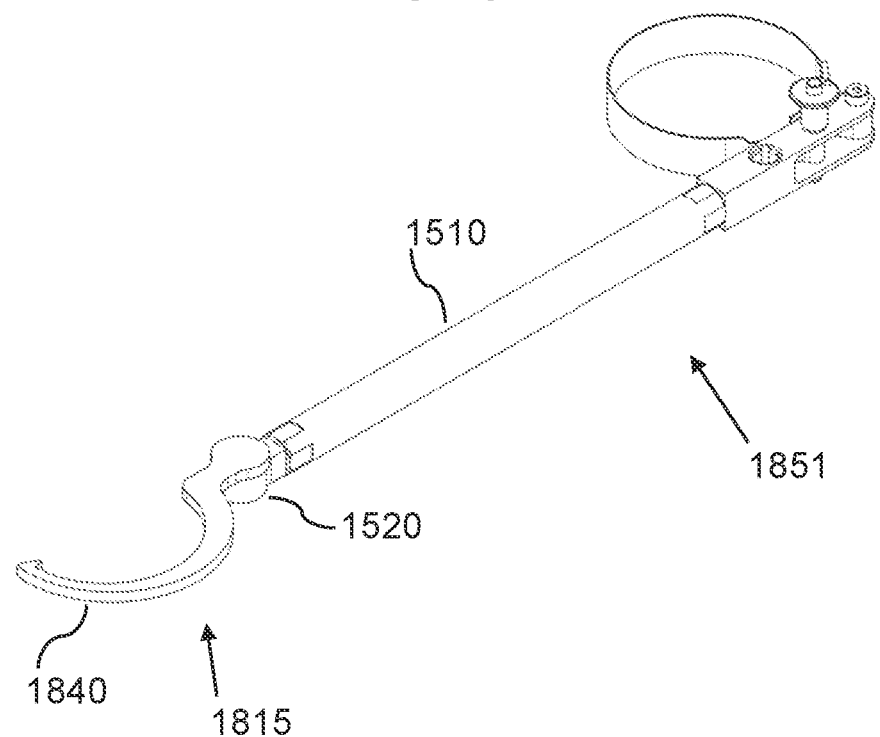
FIG. 18A is a top perspective view of a shock adjuster tool with an attached tool attachment assembly mounted with a spanner wrench tool portion, according to an embodiment of the invention.
Figure 18B:
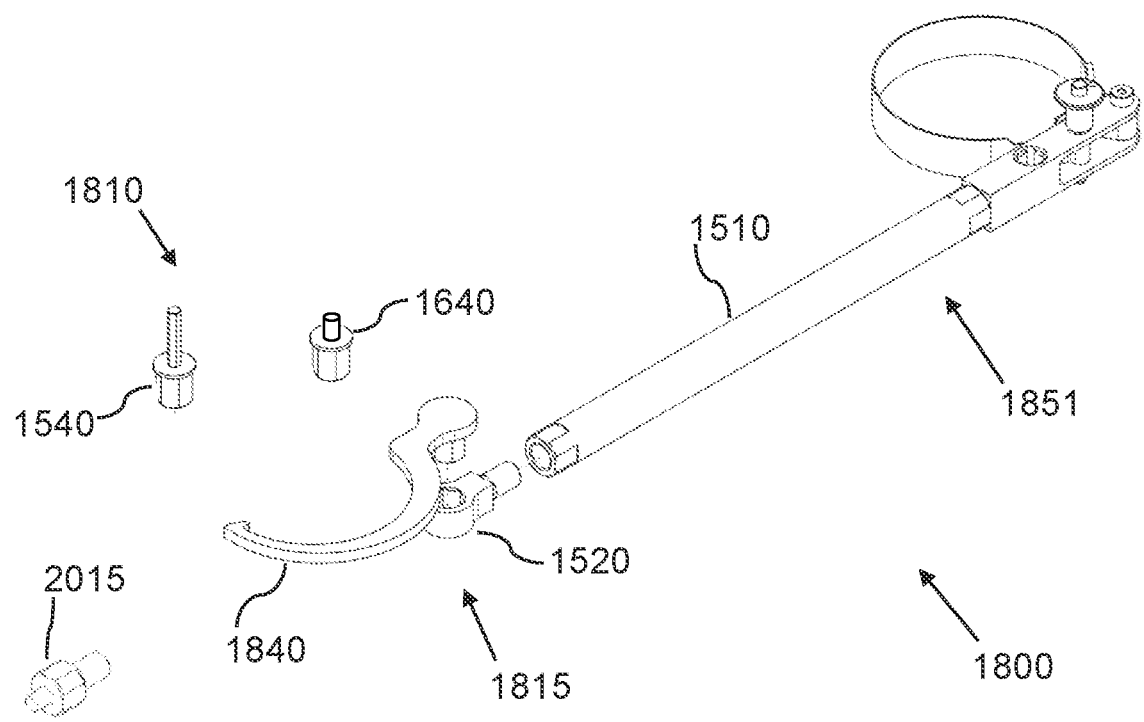
FIG. 18B is a top perspective view of the adjustable shock absorber system with the attachment assembly detached, according to the embodiment shown in FIG. 18A.
Figure 19A:
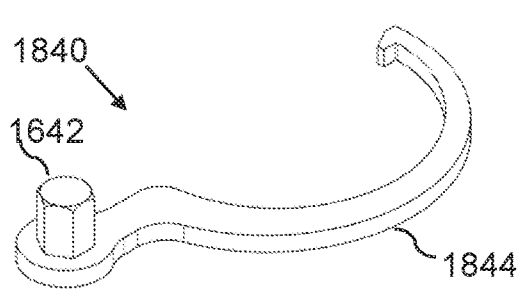
FIG. 19A is a perspective view of a spanner wrench tool portion, according to an embodiment of the invention.
Figure 19B:
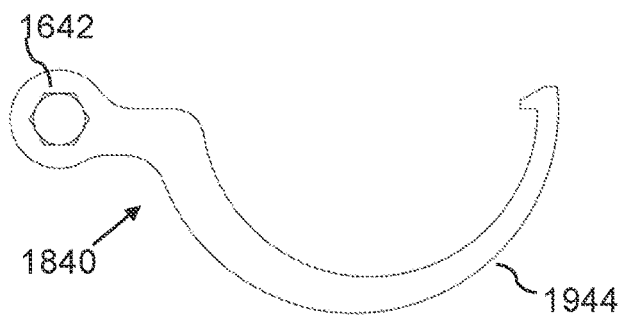
FIG. 19B is a top view of a spanner wrench tool portion, according to an embodiment of the invention.
Figure 19C:
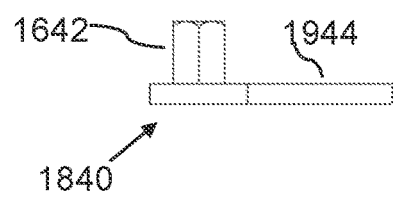
FIG. 19C is a front view of a spanner wrench tool portion, according to an embodiment of the invention.
Figure 19D:
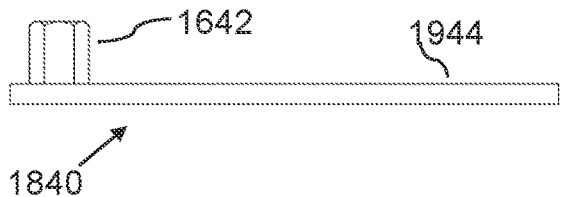
FIG. 19D is a side view of a spanner wrench tool portion, according to an embodiment of the invention.

Thus, in an embodiment, as shown in FIG. 18B, a tool system 1800 can include:
  a) a hand tool 1551, 1851, which includes a tool shaft 1510;
  b) a first tool attachment assembly 1515, 1815, which can include:
    i. a tool connector portion 1520, which is configured to detachably connect to an outer end of the lever shaft 1510 of the lever arm 1552; and
    ii. a plurality 1810 of available tool portions 1540, 1640, 1840, which are each configured to detachably connect to the tool connector portion 1520 (i.e., such that the tool portion 1540 is detachably connectable to the outer end of the lever shaft 310 via the tool connector portion 1520);
    such that a selected tool portion 1540, 1640, 1840 can be selected from the plurality 1810 of available tool portions 1540, 1840, such that the selected tool portion 1540, 1840 is detachably mounted on the tool connector portion 1520;
    such that a selected tool portion 1540, 1840 can be used to perform a tool operation; and
  b) a plurality of tool attachment assemblies 2015, or at least one second tool attachment assembly 2015, which can include:
    iv. a connector member 1526, which is detachably connectable to the outer end of the lever shaft 310, wherein the connector member 1526 can be configured as a threaded pin/cylinder/bolt, such that the connector member 1526 is threaded, i.e. such that the connector member 1526 can include:
      1. a connector threading 1528;
    v. a tool member 2044, which can be connected to the connector member 1526, wherein the tool member 2044 is configured to perform a tool operation on the coil-over shock absorber 180;
    such that the tool member 2044 of the tool attachment assembly 2015 can be used to perform a tool operation.

Here has thus been described a multitude of embodiments of the adjustable shock absorber system 100, 700, 900, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. An adjustable shock absorber system, comprising:
   a) a coil-over shock absorber, comprising:
      a spring; and
      a lockable adjustment ring, which is configured to rotatably adjust a preload of the spring, wherein the lockable adjustment ring comprises:
         a peripheral mounting surface; and
   b) a shock adjuster tool, which comprises:
      a lever arm; and
      a tool grip portion, which is connected to an inner end of the lever arm;
   wherein the tool grip portion is configured to detachably connect to the peripheral mounting surface of the lockable adjustment ring;
   such that a first clockwise rotation of the shock adjuster tool, when the tool grip portion is connected to the lockable adjustment ring in a first orientation wherein the inner end of the lever arm is pointing in a clockwise direction, causes a frictional grip between the tool grip portion and the lockable adjustment ring to tighten, such that the first clockwise rotation of the shock adjuster tool causes the lockable adjustment ring of the coil-over shock absorber to tighten, thereby increasing the preload of the spring;
   such that a first anti-clockwise rotation of the shock adjuster tool, when the tool grip portion is connected to the lockable adjustment ring in the first orientation, causes the frictional grip between the tool grip portion and the lockable adjustment ring to loosen, such that the first anti-clockwise rotation of the shock adjuster tool causes a repositioning of the shock adjuster tool, to allow space for a repeated clockwise rotation of the shock adjuster tool, to allow for further tightening of the lockable adjustment ring;
   such that a second anti-clockwise rotation of the shock adjuster tool, when the tool grip portion is connected to the lockable adjustment ring in a second orientation wherein the inner end of the lever arm is pointing in an anti-clockwise direction, causes a frictional grip between the tool grip portion and the lockable adjustment ring to tighten, such that the second anti-clockwise rotation of the shock adjuster tool causes the lockable adjustment ring of the coil-over shock absorber to loosen, thereby decreasing the preload of the spring;
   such that a second clockwise rotation of the shock adjuster tool, when the tool grip portion is connected to the lockable adjustment ring in the second orientation, causes the frictional grip between the tool grip portion and the lockable adjustment ring to loosen, such that the second clockwise rotation of the shock adjuster tool causes a repositioning of the shock adjuster tool, to allow space for a repeated anti-clockwise rotation of the shock adjuster tool, to allow for further loosening of the lockable adjustment ring.

2. The adjustable shock absorber system of claim 1, wherein the lockable adjustment ring further comprises:
   a) a locking screw; and
   b) an adjustment ring body, further comprising:
      a ring gap, which is configured to allow flexing of the adjustment ring body;
      a first lateral aperture, which is configured to protrude laterally through an outer corner of a first end of the adjustment ring body, on a first side of the ring gap; and
      a second lateral aperture, which is configured to protrude laterally through an outer corner of a second end of the adjustment ring body, on a second side of the ring gap;
      wherein the adjustment ring body is flexible;
   such that the first lateral aperture and the second lateral aperture are aligned, such that the locking screw screws into the first lateral aperture and the second lateral aperture, such that tightening the locking screw decreases a width of the ring gap;
   such that tightening the locking screw locks the lockable adjustment ring in position, thereby locking the preload of the coil-over shock absorber.

3. The adjustable shock absorber system of claim 1, wherein the lockable adjustment ring further comprises:
   a) at least one locking screw; and
   b) an adjustment ring body, further comprising:
      at least one radial threaded aperture, which is configured to protrude radially from an outer surface of the adjustment ring body, such that the at least one radial threaded aperture penetrates radially through the adjustment ring body
   such that the at least one locking screw screws into the radial threaded aperture, such that tightening the at least one locking screw causes the at least one locking screw to screw through the radial threaded aperture and touch a body of the coil-over shock absorber;
   such that tightening the at least one locking screw locks the lockable adjustment ring in position, thereby locking the preload of the coil-over shock absorber.

4. The adjustable shock absorber system of claim 1, wherein the tool grip portion further comprises:
   a band assembly, which comprises:
      an elongated band, which is configured to detachably wrap around the peripheral mounting surface of the lockable adjustment ring.

5. The adjustable shock absorber system of claim 4, wherein the lockable adjustment ring is configured with an indentation, such that the peripheral mounting surface is positioned in a bottom of the indentation, such that the lockable adjustment ring further comprises:
   a) an upper lip, which is positioned above the peripheral mounting surface; and
   b) a lower lip, which is positioned below the peripheral mounting surface;
   such that the elongated band is configured to be positioned in the indentation, between the upper lip and the lower lip.

6. The adjustable shock absorber system of claim 4, wherein the lever arm further comprises:
   a) a lever shaft; and
   b) a connector member, such that an outer end of the connector member is connected to the lever shaft, and such that an inner end of the connector member is connected to the tool grip portion.

7. The adjustable shock absorber system of claim 6, wherein the band assembly further comprises:
- a displacement member, which comprises
  - a displacement arm; and
    - a band support, which is connected to an inner end of the displacement arm, such that the band support is curved to match a curvature of a first end of the elongated band, such that an outer surface of the band support is connected to the first end of the elongated band;
  - wherein an outer end of the connector member is pivotably connected to the outer end of the displacement arm along a connection axis, and a second end of the elongated band is detachably and pivotably connected to an inner end of the connector member;
- such that the elongated band is configured to form a curve around a portion of the peripheral mounting surface, such that the first end of the elongated band is adjacent to the peripheral mounting surface, such that the first end of the elongated band follows a curvature of the peripheral mounting surface;
- such that the first clockwise rotation of the shock adjuster tool, when the tool grip portion is connected to the lockable adjustment ring in the first orientation, causes a clockwise rotation of the lever arm around the connection axis, such that the band support is pressured inwards, such that the first end of the elongated band is pressed into the peripheral mounting surface, and such that the second end of the elongated band is tightened along a length of the elongated band around the peripheral mounting surface, which causes the frictional grip between the tool grip portion and the lockable adjustment ring to tighten;
- such that the first anti-clockwise rotation of the shock adjuster tool, when the tool grip portion is connected to the lockable adjustment ring in the first orientation, causes an anti-clockwise rotation of the lever arm around the connection axis, such that the band support is pulled outwards, such that the first end of the elongated band is lifted from the peripheral mounting surface, and such that the second end of the elongated band is loosened along a length of the elongated band around the peripheral mounting surface, which causes the frictional grip between the tool grip portion and the lockable adjustment ring to loosen;
- such that the second anti-clockwise rotation of the shock adjuster tool, when the tool grip portion is connected to the lockable adjustment ring in the second orientation, causes the anti-clockwise rotation of the lever arm around the connection axis, such that the band support is pressured inwards, such that the first end of the elongated band is pressed into the peripheral mounting surface, and such that the second end of the elongated band is tightened along a length of the elongated band around the peripheral mounting surface, which causes the frictional grip between the tool grip portion and the lockable adjustment ring to tighten;
- such that the second clockwise rotation of the shock adjuster tool, when the tool grip portion is connected to the lockable adjustment ring in the second orientation, causes the clockwise rotation of the lever arm around the connection axis, such that the band support is pulled outwards, such that the first end of the elongated band is lifted from the peripheral mounting surface, and such that the second end of the elongated band is loosened along a length of the elongated band around the peripheral mounting surface, which causes the frictional grip between the tool grip portion and the lockable adjustment ring to loosen.

8. The adjustable shock absorber system of claim 7, wherein the displacement arm, further comprises a vertical displacement aperture in an outer end of the displacement arm, and wherein the connector member further comprises:
- a) a connector body, such that an outer end of the connector body is connected to the lever shaft;
- b) an upper flange, which protrudes from an inner top end of the connector body, wherein the upper flange comprises:
  - a rear upper flange aperture; and
  - a front upper flange aperture; and
- c) a lower flange, which protrudes from an inner bottom end of the connector body, below the upper flange, wherein the lower flange comprises:
  - a rear lower flange aperture; and
  - a front lower flange aperture;
- wherein the tool grip portion further comprises a detachable pin;
- wherein the elongated band further comprises a vertical band aperture in an outermost portion of a second end of the elongated band;
- such that an inner end of the displacement arm is positioned between the upper flange and the lower flange, such that the front upper flange aperture, the vertical displacement aperture, and the front lower flange aperture are aligned;
- such that the detachable pin protrudes through the front upper flange aperture, the vertical displacement aperture, and the rear lower flange aperture, to detachably and pivotably connect the displacement member to the connector member;
- such that the outermost portion of the second end of the elongated band is positioned between the upper flange and the lower flange, such that the rear upper flange aperture, the vertical band aperture, and the rear lower flange aperture are aligned;
- such that the detachable pin protrudes through the rear upper flange aperture, the vertical band aperture, and the rear lower flange aperture, to detachably and pivotably connect the second end of the elongated band to the connector member.

9. The adjustable shock absorber system of claim 6, wherein the connector member further comprises:
- a mounting aperture;
- wherein the mounting aperture is configured to allow attachment of a wrench tool with a wrench connector that fits into the mounting aperture, in order to apply a supplemental torque to the lever arm.

10. The adjustable shock absorber system of claim 6, wherein the lever shaft is pivotably connected to the connector member.

11. The adjustable shock absorber system of claim 1, further comprising:
- a protective cover assembly, which is configured to be detachably attachable to the lockable adjustment ring;
- such that the protective cover assembly is configured to extend along a length of the spring, such that the protective cover assembly protects the spring.

12. The adjustable shock absorber system of claim 11, wherein the protective cover assembly further comprises:
- a) a top cover portion; and
- b) a bottom cover portion,
  - such that the top cover portion is slidably connected to the bottom cover portion, such that a length of the protective cover assembly is adjustable, such that the protective cover assembly is configured to be adjustable to match the coil-over shock absorber.

13. The adjustable shock absorber system of claim 12, wherein the lockable adjustment ring is configured with an indentation, such that the peripheral mounting surface is positioned in a bottom of the indentation; and
wherein the top cover portion further comprises:
a) a top cover body; and
b) a top mounting clamp, which is connected to a top end of the top cover body, such that the top mounting clamp is configured to clamp in place in the indentation of the lockable adjustment ring.

14. The adjustable shock absorber system of claim 13, wherein the top cover portion further comprises:
a lock pin, which protrudes inwards from an inner surface of the top mounting clamp, such that the lock pin protrudes into an aperture of the indentation of the lockable adjustment ring when the top mounting clamp is clamped in place in the indentation, such that the top mounting clamp is secured in place and rotation of the top mounting clamp inside the indentation is prevented.

15. The adjustable shock absorber system of claim 13, wherein the top mounting clamp is configured as a flexible cylinder segment with an opening, such that the opening permits the top mounting clamp to detachably slide onto the indentation.

16. The adjustable shock absorber system of claim 13, wherein:
a) the top cover body is configured with a longitudinal slit in a lower portion of the top cover body, such that the longitudinal slit extends from a bottom end of the top cover body; and
b) the bottom cover portion further comprises:
a bottom cover body; and
a t-shaped connector, which is connected to a central top portion of an inner surface of the bottom cover body, wherein the t-shaped connector comprises:
a stem, such that an inner end of the stem is connected to the central top portion of the inner surface of the bottom cover body; and
a central inner member, which is perpendicularly connected to an outer end of the stem,
such that a right central slit and a left central slit form on respectively a right side of the stem and a left side of the stem,
between the inner surface of the bottom cover body and the central inner member;
such that the t-shaped connector is configured to slide along the longitudinal slit, thereby enabling length adjustability of the protective cover assembly, such that a central portion of the top cover body is slidably secured in place by the shaped connector.

17. The adjustable shock absorber system of claim 16, wherein the bottom cover portion further comprises:
a) a right L-shaped connector, which is connected to a right side top portion of an inner surface of the bottom cover body, wherein the right L-shaped connector comprises:
a right base, such that an inner end of the right base is connected to the right side top portion of the inner surface of the bottom cover body; and
a right inner member, which is perpendicularly connected to an outer end of the right base;
such that a right side slit forms between the inner surface of the bottom cover body and the right inner member; and b) a left L-shaped connector, which is connected to a left side top portion of an inner surface of the bottom cover body, wherein the left L-shaped connector comprises:
a left base, such that an inner end of the left base is connected to the left side top portion of the inner surface of the bottom cover body; and
a left inner member, which is perpendicularly connected to an outer end of the left base;
such that a left side slit forms between the inner surface of the bottom cover body and the left inner member;
such that a right side of the top cover body is configured to slide through the right side slit of the right L-shaped connector, such that the right side of the top cover body is slidably secured in place by the right L-shaped connector; and
such that a left side of the top cover body is configured to slide through the left side slit of the left L-shaped connector, such that the left side of the top cover body is slidably secured in place by the right L-shaped connector.

18. The adjustable shock absorber system of claim 12, wherein the bottom cover portion further comprises:
a) a bottom cover body; and
b) a bottom mounting clamp, which is connected to a bottom end of the bottom cover body, such that the bottom mounting clamp is configured to clamp in place on a bottom portion of the coil-over shock absorber.

19. The adjustable shock absorber system of claim 18, wherein the bottom mounting clamp is configured as a flexible cylinder segment comprising an opening, such that the opening permits the bottom mounting clamp to detachably slide onto the bottom portion of the coil-over shock absorber.

20. The adjustable shock absorber system of claim 11, wherein the lockable adjustment ring is configured with an indentation, such that the peripheral mounting surface is positioned in a bottom of the indentation; and
wherein the protective cover assembly further comprises:
a) a cover body; and
b) a mounting structure, which is connected to a top end of the cover body, such that the mounting structure is configured to be secured in place in the indentation of the lockable adjustment ring;
wherein the cover body and the mounting structure are made from a flexible resilient material, such that the mounting structure is configured to be inserted into and curve around the indentation of the lockable adjustment ring, such that the cover body curves around the spring of the coil-over shock absorber.

21. The adjustable shock absorber system of claim 1, wherein the lever arm further comprises:
a lever shaft; and
wherein the shock adjuster tool further comprises:
a tool attachment assembly, comprising:
a connector member, which is detachably connectable to an outer end of the lever shaft; and
a tool member, which is connected to the connector member;
such that the tool member is configured to be used to perform a tool operation on the coil-over shock absorber.

22. The adjustable shock absorber system of claim 21, wherein:
   a) the connector member comprises:
      a connector threading; and
   b) the outer end of the lever shaft is configured with a shaft threading;
      such that the connector threading screws into or onto the shaft threading.

23. The adjustable shock absorber system of claim 21, wherein the tool member is configured as a pin wrench, such that the tool member is an elongated cylindrical member;
   wherein the lockable adjustment ring comprises:
      at least one aperture;
         such that the shock adjuster tool with the tool attachment assembly attached is configured to be used to adjust a position of the lockable adjustment ring, when the tool member is inserted into the at least one aperture.

24. The adjustable shock absorber system of claim 21, wherein the shock adjuster tool further comprises:
   a tool connector portion, which comprises:
      the connector member; and
      an intermediate member, which is connected between the tool connector portion and the tool member
      wherein the intermediate member is configured to be flush with a surface of an outer end of the lever shaft.

25. The adjustable shock absorber system of claim 22, wherein the shock adjuster tool further comprises:
   a tool connector portion, which comprises:
      the connector member; and
   wherein the tool attachment assembly further comprises:
      at least one tool portion, which is detachably connected to the tool connector portion,
         wherein the at least one tool portion comprises:
            the tool member;
               such that the tool member is detachably connected to the connector member.

26. The adjustable shock absorber system of claim 25, wherein the tool connector portion further comprises:
   a) a connector body, which further comprises:
      a connector aperture, which is configured with a locking shape; and
   b) a connector member, which is threaded, such that the connector member comprises:
      the connector threading.

27. The adjustable shock absorber system of claim 26, wherein the at least one tool portion further comprises:
   a connector member, which is configured to detachably connect with the connector body of the tool connector portion;
   wherein the connector member is configured to be insertable into the connector aperture of the tool connector portion, such that the connector member is securely and detachably held in place in the connector aperture;
   wherein the connector member is configured to match the locking shape of the connector aperture; and
   wherein the tool member is connected to the connector member.

28. The adjustable shock absorber system of claim 27, wherein the connector member is hexagonal and the connector aperture is hexagonal.

29. The adjustable shock absorber system of claim 27, wherein the tool member is configured as a hexagonal wrench, such that the tool member is an elongated hexagonal member;
   such that the shock adjuster tool with the tool attachment assembly attached is configured to be used to lock the lockable adjustment ring, when the tool member is inserted into a hexagonal aperture of a locking screw of the lockable adjustment ring.

30. The adjustable shock absorber system of claim 27, wherein the tool member is configured as a spanner wrench, such that the tool member is configured to interlock with a locking ring of the coil-over shock absorber, when the at least one tool portion is attached to the locking ring for locking or releasing the locking ring.

* * * * *